United States Patent
MacInnis et al.

(10) Patent No.: US 7,538,783 B2
(45) Date of Patent: May 26, 2009

(54) GRAPHICS DISPLAY SYSTEM WITH VIDEO SCALER

(75) Inventors: Alexander G. MacInnis, Los Altos, CA (US); Chengfuh Jeffrey Tang, Saratoga, CA (US); Xiaodong Xie, San Jose, CA (US); James T. Patterson, Saratoga, CA (US); Greg A. Kranawetter, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 807 days.

(21) Appl. No.: 10/670,627

(22) Filed: Sep. 25, 2003

(65) Prior Publication Data

US 2004/0056874 A1     Mar. 25, 2004

Related U.S. Application Data

(63) Continuation of application No. 09/437,326, filed on Nov. 9, 1999, now Pat. No. 6,661,427.

(60) Provisional application No. 60/107,875, filed on Nov. 9, 1998.

(51) Int. Cl.
*G09G 5/00* (2006.01)
*G06T 1/60* (2006.01)
*G06F 12/02* (2006.01)

(52) U.S. Cl. ............ 345/660; 345/667; 345/530; 345/543

(58) Field of Classification Search ........ 345/660, 345/667, 519, 530, 543
See application file for complete search history.

(56) References Cited

U.S. PATENT DOCUMENTS

| 4,020,332 A | 4/1977 | Crochiere et al. ........... 235/152 |
| 4,367,466 A | 1/1983 | Takeda et al. |
| 4,412,294 A | 10/1983 | Watts et al. |
| 4,481,594 A | 11/1984 | Staggs et al. |
| 4,532,547 A | 7/1985 | Bennett |
| 4,679,040 A | 7/1987 | Yan ........................ 340/747 |
| 4,688,033 A | 8/1987 | Carini et al. |
| 4,727,365 A | 2/1988 | Bunker et al. |
| 4,751,446 A | 6/1988 | Pineda et al. |

(Continued)

FOREIGN PATENT DOCUMENTS

EP        0746116 A2    12/1996

(Continued)

OTHER PUBLICATIONS

Hudson, Scott, Desktop PC-IC Content and Integration Trendsy, Mar. 1, 1999; Electronic News, http://www.reed-electronics.com/electronicnews/article/CA69496.html.

(Continued)

*Primary Examiner*—Chante Harrison
(74) *Attorney, Agent, or Firm*—McAndrews, Held & Malloy, Ltd.

(57) ABSTRACT

A graphics integrated circuit chip is used in a set-top box for controlling a television display. The graphics chip processes analog video input, digital video input, graphics input and audio input simultaneously. A video scaling system preferably conserves memory by downscaling video prior to capturing the video in memory and upscaling video after the video is called out of memory.

23 Claims, 37 Drawing Sheets

U.S. PATENT DOCUMENTS

| | | | |
|---|---|---|---|
| 4,799,053 A | 1/1989 | Van Aken et al. | |
| 4,908,780 A | 3/1990 | Priem et al. | |
| 4,954,970 A | 9/1990 | Walker et al. | |
| 4,959,718 A | 9/1990 | Bennett | |
| 4,967,392 A | 10/1990 | Werner et al. | |
| 5,003,299 A | 3/1991 | Batson et al. | |
| 5,039,983 A | 8/1991 | Yoon | |
| 5,043,714 A | 8/1991 | Perlman | |
| 5,065,231 A | 11/1991 | Greaves et al. | |
| 5,097,257 A | 3/1992 | Clough et al. | |
| 5,142,273 A | 8/1992 | Wobermin | |
| 5,146,592 A | 9/1992 | Pfeiffer et al. | |
| 5,148,417 A | 9/1992 | Wong et al. | |
| 5,155,816 A | 10/1992 | Kohn | 395/375 |
| 5,200,738 A | 4/1993 | Fumoto et al. | |
| 5,243,447 A | 9/1993 | Bodenkamp et al. | |
| 5,250,928 A | 10/1993 | Kuriki | |
| 5,254,981 A | 10/1993 | Disanto et al. | |
| 5,258,747 A | 11/1993 | Oda et al. | 345/153 |
| 5,262,854 A | 11/1993 | Ng | |
| 5,287,178 A | 2/1994 | Acampora et al. | |
| 5,301,332 A | 4/1994 | Dukes | |
| 5,307,177 A | 4/1994 | Shibata et al. | |
| 5,319,742 A | 6/1994 | Edgar | |
| 5,327,125 A | 7/1994 | Iwase et al. | |
| 5,335,074 A | 8/1994 | Stec | |
| 5,371,547 A | 12/1994 | Siracusa et al. | |
| 5,371,877 A | 12/1994 | Drako et al. | |
| 5,384,912 A | 1/1995 | Ogrinc et al. | 395/164 |
| 5,396,567 A | 3/1995 | Jass | |
| 5,398,211 A | 3/1995 | Willenz et al. | |
| 5,402,181 A | 3/1995 | Jenison | |
| 5,404,447 A | 4/1995 | Drako et al. | |
| 5,418,535 A | 5/1995 | Masucci et al. | |
| 5,422,858 A | 6/1995 | Mizukami et al. | |
| 5,430,465 A | 7/1995 | Sabella et al. | |
| 5,432,769 A | 7/1995 | Honjo | |
| 5,432,900 A | 7/1995 | Rhodes et al. | 395/154 |
| 5,434,683 A | 7/1995 | Sekine et al. | |
| 5,434,957 A | 7/1995 | Moller | |
| 5,452,235 A * | 9/1995 | Isani | 710/68 |
| 5,463,728 A | 10/1995 | Blahut et al. | |
| 5,467,144 A | 11/1995 | Saeger et al. | |
| 5,469,223 A | 11/1995 | Kimura | |
| 5,471,411 A | 11/1995 | Adams et al. | |
| 5,475,400 A | 12/1995 | Sellers et al. | |
| 5,479,606 A | 12/1995 | Gray | |
| 5,488,385 A | 1/1996 | Singhal et al. | |
| 5,515,077 A | 5/1996 | Tateyama | |
| 5,526,054 A | 6/1996 | Greenfield et al. | |
| 5,532,749 A | 7/1996 | Hong | |
| 5,533,182 A | 7/1996 | Bates et al. | |
| 5,539,891 A | 7/1996 | Childers et al. | |
| 5,546,103 A | 8/1996 | Rhodes et al. | |
| 5,550,594 A | 8/1996 | Cooper et al. | |
| 5,570,296 A | 10/1996 | Heyl et al. | |
| 5,574,572 A | 11/1996 | Malinowski et al. | |
| 5,577,187 A | 11/1996 | Mariani | |
| 5,579,028 A | 11/1996 | Takeya | |
| 5,583,575 A | 12/1996 | Arita et al. | |
| 5,592,601 A | 1/1997 | Kelley et al. | |
| 5,594,467 A | 1/1997 | Marlton et al. | |
| 5,598,525 A | 1/1997 | Nally et al. | |
| 5,598,545 A | 1/1997 | Childers et al. | |
| 5,600,364 A | 2/1997 | Hendricks et al. | |
| 5,600,379 A | 2/1997 | Wagner | |
| 5,604,514 A | 2/1997 | Hancock | 345/154 |
| 5,610,983 A | 3/1997 | Stewart | |
| 5,614,952 A | 3/1997 | Boyce et al. | |
| 5,615,376 A | 3/1997 | Ranganathan | 395/750 |
| 5,619,270 A | 4/1997 | Demmer | |
| 5,619,337 A | 4/1997 | Naimpally | |
| 5,621,478 A | 4/1997 | Demmer | |
| 5,621,869 A | 4/1997 | Drews | |
| 5,621,906 A | 4/1997 | O'Neill et al. | |
| 5,623,311 A | 4/1997 | Phillips et al. | |
| 5,625,379 A | 4/1997 | Reinert et al. | |
| 5,625,611 A | 4/1997 | Yokota et al. | |
| 5,625,764 A | 4/1997 | Tsujimoto et al. | |
| 5,631,668 A | 5/1997 | Katsura et al. | |
| 5,635,985 A | 6/1997 | Boyce et al. | |
| 5,638,499 A | 6/1997 | O'Conner et al. | |
| 5,638,501 A | 6/1997 | Gough et al. | |
| 5,640,543 A | 6/1997 | Farrell et al. | |
| 5,664,162 A | 9/1997 | Dye | 345/521 |
| 5,673,401 A | 9/1997 | Volk et al. | |
| 5,687,306 A | 11/1997 | Blank | |
| 5,694,143 A | 12/1997 | Fielder et al. | |
| 5,696,527 A | 12/1997 | King et al. | 345/112 |
| 5,701,365 A | 12/1997 | Harrington et al. | |
| 5,706,415 A | 1/1998 | Kelley et al. | |
| 5,706,478 A | 1/1998 | Dye | |
| 5,706,482 A | 1/1998 | Matsushima et al. | |
| 5,708,457 A | 1/1998 | Otake et al. | |
| 5,708,764 A | 1/1998 | Borrel et al. | |
| 5,719,593 A | 2/1998 | De Lange | 345/114 |
| 5,727,084 A | 3/1998 | Pan et al. | |
| 5,727,192 A | 3/1998 | Baldwin | |
| 5,737,455 A | 4/1998 | Harrington et al. | |
| 5,742,779 A | 4/1998 | Steele et al. | |
| 5,742,796 A | 4/1998 | Huxley | |
| 5,745,095 A | 4/1998 | Parchem et al. | 345/114 |
| 5,748,178 A | 5/1998 | Drewry | |
| 5,748,983 A | 5/1998 | Gulick et al. | |
| 5,751,979 A | 5/1998 | McCrory | |
| 5,754,185 A | 5/1998 | Hsao et al. | |
| 5,754,186 A | 5/1998 | Tam et al. | |
| 5,757,377 A | 5/1998 | Lee et al. | |
| 5,758,177 A | 5/1998 | Gulick et al. | 395/800.01 |
| 5,761,516 A | 6/1998 | Rostoker et al. | |
| 5,764,238 A | 6/1998 | Lum et al. | |
| 5,764,243 A | 6/1998 | Baldwin | |
| 5,765,010 A | 6/1998 | Chung et al. | |
| 5,774,110 A | 6/1998 | Edelson | |
| 5,777,629 A | 7/1998 | Baldwin | |
| 5,784,046 A * | 7/1998 | Cahill, III | 345/660 |
| 5,790,134 A | 8/1998 | Lentz | |
| 5,790,136 A | 8/1998 | Hoffert et al. | 345/506 |
| 5,790,795 A | 8/1998 | Hough | |
| 5,790,842 A | 8/1998 | Charles et al. | |
| 5,793,384 A | 8/1998 | Okitsu | |
| 5,793,445 A | 8/1998 | Lum et al. | |
| 5,802,579 A | 9/1998 | Crary | |
| 5,812,144 A * | 9/1998 | Potu et al. | 715/500.1 |
| 5,812,210 A | 9/1998 | Arai et al. | |
| 5,815,137 A | 9/1998 | Weatherford et al. | 345/145 |
| 5,818,533 A | 10/1998 | Auld et al. | |
| 5,828,383 A | 10/1998 | May et al. | |
| 5,831,615 A | 11/1998 | Drews et al. | |
| 5,831,637 A | 11/1998 | Young et al. | |
| 5,838,296 A | 11/1998 | Butler et al. | |
| 5,838,389 A | 11/1998 | Mical et al. | |
| 5,844,608 A | 12/1998 | Yu et al. | |
| 5,847,717 A | 12/1998 | Berry | |
| 5,850,232 A | 12/1998 | Engstrom et al. | |
| 5,854,761 A | 12/1998 | Patel et al. | |
| 5,864,345 A | 1/1999 | Wickstrom et al. | 345/431 |
| 5,867,166 A | 2/1999 | Myhrvold et al. | |
| 5,870,622 A | 2/1999 | Gulick et al. | |
| 5,874,967 A | 2/1999 | West et al. | 345/435 |
| 5,877,754 A | 3/1999 | Keith et al. | |
| 5,877,817 A | 3/1999 | Moon | |
| 5,883,670 A | 3/1999 | Sporer et al. | |
| 5,889,949 A | 3/1999 | Charles | |

| | | | | | | |
|---|---|---|---|---|---|---|
| 5,894,300 A | 4/1999 | Takizawa | | 6,100,826 A | 8/2000 | Jeon et al. |
| 5,894,526 A | 4/1999 | Watanabe et al. | | 6,100,899 A | 8/2000 | Ameline et al. ............. 345/431 |
| 5,896,136 A | 4/1999 | Augustine et al. | | 6,105,048 A | 8/2000 | He |
| 5,903,261 A | 5/1999 | Walsh et al. | | 6,108,014 A | 8/2000 | Dye |
| 5,903,277 A | 5/1999 | Sutherland et al. | | 6,108,047 A * | 8/2000 | Chen .......................... 348/581 |
| 5,903,281 A | 5/1999 | Chen et al. | | 6,111,896 A | 8/2000 | Slattery et al. |
| 5,907,295 A | 5/1999 | Lin | | 6,115,422 A | 9/2000 | Anderson et al. |
| 5,907,635 A | 5/1999 | Numata | | 6,121,978 A | 9/2000 | Miler |
| 5,909,559 A | 6/1999 | So | | 6,124,865 A | 9/2000 | Meinerth et al. |
| 5,912,710 A | 6/1999 | Fujimoto | | 6,124,878 A | 9/2000 | Adams et al. |
| 5,914,725 A | 6/1999 | MacInnis et al. | | 6,125,410 A | 9/2000 | Salbaum et al. |
| 5,914,728 A | 6/1999 | Yamagishi et al. | | 6,133,901 A | 10/2000 | Law .......................... 345/136 |
| 5,917,502 A | 6/1999 | Kirkland et al. | | 6,134,378 A | 10/2000 | Abe et al. |
| 5,920,572 A | 7/1999 | Washington et al. | | 6,144,392 A | 11/2000 | Rogers |
| 5,920,682 A | 7/1999 | Shu et al. | | 6,151,030 A | 11/2000 | DeLeeuw et al. ............ 345/435 |
| 5,920,842 A | 7/1999 | Cooper et al. | | 6,151,074 A | 11/2000 | Werner .................... 348/425.1 |
| 5,923,316 A | 7/1999 | Kitamura et al. | | 6,157,415 A | 12/2000 | Glen .......................... 348/599 |
| 5,923,385 A | 7/1999 | Mills et al. | | 6,157,978 A | 12/2000 | Ng et al. |
| 5,926,647 A | 7/1999 | Adams et al. .......... 395/800.36 | | 6,160,989 A | 12/2000 | Hendricks et al. |
| 5,929,872 A | 7/1999 | Greene | | 6,167,498 A | 12/2000 | Larson et al. |
| 5,936,677 A | 8/1999 | Fries et al. | | 6,169,843 B1 | 1/2001 | Lenihan et al. |
| 5,940,080 A | 8/1999 | Ruehle et al. | | 6,178,486 B1 | 1/2001 | Gill et al. |
| 5,940,089 A | 8/1999 | Dilliplane et al. | | 6,184,908 B1 | 2/2001 | Chan et al. |
| 5,941,968 A | 8/1999 | Mergard et al. | | 6,189,064 B1 | 2/2001 | MacInnis et al. |
| 5,948,082 A | 9/1999 | Ichikawa | | 6,189,073 B1 | 2/2001 | Pawlowski |
| 5,949,432 A | 9/1999 | Gough et al. | | 6,199,131 B1 | 3/2001 | Melo et al. |
| 5,949,439 A | 9/1999 | Ben-Yoseph et al. ........ 345/503 | | 6,204,859 B1 | 3/2001 | Jouppi et al. |
| 5,951,664 A | 9/1999 | Lambrecht et al. | | 6,205,260 B1 | 3/2001 | Crinon et al. ................ 382/284 |
| 5,953,691 A | 9/1999 | Mills | | 6,208,354 B1 | 3/2001 | Porter ........................ 345/435 |
| 5,956,041 A | 9/1999 | Koyamada et al. .......... 345/420 | | 6,208,671 B1 | 3/2001 | Paulos et al. |
| 5,959,626 A | 9/1999 | Garrison et al. | | 6,208,691 B1 | 3/2001 | Balakrishnan et al. |
| 5,959,637 A | 9/1999 | Mills et al. | | 6,212,590 B1 | 4/2001 | Melo et al. |
| 5,960,464 A | 9/1999 | Lam | | 6,215,703 B1 | 4/2001 | Bogin et al. |
| 5,961,603 A | 10/1999 | Kunkel et al. | | 6,219,030 B1 * | 4/2001 | Nonomura et al. .......... 345/603 |
| 5,963,201 A | 10/1999 | McGreggor et al. ......... 345/326 | | 6,226,794 B1 | 5/2001 | Anderson, Jr. et al. |
| 5,963,222 A | 10/1999 | Cheney et al. | | 6,229,550 B1 | 5/2001 | Gloudemans et al. |
| 5,963,262 A | 10/1999 | Ke et al. | | 6,229,853 B1 | 5/2001 | Gebler et al. |
| 5,973,955 A | 10/1999 | Nogle et al. | | 6,233,634 B1 | 5/2001 | Clark et al. |
| 5,977,933 A | 11/1999 | Wicher et al. ................... 345/3 | | 6,236,727 B1 | 5/2001 | Ciacelli et al. |
| 5,977,989 A | 11/1999 | Lee et al. | | 6,239,810 B1 | 5/2001 | Van Hook et al. ........... 345/431 |
| 5,978,509 A | 11/1999 | Nachtergaele et al. | | 6,252,608 B1 | 6/2001 | Snyder et al. ................ 345/473 |
| 5,982,305 A | 11/1999 | Taylor | | 6,256,348 B1 | 7/2001 | Laczko et al. |
| 5,982,381 A | 11/1999 | Joshi et al. | | 6,263,019 B1 | 7/2001 | Ryan |
| 5,982,425 A | 11/1999 | Allen et al. | | 6,263,023 B1 | 7/2001 | Ngai |
| 5,982,459 A | 11/1999 | Fandrianto et al. | | 6,263,396 B1 | 7/2001 | Cottle et al. |
| 5,987,555 A | 11/1999 | Alzien et al. | | 6,266,072 B1 | 7/2001 | Koga et al. |
| 6,002,411 A | 12/1999 | Dye | | 6,266,753 B1 | 7/2001 | Hicok et al. |
| 6,002,882 A | 12/1999 | Garde | | 6,269,107 B1 | 7/2001 | Jong |
| 6,005,546 A | 12/1999 | Keene | | 6,271,826 B1 | 8/2001 | Pol et al. |
| 6,006,286 A | 12/1999 | Baker et al. | | 6,271,847 B1 | 8/2001 | Shum et al. |
| 6,006,303 A | 12/1999 | Barnaby et al. | | 6,275,507 B1 | 8/2001 | Anderson et al. |
| 6,018,803 A | 1/2000 | Kardach | | 6,281,873 B1 | 8/2001 | Oakley |
| 6,023,302 A | 2/2000 | MacInnis et al. ............. 348/597 | | 6,286,103 B1 | 9/2001 | Maillard et al. |
| 6,023,738 A | 2/2000 | Priem et al. | | 6,295,048 B1 * | 9/2001 | Ward et al. .................. 345/699 |
| 6,028,583 A | 2/2000 | Hamburg ..................... 345/112 | | 6,301,299 B1 | 10/2001 | Sita et al. |
| 6,038,031 A | 3/2000 | Murphy ..................... 358/1.09 | | 6,311,204 B1 | 10/2001 | Mills |
| 6,046,740 A | 4/2000 | LaRoche et al. | | 6,313,822 B1 | 11/2001 | McKay et al. |
| 6,057,850 A | 5/2000 | Kichury | | 6,320,619 B1 | 11/2001 | Jiang |
| 6,061,094 A | 5/2000 | Maietta | | 6,326,963 B1 | 12/2001 | Meehan |
| 6,061,402 A | 5/2000 | Boyce et al. | | 6,326,984 B1 | 12/2001 | Chow et al. |
| 6,064,676 A | 5/2000 | Slattery et al. | | 6,327,000 B1 | 12/2001 | Auld et al. |
| 6,067,322 A | 5/2000 | Wang | | 6,327,002 B1 | 12/2001 | Rinaldi et al. |
| 6,077,084 A | 6/2000 | Mino et al. | | 6,327,005 B1 | 12/2001 | Han |
| 6,078,305 A | 6/2000 | Mizutani ..................... 345/113 | | 6,335,746 B1 | 1/2002 | Enokida et al. |
| 6,081,297 A | 6/2000 | Lee | | 6,337,703 B1 | 1/2002 | Konar et al. |
| 6,081,854 A | 6/2000 | Priem et al. | | 6,339,434 B1 | 1/2002 | West et al. |
| 6,085,273 A | 7/2000 | Ball et al. | | 6,342,892 B1 | 1/2002 | Van Hook et al. |
| 6,088,045 A | 7/2000 | Lumelsky et al. | | 6,351,471 B1 | 2/2002 | Robinett et al. |
| 6,088,046 A | 7/2000 | Larson et al. | | 6,351,474 B1 | 2/2002 | Robinett et al. |
| 6,088,355 A | 7/2000 | Mills et al. | | 6,353,460 B1 | 3/2002 | Sokawa et al. |
| 6,092,124 A | 7/2000 | Priem et al. | | 6,357,045 B1 | 3/2002 | Devaney |
| 6,094,226 A | 7/2000 | Ke et al. | | 6,362,827 B1 | 3/2002 | Ohba |
| 6,098,046 A | 8/2000 | Cooper et al. | | 6,369,826 B1 | 4/2002 | Shimotono et al. |

| | | | |
|---|---|---|---|
| 6,369,855 B1 | 4/2002 | Chauvel et al. | |
| 6,373,497 B1 | 4/2002 | McKnight et al. | |
| 6,374,244 B1 | 4/2002 | Shibata | |
| 6,380,945 B1 | 4/2002 | MacInnis et al. | |
| 6,384,831 B1 | 5/2002 | Nakamura et al. | |
| 6,384,840 B1 | 5/2002 | Frank et al. | |
| 6,393,021 B1 | 5/2002 | Chow et al. | |
| 6,408,436 B1 | 6/2002 | de Haas | |
| 6,411,333 B1 | 6/2002 | Auld et al. | 348/441 |
| 6,421,460 B1 | 7/2002 | Hamburg | |
| 6,426,755 B1 | 7/2002 | Deering | |
| 6,434,319 B1 | 8/2002 | Wine | |
| 6,442,201 B2 | 8/2002 | Choi | |
| 6,452,641 B1 | 9/2002 | Chauvel et al. | |
| 6,456,335 B1 | 9/2002 | Miura et al. | |
| 6,459,456 B1 | 10/2002 | Oh | |
| 6,466,206 B1 | 10/2002 | Deering | |
| 6,466,210 B1 | 10/2002 | Carlsen et al. | |
| 6,466,220 B1 | 10/2002 | Cesana et al. | |
| 6,466,581 B1 | 10/2002 | Yee et al. | |
| 6,466,624 B1 | 10/2002 | Fogg | |
| 6,467,093 B1 | 10/2002 | Inoue et al. | |
| 6,470,100 B2 | 10/2002 | Horiuchi | |
| 6,496,186 B1 | 12/2002 | Deering | |
| 6,496,228 B1 | 12/2002 | McGee et al. | |
| 6,510,554 B1 | 1/2003 | Gordon et al. | |
| 6,518,965 B2 | 2/2003 | Dye et al. | |
| 6,529,284 B1 | 3/2003 | Ganapathy et al. | |
| 6,570,922 B1 | 5/2003 | Wang et al. | |
| 6,662,329 B1 | 12/2003 | Foster et al. | |
| 6,687,302 B2 | 2/2004 | Nakaya | |
| 6,720,976 B1 | 4/2004 | Shimizu et al. | |
| 6,853,385 B1 | 2/2005 | MacInnis et al. | |
| 6,894,706 B1 * | 5/2005 | Ward et al. | 345/660 |
| 2001/0017631 A1 * | 8/2001 | Oakley | 345/660 |
| 2002/0176506 A1 | 11/2002 | Ferreira Florencio et al. | |
| 2003/0085903 A1 | 5/2003 | Hrusecky et al. | |
| 2003/0133441 A1 | 7/2003 | Watanabe et al. | |

FOREIGN PATENT DOCUMENTS

| | | |
|---|---|---|
| EP | 0 752 695 | 1/1997 |
| EP | 0752695 A2 | 1/1997 |
| EP | 0 840 505 | 5/1998 |
| EP | 0840276 A2 | 5/1998 |
| EP | 0840277 A2 | 5/1998 |
| EP | 0840505 A2 | 5/1998 |
| GB | 2287627 A | 3/1995 |
| GB | 2287627 A | 9/1995 |
| JP | 2000-196586 A | 7/2000 |
| WO | WO 94/10641 | 5/1994 |
| WO | WO 00/28518 | 5/2000 |

OTHER PUBLICATIONS

Brown, Peter, Basic Notebooks Infrastructure In Place—Trident introduces Monterey chip; Neomagic re-engineering products, Sep. 28, 1998, Electronic News, http://www.findarticles.com/p/articles/mi_mOEKF/is_n2238_v44/ai_21172858.

Motorola, Inc., MC92100 "Scorpion" Graphics Display Generator, SDRAM Controller, and Digital Video Encoder, 1997 6 pages.

Motorola, Inc., MC92100 "Scorpion" Graphics Display Generator, SDRAM Controller, and Digital Video Encoder, 1997,6 pages.

Blinn, Jim; Jim Blinn's Corner Dirty Pixels; publication; 1998; pp. 179-190; Chapter Sixteen; Morgan Kaufmann Publishers, Inc.; San Francisco, CA, U.S.A.

Foley, James D., et al.; Computer Graphics: Principles and Practice; publication, 1996, 1990; The Systems Programming Series, 4 pages, Second Edition in C; Addison-Wesley Publishing Company; U.S.A.

Sun, Huifang et al., "A New Approach for Memory Efficient ATV Decoding," 1997 IEEE International Conference on Consumer Electronics, pp. 174-175, Los Angeles, 1997.

Bao, Jay et al., "HDTV Down-Conversion Decoder," IEEE Transactions on Consumer Electronics, pp. 402-410, vol. 42, No. 3, Aug. 1996.

Mokry, Robert et al., "Minimal Error Drift in Frequency Scalability for Motion-Compensated DCT Coding," IEEE Transactions on Circuits and Systems for Video Technology, pp. 392-406, vol. 4, No. 4, Aug. 1994.

Vetro, Anthony et al., "Minimum Drift Architectures for 3-Layer Scalable DTV Decoding," IEEE Transactions on Consumer Electronics, pp. 527-536, vol. 44, No. 3, Aug. 1998.

Lee, Dong-Ho et al., "HDTV Video Decoder Which Can Be Implemented With Low Complexity," IEEE International Conference on Consumer Electronics, pp. 6-7, 1994.

Sun, Huifang, "Hierarchical Decoder For MPEG Compressed Video Data," IEEE Transactions on Consumer Electronics, pp. 559-564, vol. 39, No. 3, Aug. 1993.

Yu, Haoping et al., "Block-Based Image Processor for Memory Efficient MPEG Video Decoding," 1999 IEEE International Conference on Consumer Electronics, pp. 114-115, 1999.

Power TV, Inc., Eagle™ Graphics/Audio Media Compositor Data Sheet, Version 1.7, Feb. 27, 1997. pp. 63.

Plaintiff and Counterdefendant Qualcomm Incorporated's Preliminary Invalidity Contentious For U.S. Patent 6,501,480 and 6,570,579.

Thomas Porter & Tom Duff, "Compositing Digital Images", Computer Graphics, vol. 18, No. 3, Jul. 1984, pp. 253-259.

Akeley, K. & Jermoluk T., "High-Performance Polygon Rendering," 22 Computer Graphics No. 4 (ACM Aug. 1988).

Apgar, B., et al., "A Display System for the Stellar Graphics Superconductor Model GS 1000," 22 Computer Graphics No. 4 (ACM Aug. 1988).

Asal, M.D., et al., "Novel Architecture for a High Performance Full Custom Graphics Processor," (IEEE 1989).

Awaga, M., et al., "3D Graphics Processor Chip Set," (IEEE Dec. 1995).

Cox, M. & Bhandari, N., "Architectural Implications of Hardware-Accelerated Bucket Rendering on the PC," (Association for Computing Machinary SIGGRAPH/Eurographics Workshop 1997).

Cyrix Corporation Manual, copyrighted 1996, 1997, and all underlying development work.

Deering, M., et al., "The Triangle Processor and Normal Vector Shader: A VLSI System for High Performance Graphics," 22 Computer Graphics No. 4 (ACM Aug. 1998).

Donovan, W., et al., "Pixel Processing in a Memory Controller," (IEEE Computer Graphics and Applications 1995).

Dutton, T., "The Design of the DEC 3000 Model 500 AXP Workstation," (IEEE 1993).

Foley, James, D., et al., "Introduction to Computer Graphics," (Addison-Wesley Publishing Co. 1994) ("Introduction to Computer Graphics").

Galbi, D., et al., "An MPEG-1 Audio/Video Decoder with Run-Length Compressed Antialiased Video Overlays," (1995 IEEE International Solid-State Circuits Conference).

Glaskowsky, Peter, "Cyrix Creates Ultimate CPU for Games," Microprocessor Report, Dec. 8, 1997.

Glaskowsky, Peter, "Intel Displays 740 Graphics Chip: Auburn Sets New Standard for Quality—But Not Speed," Microprocessor Report No. 2, Feb. 16, 1998.

Gwennap, L., "Verite: A Programmable 3D Chip: Rendition Uses Internal RISC CPU for Versatility, Performance," 10 Microprocessor Report No. 6, May 6, 1996.

Hosotanl S., et al., "A Display Processor Conforming to all DTV Formats with 188-TAP FIR Filters and 284 Kb FIFO Memories," (IEEE 1997 (Manuscript received Jun. 13, 1997)).

Knittel, G. & Straber, W., "VIZARD—Visualization Accelerator for Realtime Display," (Association for Computing Machinery SIGGRAPH/Eurographics Workshop 1997).

Lewis, R., et al., "Delivering PCI in HP B-Class and C-Class Workstations: A Case Study in the Challenges of Interfacing with Industry Standards," (Hewlett-Packard Journal May 1998).

Manepally, R. & Sprague, D., "Intel's i750 (R) Video Processor—The Programmable Solution," (IEEE 1991).

McCormack, J., et al., "Neon: A Single-Chip 3D Workstation Graphics Accelerator," (SIGGRAPH Eurograph Workshop Graph Hardware Aug. 31, -Sep. 1, 1998).

Norrod, F. & Wawrzynak, R., "A Multimedia-Enhanced x88 Processor, Digest of Technical Papers," ISSCC96 (Feb. 9, 1996).

Oguchi, T., et al., "A Single-Chip Graphic Display Controller," (1981 IEEE International Solid-State Circuits Conference).

Soferman, Z., et al., "Advanced Graphics Behind Medical Virtual Reality: Evolution of Algorithms, Hardware, and Software Interfaced," 86 Proceedings of the IEEE No. 3 (IEEE Mar. 1998 (Manuscript received Jul. 3, 1997)).

Scott, N., et al., "An Overview of the Visualize fx Graphics Accelerator Hardware," (Hewlett-Packard Journal May 1998) and all underlying development work ("HP").

Sumi, M., et al., "A 40-Mpixel/s Bit Block Transfer Graphics Processor," (IEEE 1989).

Tobias, R., "The LR33020 GraphX Processor: A Single Chip X-Terminal Controller," (IEEE 1992).

Watkins, J., et al., A Memory Controller with an Integrated Graphics Processor (IEEE 1993).

Yao, Yong, "Samsung Launches Media Processor: MSP Is Designed for Microsoft's New 3D-Software Architecture," 10 Microprocessor Report No. 11, Aug. 26, 1996.

Yao, Yong, "Competition Heats Up in 3D Accelerators: Market Hungers for a Unified Multimedia Platform from Microsoft," 10 Microprocessor Report No. 15, Nov. 18, 1996.

Yao, Yong, "Chromatic's Mpact 2 Boosts 3D: Mpact/3000 Becomes First Media Processor to Ship in Volume," 10 Microprocessor Report No. 15, Nov. 18, 1996.

Power TV, Inc., Eagle™ Graphics/Audio Media Compositor Data Sheet, Version 1.7, Feb. 27, 1997, pp. 63.

Berekovic, M. & Pirsch, P., "Architecture of a Coprocessor Module for Image Compositing," (IEEE 1998).

Blinn, J., "Compositing, Part I: Theory," (IEEE Sep. 1994).

Jaspers, et al., "A Flexible Heterogeneous Video Processor System for Television Applications," (IEEE Sep. 25, 1998).

Li, R., et al., "A Flexible Display Module for DVD and Set-Top Box Applications," (IEEE Transactions on Consumer Electronics Aug. 1997 (Manuscript received Jun. 13, 1997)).

Ostermann, J., "Coding of Arbitrarily Shaped Objects with Binary and Greyscale Alpha-Maps: What Can MPEG-4 Do for You?," (Proceedings of the 1998 IEEE International Symposium on Circuits and Systems, May 31-Jun. 3, 1998, vol. 5).

Stytz, et al., "Three-Dimensional Medical Imaging: Algorithms and Computer Systems," (ACM Computing Surveys, Dec. 1991).

Wang, J. & Adelson, E., "Representing Moving Images with Layers," (IEEE Transactions on Image Processing, Sep. 1994).

Vetro, Anthony et al., "Minimal Drift Architectures for 3-Layer Scalable DTV Decoding," IEEE Transactions on Consumer Electronics, pp. 527-536, vol. 44, No. 3, Aug. 1998.

Sun, Huifang, "Hierarchical Decoder for MPEG Compressed Video Data," IEEE Transactions for Consumer Electronics, pp. 559-564, vol. 39, No. 3, Aug. 1993.

* cited by examiner

GRAPHICS DISPLAY SYSTEM WITH VIDEO SCALER

CROSS-REFERENCE TO RELATED APPLICATIONS

This application is a continuation of U.S. patent application Ser. No. 09/437,326 now U.S. Pat. No. 6,661,427, which claims the benefit of the filing date of U.S. provisional patent application No. 60/107,875, filed Nov. 9, 1998 and entitled "Graphics Chip Architecture," the contents of which are hereby incorporated by reference. This application is related to U.S. patent application Ser. No. 09/437,208, filed Nov. 9, 1999, now issued as U.S. Pat. No. 6,570,579 on May 27, 2003 and entitled "Graphics Display System," the contents of which are hereby incorporated by reference.

FIELD OF THE INVENTION

The present invention relates generally to integrated circuits, and more particularly to an integrated circuit graphics display system.

BACKGROUND OF THE INVENTION

Graphics display systems are typically used in television control electronics, such as set top boxes, integrated digital TVs, and home network computers. Graphics display systems typically include a display engine that may perform display functions. The display engine is the part of the graphics display system that receives display pixel data from any combination of locally attached video and graphics input ports, processes the data in some way, and produces final display pixels as output.

This application includes references to both graphics and video, which reflects in certain ways the structure of the hardware itself. This split does not, however, imply the existence of any fundamental difference between graphics and video, and in fact much of the functionality is common to both. Graphics as used herein may include graphics, text and video.

SUMMARY OF THE INVENTION

The present invention provides a graphics display system having a novel video scaler. The video scaler determines whether it will require less memory bandwidth to scale a video image before writing the video image to memory or after reading the video image from memory. The video scaler includes a scaler engine that scales the video image either before writing the video image to memory or after reading the video image from memory, depending on which operation requires less memory bandwidth.

DETAILED DESCRIPTION OF A PRESENTLY PREFERRED EMBODIMENT

I. Graphics Display System Architecture

Figure 1:
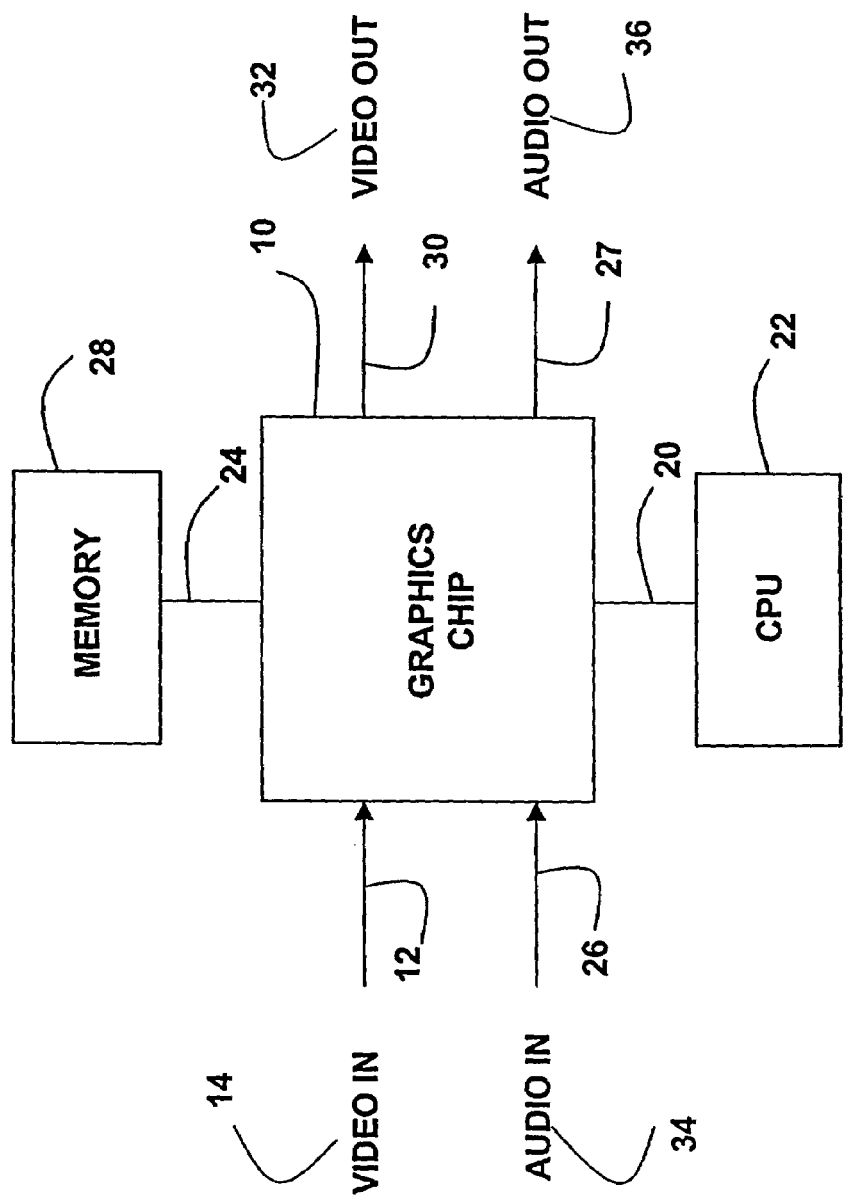
FIG. 1 is a block diagram of an integrated circuit graphics display system according to a presently preferred embodiment of the invention.

Referring to FIG. 1, the graphics display system according to the present invention is preferably contained in an integrated circuit 10. The integrated circuit may include inputs 12 for receiving video signals 14, a bus 20 for connecting to a CPU 22, a bus 24 for transferring data to and from memory 28, and an output 30 for providing a video output signal 32. The system may further include an input 26 for receiving audio input 34 and an output 27 for providing audio output 36.

The graphic display system accepts video input signals that may include analog video signals, digital video signals, or both. The analog signals may be, for example, NTSC, PAL and SECAM signals or any other conventional type of analog signal. The digital signals may be in the form of decoded MPEG signals or other format of digital video. In an alternate embodiment, the system includes an on-chip decoder for decoding the MPEG or other digital video signals input to the system. Graphics data for display is produced by any suitable graphics library software, such as Direct Draw marketed by Microsoft Corporation, and is read from the CPU 22 into the memory 28. The video output signals 32 may be analog signals, such as composite NTSC, PAL, Y/C (S-video), SECAM or other signals that include video and graphics information. In an alternate embodiment, the system provides serial digital video output to an on-chip or off-chip serializer that may encrypt the output.

The graphics display system memory 28 is preferably a unified synchronous dynamic random access memory (SDRAM) that is shared by the system, the CPU 22 and other peripheral components. In the preferred embodiment the CPU uses the unified memory for its code and data while the graphics display system performs all graphics, video and audio functions assigned to it by software. The amount of memory and CPU performance are preferably tunable by the system designer for the desired mix of performance and memory cost. In the preferred embodiment, a set-top box is implemented with SDRAM that supports both the CPU and graphics.

Figure 2:
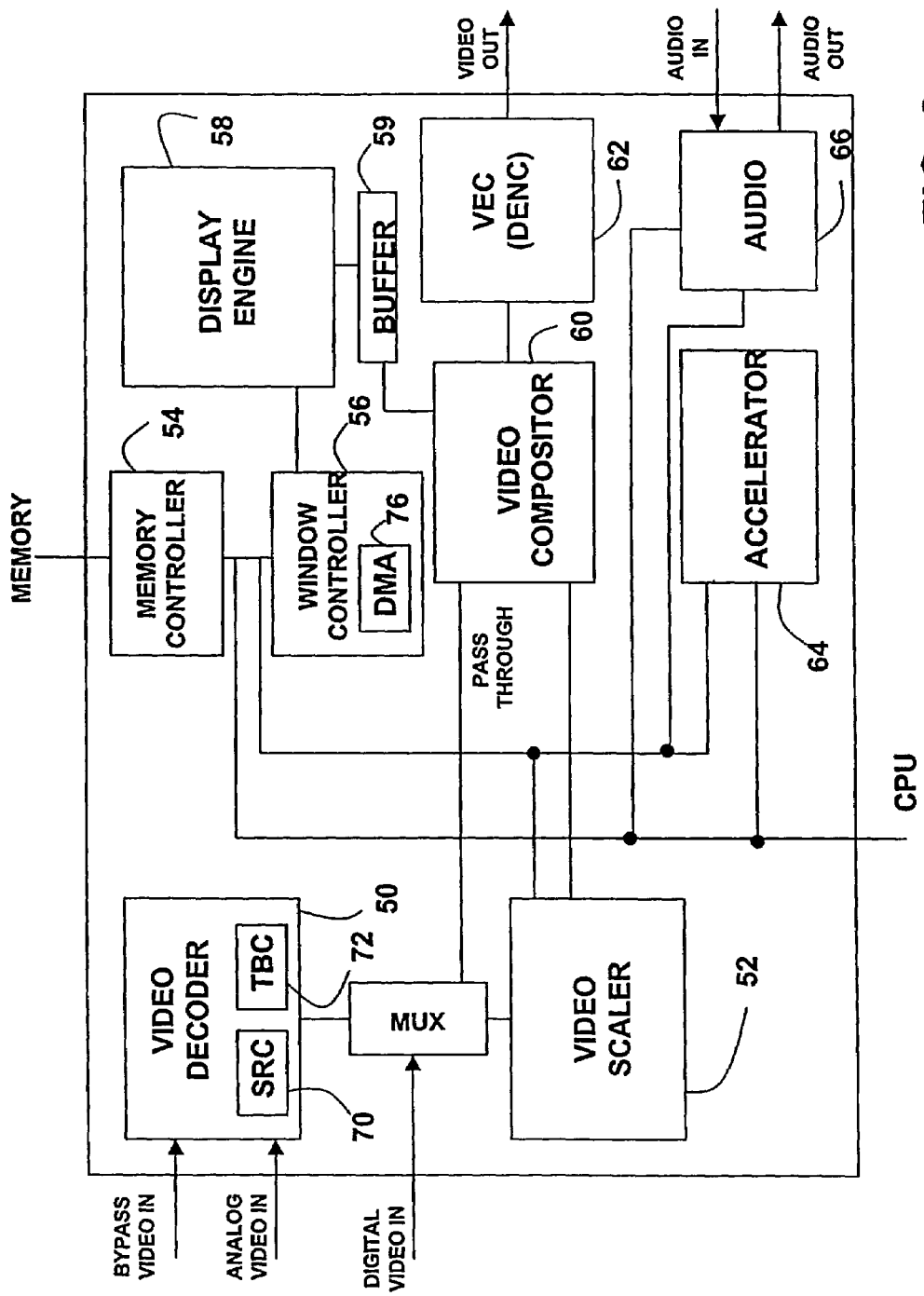
FIG. 2 is a block diagram of certain functional blocks of the system.

Referring to FIG. 2, the graphics display system preferably includes a video decoder 50, video scaler 52, memory controller 54, window controller 56, display engine 58, video compositor 60, and video encoder 62. The system may optionally include a graphics accelerator 64 and an audio engine 66. The system may display graphics, passthrough video, scaled video or a combination of the different types of video and graphics. Passthrough video includes digital or analog video that is not captured in memory. The passthrough video may be selected from the analog video or the digital video by a multiplexer. Bypass video, which may come into the chip on a separate input, includes analog video that is digitized off-chip into conventional YUV (luma chroma) format by any suitable decoder, such as the BT829 decoder, available from Brooktree Corporation, San Diego, Calif. The YUV format may also be referred to as YCrCb format where Cr and Cb are equivalent to U and V, respectively.

The video decoder (VDEC) 50 preferably digitizes and processes analog input video to produce internal YUV component signals with separated luma and chroma components. In an alternate embodiment, the digitized signals may be processed in another format, such as RGB. The VDEC 50 preferably includes a sample rate converter 70 and a time base corrector 72 that together allow the system to receive non-standard video signals, such as signals from a VCR. The time base corrector 72 enables the video encoder to work in passthrough mode, and corrects digitized analog video in the time domain to reduce or prevent jitter.

The video scaler 52 may perform both downscaling and upscaling of digital video and analog video as needed. In the preferred embodiment, scale factors may be adjusted continuously from a scale factor of much less than one to a scale factor of four. With both analog and digital video input, either one may be scaled while the other is displayed full size at the same time as passthrough video. Any portion of the input may be the source for video scaling. To conserve memory and bandwidth, the video scaler preferably downscales before capturing video frames to memory, and upscales after reading from memory, but preferably does not perform both upscaling and downscaling at the same time.

The memory controller 54 preferably reads and writes video and graphics data to and from memory by using burst accesses with burst lengths that may be assigned to each task. The memory is any suitable memory such as SDRAM. In the preferred embodiment, the memory controller includes two substantially similar SDRAM controllers, one primarily for the CPU and the other primarily for the graphics display system, while either controller may be used for any and all of these functions.

The graphics display system preferably processes graphics data using logical windows, also referred to as viewports, surfaces, sprites, or canvasses, that may overlap or cover one another with arbitrary spatial relationships. Each window is preferably independent of the others. The windows may consist of any combination of image content, including anti-aliased text and graphics, patterns, GIF images, JPEG images, live video from MPEG or analog video, three dimensional graphics, cursors or pointers, control panels, menus, tickers, or any other content, all or some of which may be animated.

Graphics windows are preferably characterized by window descriptors. Window descriptors are data structures that describe one or more parameters of the graphics window. Window descriptors may include, for example, image pixel format, pixel color type, alpha blend factor, location on the screen, address in memory, depth order on the screen, or other parameters. The system preferably supports a wide variety of pixel formats, including RGB 16, RGB 15, YUV 4:2:2 (ITU-R 601), CLUT2, CLUT4, CLUT8 or others. In addition to each window having its own alpha blend factor, each pixel in the preferred embodiment has its own alpha value. In the preferred embodiment, window descriptors are not used for video windows. Instead, parameters for video windows, such as memory start address and window size are stored in registers associated with the video compositor.

In operation, the window controller 56 preferably manages both the video and graphics display pipelines. The window controller preferably accesses graphics window descriptors in memory through a direct memory access (DMA) engine 76. The window controller may sort the window descriptors according to the relative depth of their corresponding windows on the display. For graphics windows, the window controller preferably sends header information to the display engine at the beginning of each window on each scan line, and sends window header packets to the display engine as needed to display a window. For video, the window controller preferably coordinates capture of non-passthrough video into memory, and transfer of video between memory and the video compositor.

The display engine 58 preferably takes graphics information from memory and processes it for display. The display engine preferably converts the various formats of graphics data in the graphics windows into YUV component format, and blends the graphics windows to create blended graphics output having a composite alpha value that is based on alpha values for individual graphics windows, alpha values per pixel, or both. In the preferred embodiment, the display engine transfers the processed graphics information to memory buffers that are configured as line buffers. In an alternate embodiment, the buffer may include a frame buffer. In another alternate embodiment, the output of the display engine is transferred directly to a display or output block without being transferred to memory buffers.

The video compositor 60 receives one or more types of data, such as blended graphics data, video window data, passthrough video data and background color data, and produces a blended video output. The video encoder 62 encodes the blended video output from the video compositor into any suitable display format such as composite NTSC, PAL, Y/C (S-video), SECAM or other signals that may include video information, graphics information, or a combination of video and graphics information. In an alternate embodiment, the video encoder converts the blended video output of the video compositor into serial digital video output using an on-chip or off chip serializer that may encrypt the output.

The graphics accelerator 64 preferably performs graphics operations that may require intensive CPU processing, such as operations on three dimensional graphics images. The graphics accelerator may be programmable. The audio engine 66 preferably supports applications that create and play audio locally within a set-top box and allow mixing of the locally created audio with audio from a digital audio source, such as MPEG or Dolby, and with digitized analog audio. The audio engine also preferably supports applications that capture digitized baseband audio via an audio capture port and store sounds in memory for later use, or that store audio to memory for temporary buffering in order to delay the audio for precise lip-syncing when frame-based video time correction is enabled.

Figure 3:
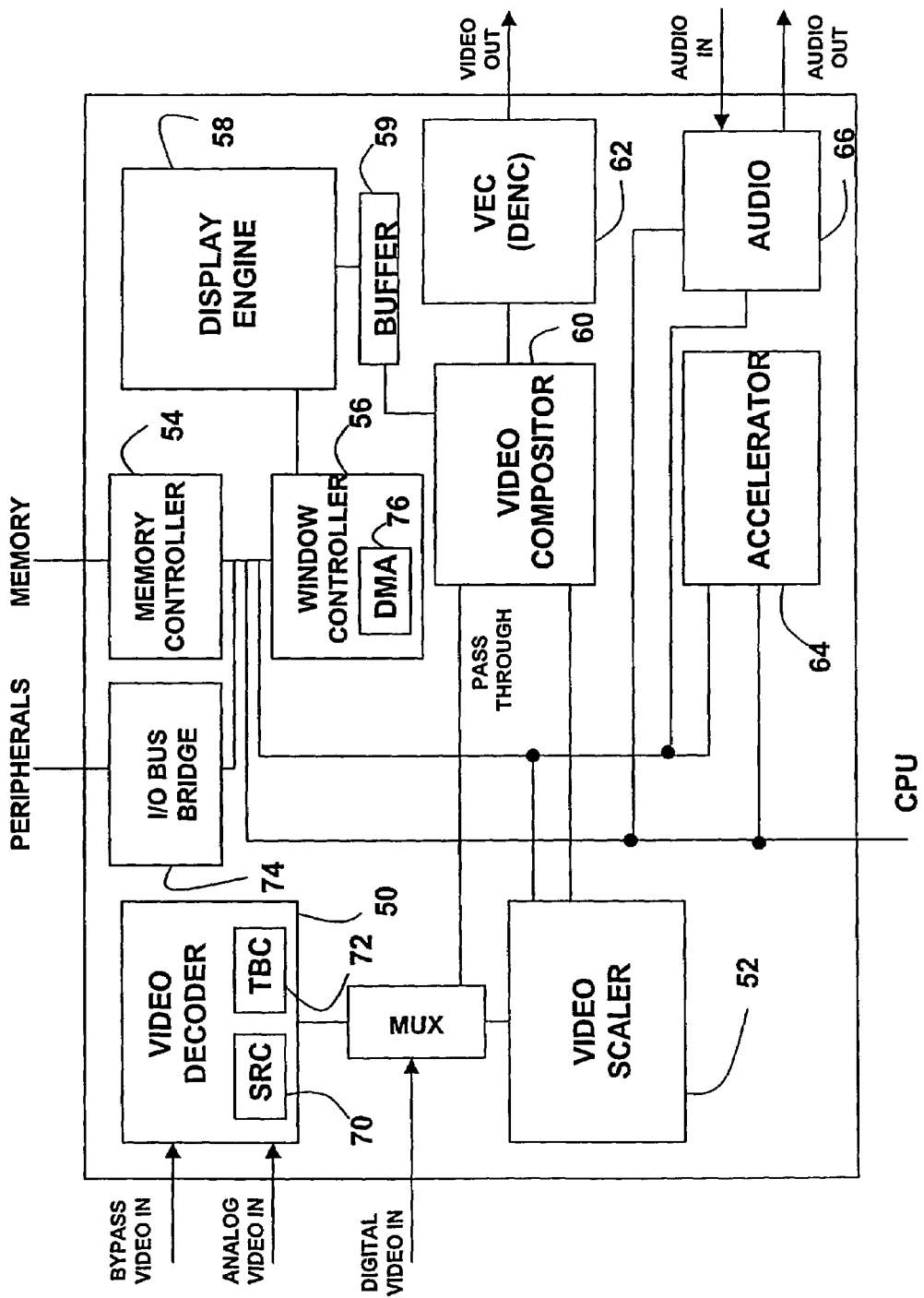
FIG. 3 is a block diagram of an alternate embodiment of the system of FIG. 2 that incorporates an on-chip I/O bus.

Referring to FIG. 3, in an alternate embodiment of the present invention, the graphics display system further includes an I/O bus 74 connected between the CPU 22, memory 28 and one or more of a wide variety of peripheral devices, such as flash memory, ROM, MPEG decoders, cable modems or other devices. The on-chip I/O bus 74 of the present invention preferably eliminates the need for a separate interface connection, sometimes referred in the art to as a north bridge. The I/O bus preferably provides high speed access and data transfers between the CPU, the memory and the peripheral devices, and may be used to support the full complement of devices that may be used in a full featured set-top box or digital TV. In the preferred embodiment, the I/O bus is compatible with the 68000 bus definition, including both active DSACK and passive DSACK (e.g., ROM/flash devices), and it supports external bus masters and retry operations as both master and slave. The bus preferably supports any mix of 32-bit, 16-bit and 8-bit devices, and operates at a clock rate of 33 MHz. The clock rate is preferably asynchronous with (not synchronized with) the CPU clock to enable independent optimization of those subsystems.

Figure 4:
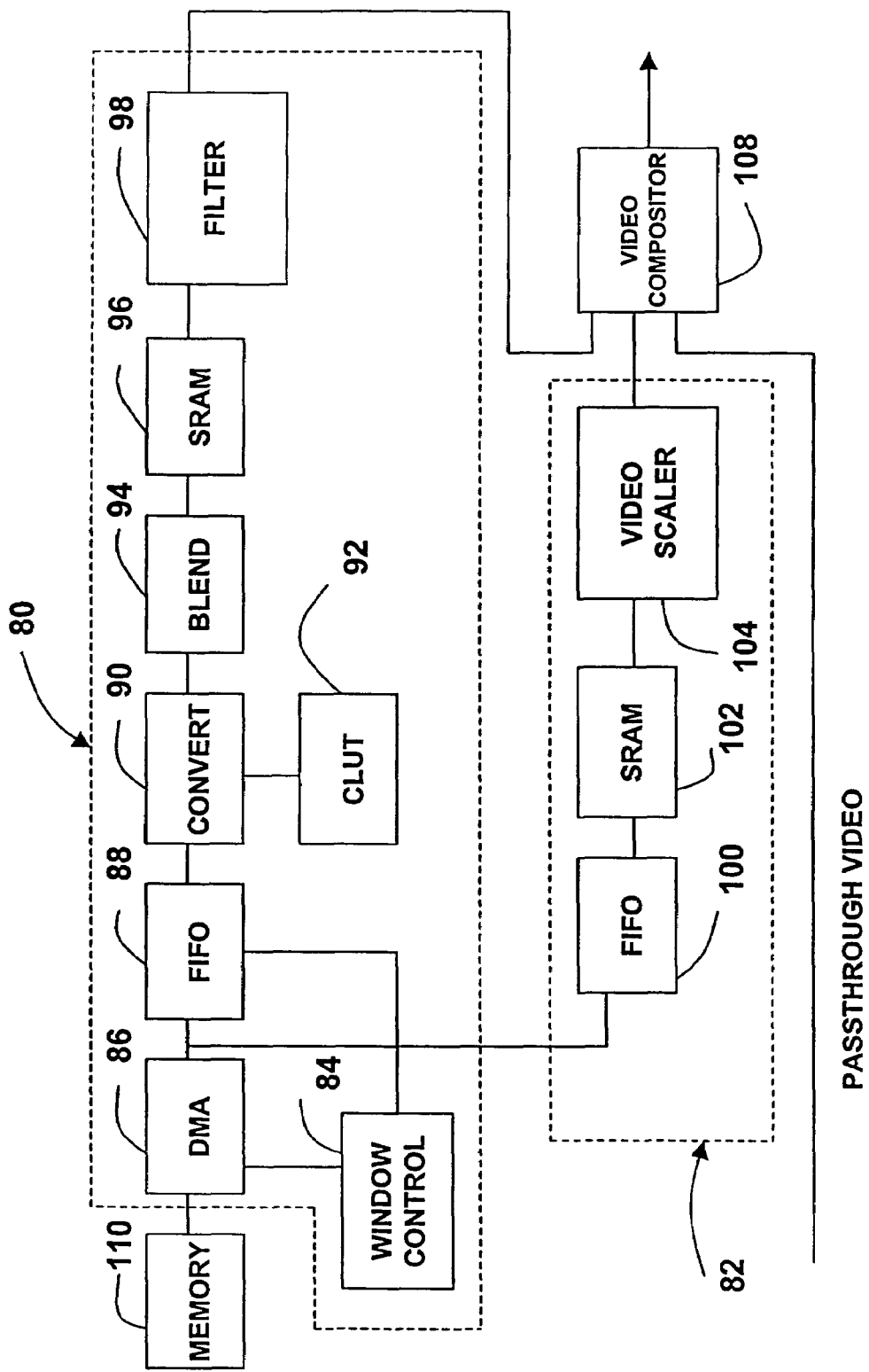
FIG. 4 is a functional block diagram of exemplary video and graphics display pipelines.

Referring to FIG. 4, the graphics display system generally includes a graphics display pipeline 80 and a video display pipeline 82. The graphics display pipeline preferably contains functional blocks, including window control block 84, DMA (direct memory access) block 86, FIFO (first-in-first-out memory) block 88, graphics converter block 90, color look up table (CLUT) block 92, graphics blending block 94, static random access memory (SRAM) block 96, and filtering block 98. The system preferably spatially processes the graphics data independently of the video data prior to blending.

In operation, the window control block 84 obtains and stores graphics window descriptors from memory and uses the window descriptors to control the operation of the other blocks in the graphics display pipeline. The windows may be processed in any order. In the preferred embodiment, on each scan line, the system processes windows one at a time from back to front and from the left edge to the right edge of the window before proceeding to the next window. In an alternate embodiment, two or more graphics windows may be processed in parallel. In the parallel implementation, it is possible for all of the windows to be processed at once, with the entire scan line being processed left to right. Any number of other combinations may also be implemented, such as processing a set of windows at a lower level in parallel, left to right, followed by the processing of another set of windows in parallel at a higher level.

The DMA block 86 retrieves data from memory 110 as needed to construct the various graphics windows according to addressing information provided by the window control block. Once the display of a window begins, the DMA block preferably retains any parameters that may be needed to continue to read required data from memory. Such parameters may include, for example, the current read address, the address of the start of the next lines, the number of bytes to read per line, and the pitch. Since the pipeline preferably includes a vertical filter block for anti-flutter and scaling purposes, the DMA block preferably accesses a set of adjacent display lines in the same frame, in both fields. If the output of the system is NTSC or other form of interlaced video, the DMA preferably accesses both fields of the interlaced final display under certain conditions, such as when the vertical filter and scaling are enabled. In such a case, all lines, not just those from the current display field, are preferably read from memory and processed during every display field. In this embodiment, the effective rate of reading and processing graphics is equivalent to that of a non-interlaced display with a frame rate equal to the field rate of the interlaced display.

The FIFO block 88 temporarily stores data read from the memory 110 by the DMA block 86, and provides the data on demand to the graphics converter block 90. The FIFO may also serve to bridge a boundary between different clock domains in the event that the memory and DMA operate under a clock frequency or phase that differs from the graphics converter block 90 and the graphics blending block 94. In an alternate embodiment, the FIFO block is not needed. The FIFO block may be unnecessary, for example, if the graphics converter block processes data from memory at the rate that it is read from the memory and the memory and conversion functions are in the same clock domain.

In the preferred embodiment, the graphics converter block 90 takes raw graphics data from the FIFO block and converts it to YUValpha (YUVa) format. Raw graphics data may include graphics data from memory that has not yet been processed by the display engine. One type of YUVa format that the system may use includes YUV 4:2:2 (i.e. two U and V samples for every four Y samples) plus an 8-bit alpha value for every pixel, which occupies overall 24 bits per pixel. Another suitable type of YUVa format includes YUV 4:4:4 plus the 8-bit alpha value per pixel, which occupies 32 bits per pixel. In an alternate embodiment, the graphics converter may convert the raw graphics data into a different format, such as RGBalpha.

The alpha value included in the YUVa output may depend on a number of factors, including alpha from chroma keying in which a transparent pixel has an alpha equal to zero, alpha per CLUT entry, alpha from Y (luma), or alpha per window where one alpha value characterizes all of the contents of a given window.

The graphics converter block 90 preferably accesses the CLUT 92 during conversion of CLUT formatted raw graphics data. In one embodiment of the present invention, there is only one CLUT. In an alternate embodiment, multiple CLUTs are used to process different graphics windows having graphics data with different CLUT formats. The CLUT may be rewritten by retrieving new CLUT data via the DMA block when required. In practice, it typically takes longer to rewrite the CLUT than the time available in a horizontal blanking interval, so the system preferably allows one horizontal line period to change the CLUT. Non-CLUT images may be displayed while the CLUT is being changed. The color space of the entries in the CLUT is preferably in YUV but may also be implemented in RGB.

The graphics blending block 94 receives output from the graphics converter block 90 and preferably blends one window at a time along the entire width of one scan line, with the back-most graphics window being processed first. The blending block uses the output from the converter block to modify the contents of the SRAM 96. The result of each pixel blend operation is a pixel in the SRAM that consists of the weighted sum of the various graphics layers up to and including the present one, and the appropriate alpha blend value for the video layers, taking into account the graphics layers up to and including the present one.

The SRAM 96 is preferably configured as a set of graphics line buffers, where each line buffer corresponds to a single display line. The blending of graphics windows is preferably performed one graphics window at a time on the display line that is currently being composited into a line buffer. Once the display line in a line buffer has been completely composited so that all the graphics windows on that display line have been blended, the line buffer is made available to the filtering block 98.

The filtering block 98 preferably performs both anti-flutter filtering (AFF) and vertical sample rate conversion (SRC) using the same filter. This block takes input from the line buffers and performs finite impulse response polyphase filtering on the data. While anti-flutter filtering and vertical axis SRC are done in the vertical axis, there may be different functions, such as horizontal SRC or scaling that are performed in the horizontal axis. In the preferred embodiment, the filter takes input from only vertically adjacent pixels at one time. It multiplies each input pixel times a specified coefficient, and sums the result to produce the output. The polyphase action means that the coefficients, which are samples of an approximately continuous impulse response, may be selected from a different fractional-pixel phase of the impulse response every pixel. In an alternate embodiment, where the filter performs horizontal scaling, appropriate coefficients are selected for a finite impulse response polyphase filter to perform the horizontal scaling. In an alternate embodiment, both horizontal and vertical filtering and scaling can be performed.

The video display pipeline 82 may include a FIFO block 100, an SRAM block 102, and a video scaler 104. The video display pipeline portion of the architecture is similar to that of the graphics display pipeline, and it shares some elements with it. In the preferred embodiment, the video pipeline supports up to one scaled video window per scan line, one passthrough video window, and one background color, all of which are logically behind the set of graphics windows. The order of these windows, from back to front, is preferably fixed as background color, then passthrough video, then scaled video.

The video windows are preferably in YUV format, although they may be in either 4:2:2 or 4:2:0 variants or other variants of YUV, or alternatively in other formats such as RGB. The scaled video window may be scaled up in both directions by the display engine, with a factor that can range up to four in the preferred embodiment. Unlike graphics, the system generally does not have to correct for square pixel aspect ratio with video. The scaled video window may be alpha blended into passthrough video and a background color, preferably using a constant alpha value for each video signal.

The FIFO block 100 temporarily stores captured video windows for transfer to the video scaler 104. The video scaler preferably includes a filter that performs both upscaling and downscaling. The scaler function may be a set of two polyphase SRC functions, one for each dimension. The vertical SRC may be a four-tap filter with programmable coefficients in a fashion similar to the vertical filter in the graphics pipeline, and the horizontal filter may use an 8-tap SRC, also with programmable coefficients. In an alternate embodiment, a shorter horizontal filter is used, such as a 4-tap horizontal SRC for the video upscaler. Since the same filter is preferably used for downscaling, it may be desirable to use more taps than are strictly needed for upscaling to accommodate low pass filtering for higher quality downscaling.

In the preferred embodiment, the video pipeline uses a separate window controller and DMA. In an alternate embodiment, these elements may be shared. The FIFOs are logically separate but may be implemented in a common SRAM.

The video compositor block 108 blends the output of the graphics display pipeline, the video display pipeline, and passthrough video. The background color is preferably blended as the lowest layer on the display, followed by passthrough video, the video window and blended graphics. In the preferred embodiment, the video compositor composites windows directly to the screen line-by-line at the time the screen is displayed, thereby conserving memory and bandwidth. The video compositor may include, but preferably does not include, display frame buffers, double-buffered displays, off-screen bit maps, or blitters.

Figure 5:
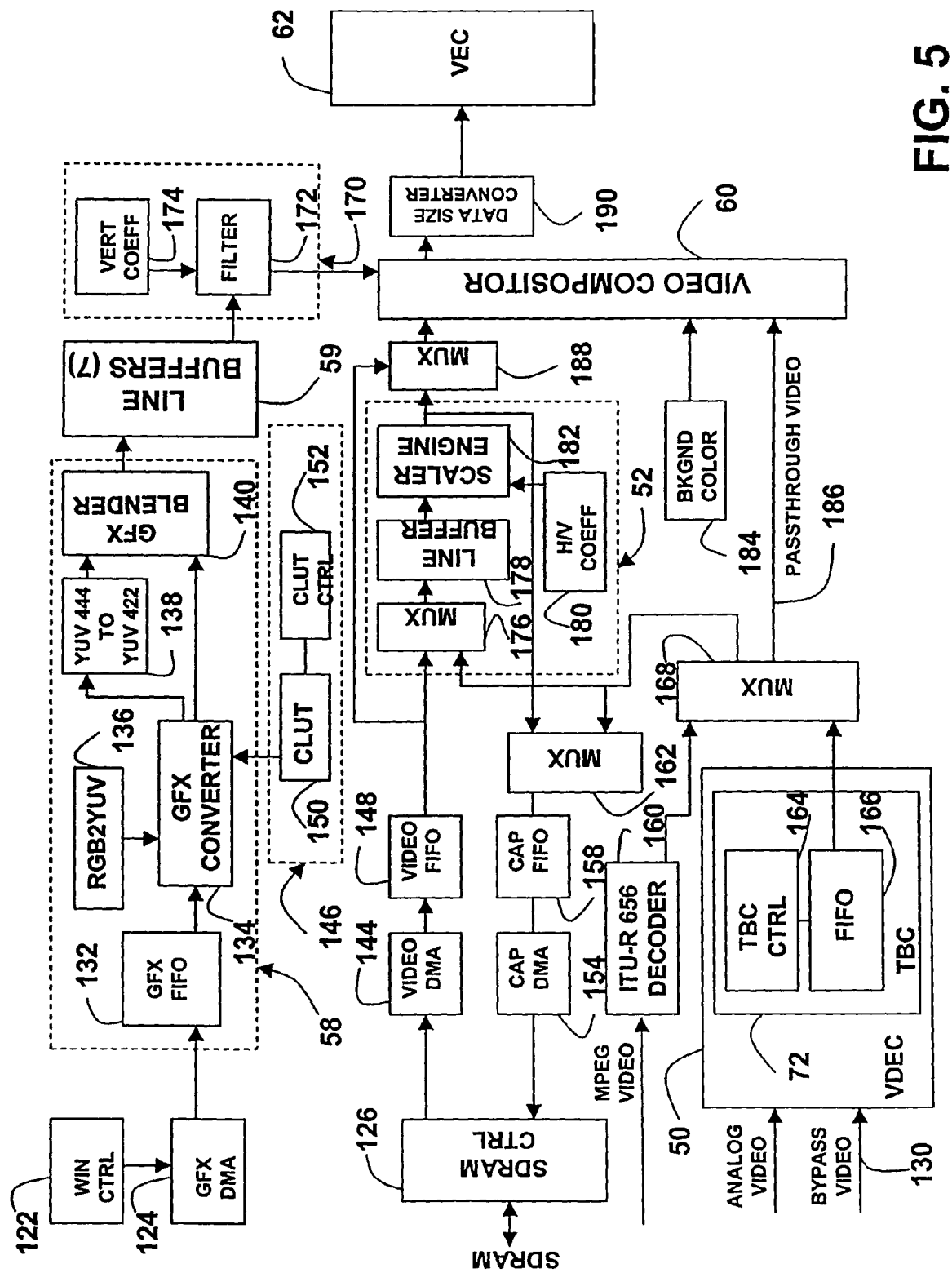
FIG. 5 is a more detailed block diagram of the graphics and video pipelines of the system.

Referring to FIG. 5, the display engine 58 preferably includes graphics FIFO 132, graphics converter 134, RGB-to-YUV converter 136, YUV-444-to-YUV422 converter 138 and graphics blender 140. The graphics FIFO 132 receives raw graphics data from memory through a graphics DMA 124 and passes it to the graphics converter 134, which preferably converts the raw graphics data into YUV 4:4:4 format or other suitable format. A window controller 122 controls the transfer of raw graphics data from memory to the graphics converter 132. The graphics converter preferably accesses the RGB-to-YUV converter 136 during conversion of RGB formatted data and the graphics CLUT 146 during conversion of CLUT formatted data. The RGB-to-YUV converter is preferably a color space converter that converts raw graphics data in RGB space to graphics data in YUV space. The graphics CLUT 146 preferably includes a CLUT 150, which stores pixel values for CLUT-formatted graphics data, and a CLUT controller 152, which controls operation of the CLUT.

The YUV444-to-YUV422 converter 138 converts graphics data from YUV 4:4:4 format to YUV 4:2:2 format. The term YUV 4:4:4 means, as is conventional, that for every four horizontally adjacent samples, there are four Y values, four U values, and four V values; the term YUV 4:2:2 means, as is conventional, that for every four samples, there are four Y values, two U values and two V values. The YUV444-to-YUV422 converter 138 is preferably a UV decimator that sub-samples U and V from four samples per every four samples of Y to two samples per every four samples of Y.

Graphics data in YUV 4:4:4 format and YUV 4:2:2 format preferably also includes four alpha values for every four samples. Graphics data in YUV 4:4:4 format with four alpha values for every four samples may be referred to as being in a YUV 4:4:4:4 format; graphics data in YUV 4:2:2 format with four alpha values for every four samples may be referred to as being in a YUV 4:4:2:2 format.

The YUV444-to-YUV422 converter may also perform low-pass filtering of UV and alpha. For example, if the graphics data with YUV 4:4:4 format has higher than desired frequency content, a low pass filter in the YUV444-to-YUV422 converter may be turned on to filter out high frequency components in the U and V signals, and to perform matched filtering of the alpha values.

The graphics blender 140 blends the YUV 4:2:2 signals together, preferably one line at a time using alpha blending, to create a single line of graphics from all of the graphics windows on the current display line. The filter 170 preferably includes a single 4-tap vertical polyphase graphics filter 172, and a vertical coefficient memory 174. The graphics filter may perform both anti-flutter filtering and vertical scaling. The filter preferably receives graphics data from the display engine through a set of seven line buffers 59, where four of the seven line buffers preferably provide data to the taps of the graphics filter at any given time.

In the preferred embodiment, the system may receive video input that includes one decoded MPEG video in ITU-R 656 format and one analog video signal. The ITU-R 656 decoder 160 processes the decoded MPEG video to extract timing and data information. In one embodiment, an on-chip video decoder (VDEC) 50 converts the analog video signal to a digitized video signal. In an alternate embodiment, an external VDEC such as the Brooktree BT829 decoder converts the analog video into digitized analog video and provides the digitized video to the system as bypass video 130.

Analog video or MPEG video may be provided to the video compositor as passthrough video. Alternatively, either type of video may be captured into memory and provided to the video compositor as a scaled video window. The digitized analog video signals preferably have a pixel sample rate of 13.5 MHz, contain a 16 bit data stream in YUV 4:2:2 format, and include timing signals such as top field and vertical sync signals.

The VDEC 50 includes a time base corrector (TBC) 72 comprising a TBC controller 164 and a FIFO 166. To provide passthrough video that is synchronized to a display clock preferably without using a frame buffer, the digitized analog video is corrected in the time domain in the TBC 72 before being blended with other graphics and video sources. During time base correction, the video input which runs nominally at 13.5 MHZ is synchronized with the display clock which runs nominally at 13.5 MHZ at the output; these two frequencies that are both nominally 13.5 MHz are not necessarily exactly the same frequency. In the TBC, the video output is preferably offset from the video input by a half scan line per field.

A capture FIFO 158 and a capture DMA 154 preferably capture the digitized analog video signals and MPEG video. The SDRAM controller 126 provides captured video frames to the external SDRAM. A video DMA 144 transfers the captured video frames to a video FIFO 148 from the external SDRAM.

The digitized analog video signals and MPEG video are preferably scaled down to less than 100% prior to being captured and are scaled up to more than 100% after being captured. The video scaler 52 is shared by both upscale and downscale operations. The video scaler preferably includes a multiplexer 176, a set of line buffers 178, a horizontal and vertical coefficient memory 180 and a scaler engine 182. The scaler engine 182 preferably includes a set of two polyphase filters, one for each of horizontal and vertical dimensions.

The vertical filter preferably includes a four-tap filter with programmable filter coefficients. The horizontal filter preferably includes an eight-tap filter with programmable filter coefficients. In the preferred embodiment, three line buffers 178 supply video signals to the scaler engine 182. The three line buffers 178 preferably are 720×16 two port SRAM. For vertical filtering, the three line buffers 178 may provide video signals to three of the four taps of the four-tap vertical filter while the video input provides the video signal directly to the fourth tap. For horizontal filtering, a shift register having eight cells in series may be used to provide inputs to the eight taps of the horizontal polyphase filter, each cell providing an input to one of the eight taps.

For downscaling, the multiplexer 168 preferably provides a video signal to the video scaler prior to capture. For upscaling, the video FIFO 148 provides a video signal to the video scaler after capture. Since the video scaler 52 is shared between downscaling and upscaling filtering, downscaling and upscaling operations are not performed at the same time in this particular embodiment.

In the preferred embodiment, the video compositor 60 blends signals from up to four different sources, which may include blended graphics from the filter 170, video from a video FIFO 148, passthrough video from a multiplexer 168, and background color from a background color module 184. Alternatively, various numbers of signals may be composited, including, for example, two or more video windows. The video compositor preferably provides final output signal to the data size converter 190, which serializes the 16-bit word sample into an 8-bit word sample at twice the clock frequency, and provides the 8-bit word sample to the video encoder 62.

The video encoder 62 encodes the provided YUV 4:2:2 video data and outputs it as an output of the graphics display system in any desired analog or digital format.

II. Window Descriptor and Solid Surface Description

Often in the creation of graphics displays, the artist or application developer has a need to include rectangular objects on the screen, with the objects having a solid color and a uniform alpha blend factor (alpha value). These regions (or objects) may be rendered with other displayed objects on top of them or beneath them. In conventional graphics devices, such solid color objects are rendered using the number of distinct pixels required to fill the region. It may be advantageous in terms of memory size and memory bandwidth to render such objects on the display directly, without expending the memory size or bandwidth required in conventional approaches.

In the preferred embodiment, video and graphics are displayed on regions referred to as windows. Each window is preferably a rectangular area of screen bounded by starting and ending display lines and starting and ending pixels on each display line. Raw graphics data to be processed and displayed on a screen preferably resides in the external memory. In the preferred embodiment, a display engine converts raw graphics data into a pixel map with a format that is suitable for display.

In one embodiment of the present invention, the display engine implements graphics windows of many types directly in hardware. Each of the graphics windows on the screen has its own value of various parameters, such as location on the screen, starting address in memory, depth order on the screen, pixel color type, etc. The graphics windows may be displayed such that they may overlap or cover each other, with arbitrary spatial relationships.

In the preferred embodiment, a data structure called a window descriptor contains parameters that describe and control each graphics window. The window descriptors are preferably data structures for representing graphics images arranged in logical surfaces, or windows, for display. Each data structure preferably includes a field indicating the relative depth of the logical surface on the display, a field indicating the alpha value for the graphics in the surface, a field indicating the location of the logical surface on the display, and a field indicating the location in memory where graphics image data for the logical surface is stored.

All of the elements that make up any given graphics display screen are preferably specified by combining all of the window descriptors of the graphics windows that make up the screen into a window descriptor list. At every display field time or a frame time, the display engine constructs the display image from the current window descriptor list. The display engine composites all of the graphics windows in the current window descriptor list into a complete screen image in accordance with the parameters in the window descriptors and the raw graphics data associated with the graphics windows.

With the introduction of window descriptors and real-time composition of graphics windows, a graphics window with a solid color and fixed translucency may be described entirely in a window descriptor having appropriate parameters. These parameters describe the color and the translucency (alpha) just as if it were a normal graphics window. The only difference is that there is no pixel map associated with this window descriptor. The display engine generates a pixel map accordingly and performs the blending in real time when the graphics window is to be displayed.

For example, a window consisting of a rectangular object having a constant color and a constant alpha value may be created on a screen by including a window descriptor in the window descriptor list. In this case, the window descriptor indicates the color and the alpha value of the window, and a null pixel format, i.e., no pixel values are to be read from memory. Other parameters indicate the window size and location on the screen, allowing the creation of solid color windows with any size and location. Thus, in the preferred embodiment, no pixel map is required, memory bandwidth requirements are reduced and a window of any size may be displayed.

Another type of graphics window that the window descriptors preferably describe is an alpha-only type window. The alpha-only type windows preferably use a constant color and preferably have graphics data with 2, 4 or 8 bits per pixel. For example, an alpha-4 format may be an alpha-only format used in one of the alpha-only type windows. The alpha-4 format specifies the alpha-only type window with alpha blend values having four bits per pixel. The alpha-only type window may be particularly useful for displaying anti-aliased text.

A window controller preferably controls transfer of graphics display information in the window descriptors to the display engine. In one embodiment, the window controller has internal memory to store eight window descriptors. In other embodiments, the window controller may have memory allocated to store more or less window descriptors. The window controller preferably reads the window descriptors from external memory via a direct memory access (DMA) module.

The DMA module may be shared by both paths of the display pipeline as well as some of the control logic, such as the window controller and the CLUT. In order to support the display pipeline, the DMA module preferably has three channels where the graphics pipeline and the video pipeline use separate DMA modules. These may include window descriptor read, graphics data read and CLUT read. Each channel has externally accessible registers to control the start address and the number of words to read.

Once the DMA module has completed a transfer as indicated by its start and length registers, it preferably activates a signal that indicates the transfer is complete. This allows the DMA module that sets up operations for that channel to begin setting up of another transfer. In the case of graphics data reads, the window controller preferably sets up a transfer of one line of graphics pixels and then waits for the DMA controller to indicate that the transfer of that line is complete before setting up the transfer of the next line, or of a line of another window.

Figure 6:
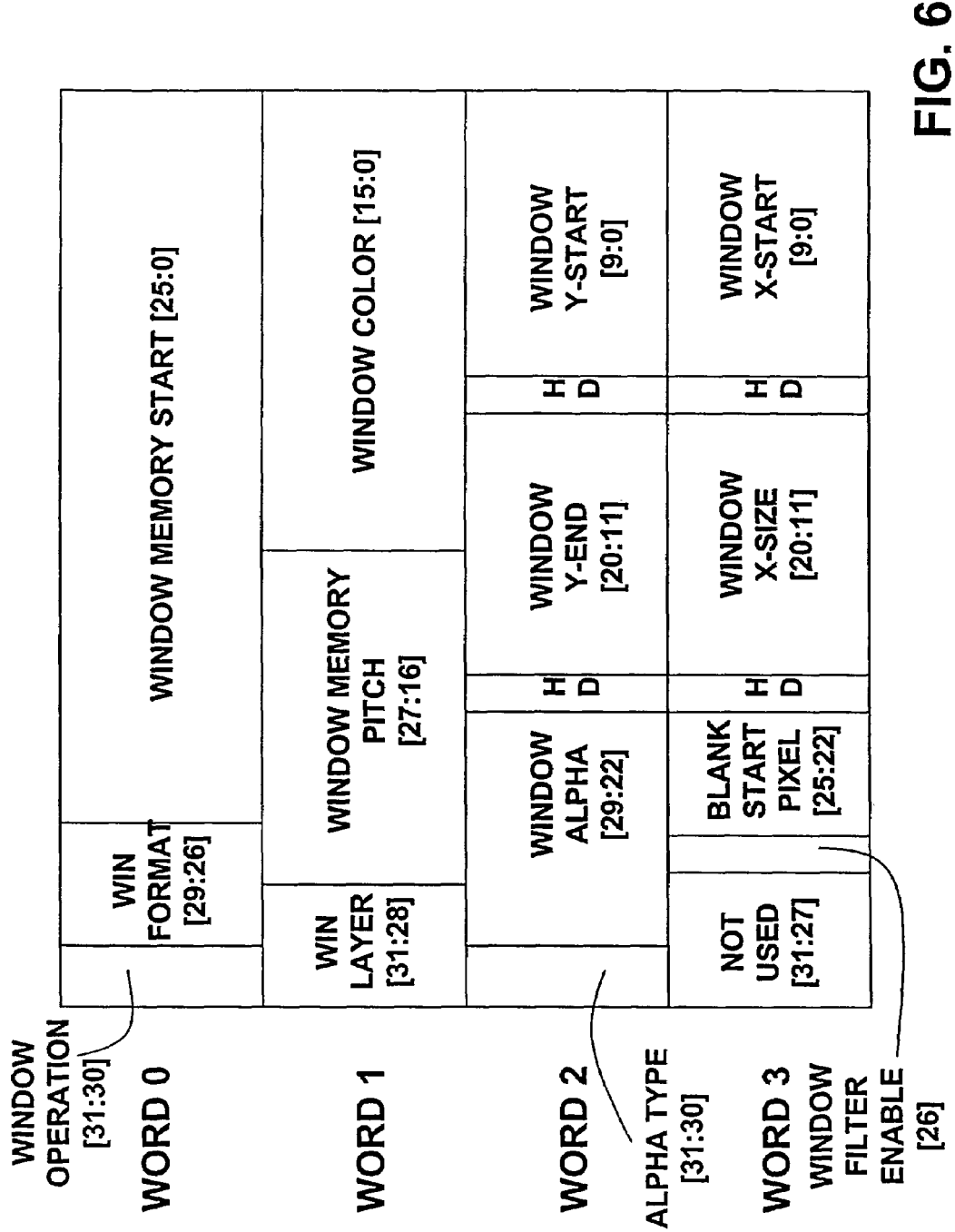
FIG. 6 is a map of an exemplary window descriptor for describing graphics windows and solid surfaces.

Referring to FIG. 6, each window descriptor preferably includes four 32-bit words (labeled Word 0 through Word 3) containing graphics window display information. Word 0 preferably includes a window operation parameter, a window format parameter and a window memory start address. The window operation parameter preferably is a 2-bit field that indicates which operation is to be performed with the window descriptor. When the window operation parameter is 00b, the window descriptor performs a normal display operation and when it is 01b, the window descriptor performs graphics color look-up table ("CLUT") re-loading. The window operation parameter of 10b is preferably not used. The window operation parameter of 11b preferably indicates that the window descriptor is the last of a sequence of window descriptors in memory.

The window format parameter preferably is a 4-bit field that indicates a data format of the graphics data to be displayed in the graphics window. The data formats corresponding to the window format parameter is described in Table 1 below.

TABLE 1

Graphics Data Formats

| win_format | Data Format | Data Format Description |
|---|---|---|
| 0000b | RGB16 | 5-BIT RED, 6-BIT GREEN, 5-BIT BLUE |
| 0001b | RGB15+1 | RGB15 plus one bit alpha (keying) |
| 0010b | RGBA4444 | 4-BIT RED, GREEN, BLUE, ALPHA |
| 0100b | CLUT2 | 2-bit CLUT with YUV and alpha in table |
| 0101b | CLUT4 | 4-bit CLUT with YUV and alpha in table |
| 0110b | CLUT8 | 8-bit CLUT with YUV and alpha in table |
| 0111b | ACLUT16 | 8-BIT ALPHA, 8-BIT CLUT INDEX |
| 1000b | ALPHA0 | Single win_alpha and single RGB win_color |
| 1001b | ALPHA2 | 2-bit alpha with single RGB win_color |

TABLE 1-continued

Graphics Data Formats

| win_ format | Data Format | Data Format Description |
|---|---|---|
| 1010b | ALPHA4 | 4-bit alpha with single RGB win_color |
| 1011b | ALPHA8 | 8-bit alpha with single RGB win_color |
| 1100b | YUV422 | U and V are sampled at half the rate of Y |
| 1111b | RESERVED | Special coding for blank line in new header, i.e., indicates an empty line |

The window memory start address preferably is a 26-bit data field that indicates a starting memory address of the graphics data of the graphics window to be displayed on the screen. The window memory start address points to the first address in the corresponding external SDRAM which is accessed to display data on the graphics window defined by the window descriptor. When the window operation parameter indicates the graphics CLUT reloading operation, the window memory start address indicates a starting memory address of data to be loaded into the graphics CLUT.

Word 1 in the window descriptor preferably includes a window layer parameter, a window memory pitch value and a window color value. The window layer parameter is preferably a 4-bit data indicating the order of layers of graphics windows. Some of the graphics windows may be partially or completely stacked on top of each other, and the window layer parameter indicates the stacking order. The window layer parameter preferably indicates where in the stack the graphics window defined by the window descriptor should be placed.

In the preferred embodiment, a graphics window with a window layer parameter of 0000b is defined as the bottom most layer, and a graphics window with a window layer parameter of 1111b is defined as the top most layer. Preferably, up to eight graphics windows may be processed in each scan line. The window memory pitch value is preferably a 12-bit data field indicating the pitch of window memory addressing. Pitch refers to the difference in memory address between two pixels that are vertically adjacent within a window.

The window color value preferably is a 16-bit RGB color, which is applied as a single color to the entire graphics window when the window format parameter is 1000b, 1000b, 1010b, or 1011b. Every pixel in the window preferably has the color specified by the window color value, while the alpha value is determined per pixel and per window as specified in the window descriptor and the pixel format. The engine preferably uses the window color value to implement a solid surface.

Word 2 in the window descriptor preferably includes an alpha type, a widow alpha value, a window y-end value and a window y-start value. The word 2 preferably also includes two bits reserved for future definition, such as high definition television (HD) applications. The alpha type is preferably a 2-bit data field that indicates the method of selecting an alpha value for the graphics window. The alpha type of 00b indicates that the alpha value is to be selected from chroma keying. Chroma keying determines whether each pixel is opaque or transparent based on the color of the pixel. Opaque pixels are preferably considered to have an alpha value of 1.0, and transparent pixels have an alpha value of 0, both on a scale of 0 to 1. Chroma keying compares the color of each pixel to a reference color or to a range of possible colors; if the pixel matches the reference color, or if its color falls within the specified range of colors, then the pixel is determined to be transparent. Otherwise it is determined to be opaque.

The alpha type of 01b indicates that the alpha value should be derived from the graphics CLUT, using the alpha value in each entry of the CLUT. The alpha type of 10b indicates that the alpha value is to be derived from the luminance Y. The Y value that results from conversion of the pixel color to the YUV color space, if the pixel color is not already in the YUV color, is used as the alpha value for the pixel. The alpha type of 11b indicates that only a single alpha value is to be applied to the entire graphics window. The single alpha value is preferably included as the window alpha value next.

The window alpha value preferably is an 8-bit alpha value applied to the entire graphics window. The effective alpha value for each pixel in the window is the product of the window alpha and the alpha value determined for each pixel. For example, if the window alpha value is 0.5 on a scale of 0 to 1, coded as 0x80, then the effective alpha value of every pixel in the window is one-half of the value encoded in or for the pixel itself. If the window format parameter is 1000b, i.e., a single alpha value is to be applied to the graphics window, then the per-pixel alpha value is treated as if it is 1.0, and the effective alpha value is equal to the window alpha value.

The window y-end value preferably is a 10-bit data field that indicates the ending display line of the graphics window on the screen. The graphics window defined by the window descriptor ends at the display line indicated by the window y-end value. The window y-start value preferably is a 10-bit data field that indicates a starting display line of the graphics window on a screen. The graphics window defined by the window descriptor begins at the display line indicated in the window y-start value. Thus, a display of a graphics window can start on any display line on the screen based on the window y-start value.

Word 3 in the window descriptor preferably includes a window filter enable parameter, a blank start pixel value, a window x-size value and a window x-start value. In addition, the word 3 includes two bits reserved for future definition, such as HD applications. Five bits of the 32-bit word 3 are not used. The window filter enable parameter is a 1-bit field that indicates whether low pass filtering is to be enabled during YUV 4:4:4 to YUV 4:2:2 conversion.

The blank start pixel value preferably is a 4-bit parameter indicating a number of blank pixels at the beginning of each display line. The blank start pixel value preferably signifies the number of pixels of the first word read from memory, at the beginning of the corresponding graphics window, to be discarded. This field indicates the number of pixels in the first word of data read from memory that are not displayed. For example, if memory words are 32 bits wide and the pixels are 4 bits each, there are 8 possible first pixels in the first word. Using this field, 0 to 7 pixels may be skipped, making the $1^{st}$ to the $8^{th}$ pixel in the word appear as the first pixel, respectively. The blank start pixel value allows graphics windows to have any horizontal starting position on the screen, and may be used during soft horizontal scrolling of a graphics window.

The window x-size value preferably is a 10-bit data field that indicates the size of a graphics window in the x direction, i.e., horizontal direction. The window x-size value preferably indicates the number of pixels of a graphics window in a display line.

The window x-start value preferably is a 10-bit data field that indicates a starting pixel of the graphics window on a display line. The graphics window defined by the window descriptor preferably begins at the pixel indicated by the window x-start value of each display line. With the window x-start value, any pixel of a given display line can be chosen to start painting the graphics window. Therefore, there is no need to load pixels on the screen prior to the beginning of the graphics window display area with black.

III. Graphics Window Control Data Passing Mechanism

In one embodiment of the present invention, a FIFO in the graphics display path accepts raw graphics data as the raw graphics data is read from memory, at the full memory data rate using a clock of the memory controller. In this embodiment, the FIFO provides this data, initially stored in an external memory, to subsequent blocks in the graphics pipeline.

In systems such as graphics display systems where multiple types of data may be output from one module, such as a memory controller subsystem, and used in another subsystem, such as a graphics processing subsystem, it typically becomes progressively more difficult to support a combination of dynamically varying data types and data transfer rates and FIFO buffers between the producing and consuming modules. The conventional way to address such problems is to design a logic block that understands the varying parameters of the data types in the first module and controls all of the relevant variables in the second module. This may be difficult due to variable delays between the two modules, due to the use of FIFOs between them and varying data rate, and due to the complexity of supporting a large number of data types.

The system preferably processes graphics images for display by organizing the graphics images into windows in which the graphics images appear on the screen, obtaining data that describes the windows, sorting the data according to the depth of the window on the display, transferring graphics images from memory, and blending the graphics images using alpha values associated with the graphics images.

In the preferred embodiment, a packet of control information called a header packet is passed from the window controller to the display engine. All of the required control information from the window controller preferably is conveyed to the display engine such that all of the relevant variables from the window controller are properly controlled in a timely fashion and such that the control is not dependent on variations in delays or data rates between the window controller and the display engine.

A header packet preferably indicates the start of graphics data for one graphics window. The graphics data for that graphics window continues until it is completed without requiring a transfer of another header packet. A new header packet is preferably placed in the FIFO when another window is to start. The header packets may be transferred according to the order of the corresponding window descriptors in the window descriptor lists.

In a display engine that operates according to lists of window descriptors, windows may be specified to overlap one another. At the same time, windows may start and end on any line, and there may be many windows visible on any one line. There are a large number of possible combinations of window starting and ending locations along vertical and horizontal axes and depth order locations. The system preferably indicates the depth order of all windows in the window descriptor list and implements the depth ordering correctly while accounting for all windows.

Each window descriptor preferably includes a parameter indicating the depth location of the associated window. The range that is allowed for this parameter can be defined to be almost any useful value. In the preferred embodiment there are 16 possible depth values, ranging from 0 to 15, with 0 being the back-most (deepest, or furthest from the viewer), and 15 being the top or front-most depth. The window descriptors are ordered in the window descriptor list in order of the first display scan line where the window appears. For example if window A spans lines 10 to 20, window B spans lines 12 to 18, and window C spans lines 5 to 20, the order of these descriptors in the list would be {C, A, B}.

In the hardware, which is a preferably a VLSI device, there is preferably on-chip memory capable of storing a number of window descriptors. In the preferred implementation, this memory can store up to 8 window descriptors on-chip, however the size of this memory may be made larger or smaller without loss of generality. Window descriptors are read from main memory into the on-chip descriptor memory in order from the start of the list, and stopping when the on-chip memory is full or when the most recently read descriptor describes a window that is not yet visible, i.e., its starting line is on a line that has a higher number than the line currently being constructed. Once a window has been displayed and is no longer visible, it may be cast out of the on-chip memory and the next descriptor in the list may read from main memory. At any given display line, the order of the window descriptors in the on-chip memory bears no particular relation to the depth order of the windows on the screen.

The hardware that controls the compositing of windows builds up the display in layers, starting from the back-most layer. In the preferred embodiment, the back most layer is layer 0. The hardware performs a quick search of the back-most window descriptor that has not yet been composited, regardless of its location in the on-chip descriptor memory. In the preferred embodiment, this search is performed as follows:

All 8 window descriptors are stored on chip in such a way that the depth order numbers of all of them are available simultaneously. While the depth numbers in the window descriptors are 4 bit numbers, representing 0 to 15, the on-chip memory has storage for 5 bits for the depth number. Initially the 5 bit for each descriptor is set to 0. The depth order values are compared in a hierarchy of pair-wise comparisons, and the lower of the two depth numbers in each comparison wins the comparison. That is, at the first stage of the test descriptor pairs {0, 1}, {2, 3}, {4, 5}, and {6, 7} are compared, where {0-7} represent the eight descriptors stored in the on-chip memory. This results in four depth numbers with associated descriptor numbers. At the next stage two pair-wise comparisons compare {(0, 1), (2, 3)} and {(4, 5), (6, 7)}.

Each of these results in a depth number of the lower depth order number and the associated descriptor number. At the third stage, one pair-wise comparison finds the smallest depth number of all, and its associated descriptor number. This number points the descriptor in the on-chip memory with the lowest depth number, and therefore the greatest depth, and this descriptor is used first to render the associated window on the screen. Once this window has been rendered onto the screen for the current scan line, the fifth bit of the depth number in the on-chip memory is set to 1, thereby ensuring that the depth value number is greater than 15, and as a result this depth number will preferably never again be found to be the back-most window until all windows have been rendered on this scan line, preventing rendering this window twice.

Once all the windows have been rendered for a given scan line, the fifth bits of all the on-chip depth numbers are again set to 0; descriptors that describe windows that are no longer visible on the screen are cast out of the on-chip memory; new descriptors are read from memory as required (that is, if all windows in the on-chip memory are visible, the next descriptor is read from memory, and this repeats until the most recently read descriptor is not yet visible on the screen), and the process of finding the back most descriptor and rendering windows onto the screen repeats.

Figure 7:
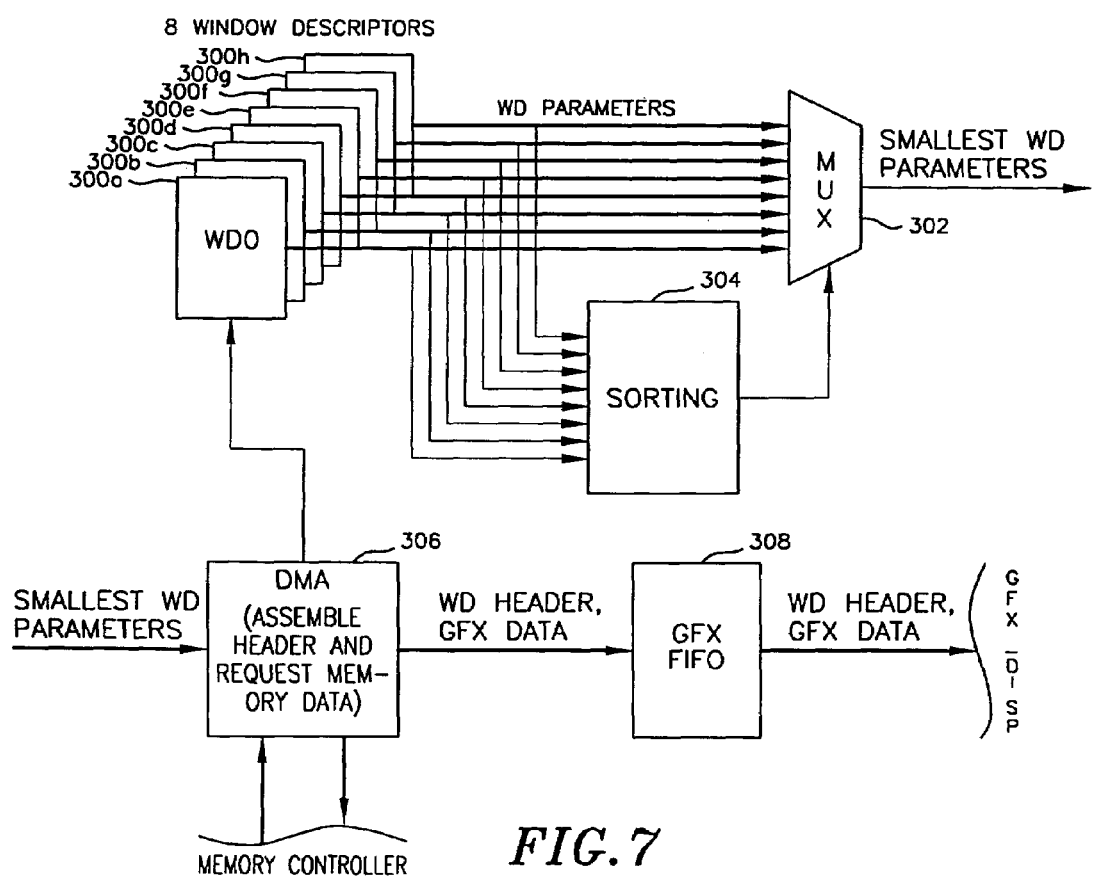
FIG. 7 is a flow diagram of an exemplary process for sorting window descriptors in a window controller.

Referring to FIG. 7, window descriptors are preferably sorted by the window controller and used to transfer graphics data to the display engine. Each of window descriptors, including the window descriptor 0 through the window descriptor 7 300a-h, preferably contains a window layer parameter. In addition, each window descriptor is preferably associated with a window line done flag indicating that the window descriptor has been processed on a current display line.

The window controller preferably performs window sorting at each display line using the window layer parameters and the window line done flags. The window controller preferably places the graphics window that corresponds to the window descriptor with the smallest window layer parameter at the bottom, while placing the graphics window that corresponds to the window descriptor with the largest window layer parameter at the top.

The window controller preferably transfers the graphics data for the bottom-most graphics window to be processed first. The window parameters of the bottom-most window are composed into a header packet and written to the graphics FIFO. The DMA engine preferably sends a request to the memory controller to read the corresponding graphics data for this window and send the graphics data to the graphics FIFO. The graphics FIFO is then read by the display engine to compose a display line, which is then written to graphics line buffers.

The window line done flag is preferably set true whenever the window surface has been processed on the current display line. The window line done flag and the window layer parameter may be concatenated together for sorting. The window line done flag is added to the window layer parameter as the most significant bit during sorting such that {window line done flag[4], window layer parameter[3:0]} is a five bit binary number, a window layer value, with window line done flag as the most significant bit.

The window controller preferably selects a window descriptor with the smallest window layer value to be processed. Since the window line done flag is preferably the most significant bit of the window layer value, any window descriptor with this flag set, i.e., any window that has been processed on the current display line, will have a higher window layer value than any of the other window descriptors that have not yet been processed on the current display line. When a particular window descriptor is processed, the window line done flag associated with that particular window descriptor is preferably set high, signifying that the particular window descriptor has been processed for the current display line.

A sorter 304 preferably sorts all eight window descriptors after any window descriptor is processed. The sorting may be implemented using binary tree sorting or any other suitable sorting algorithm. In binary tree sorting for eight window descriptors, the window layer value for four pairs of window descriptors are compared at a first level using four comparators to choose the window descriptor that corresponds to a lower window in each pair. In the second level, two comparators are used to select the window descriptor that corresponds to the bottom most graphics window in each of two pairs. In the third and the last level, the bottom-most most graphics windows from each of the two pairs are compared against each other preferably using only one comparator to select the bottom window.

A multiplexer 302 preferably multiplexes parameters from the window descriptors. The output of the sorter, i.e., window selected to be the bottom most, is used to select the window parameters to be sent to a direct memory access ("DMA") module 306 to be packaged in a header packet and sent to a graphics FIFO 308. The display engine preferably reads the header packet in the graphics FIFO and processes the raw graphics data based on information contained in the header packet.

The header packet preferably includes a first header word and a second header word. Corresponding graphics data is preferably transferred as graphics data words. Each of the first header word, the second header word and the graphics data words preferably includes 32 bits of information plus a data type bit. The first header word preferably includes a 1-bit data type, a 4-bit graphics type, a 1-bit first window parameter, a 1-bit top/bottom parameter, a 2-bit alpha type, an 8-bit window alpha value and a 16-bit window color value. Table 2 shows contents of the first header word.

TABLE 2

| | | | First Header Word | | | | |
|---|---|---|---|---|---|---|---|
| Bit Position | 32 | 31-28 | 27 | 26 | 25-24 | 23-16 | 15-0 |
| Data Content | Data type | graphics type | First Window | top/ bottom | alpha type | window alpha | window color |

The 1-bit data type preferably indicates whether a 33-bit word in the FIFO is a header word or a graphics data word. A data type of 1 indicates that the associated 33-bit word is a header word while the data type of 0 indicates that the associated 33-bit word is a graphics data word. The graphics type indicates the data format of the graphics data to be displayed in the graphics window similar to the window format parameter in the word 0 of the window descriptor, which is described in Table 1 above. In the preferred embodiment, when the graphics type is 1111, there is no window on the current display line, indicating that the current display line is empty.

The first window parameter of the first header word preferably indicates whether the window associated with that first header word is a first window on a new display line. The top/bottom parameter preferably indicates whether the current display line indicated in the first header word is at the top or the bottom edges of the window. The alpha type preferably indicates a method of selecting an alpha value individually for each pixel in the window similar to the alpha type in the word 2 of the window descriptor.

The window alpha value preferably is an alpha value to be applied to the window as a whole and is similar to the window alpha value in the word 2 of the window descriptor. The window color value preferably is the color of the window in 16-bit RGB format and is similar to the window color value in the word 1 of the window descriptor.

The second header word preferably includes the 1-bit data type, a 4-bit blank pixel count, a 10-bit left edge value, a 1-bit filter enable parameter and a 10-bit window size value. Table 3 shows contents of the second header word in the preferred embodiment.

TABLE 3

| | | Second Header Word | | | |
|---|---|---|---|---|---|
| Bit Position | 32 | 31-28 | 25-16 | 10 | 9-0 |
| Data Content | data type | Blank pixel count | Left edge | filter enabler | window size |

Similar to the first header word, the second header word preferably starts with the data type indicating whether the second header word is a header word or a graphics data word. The blank pixel count preferably indicates a number of blank pixels at a left edge of the window and is similar to the blank start pixel value in the word 3 of the window descriptor. The left edge preferably indicates a starting location of the window on a scan line, and is similar to the window x-start value in the word 3 of the window descriptor. The filter enable parameter preferably enables a filter during a conversion of graphics data from a YUV 4:4:4 format to a YUV 4:2:2 format and is similar to the window filter enable parameter in word 3 of the window descriptor. Some YUV 4:4:4 data may contain higher frequency content than others, which may be filtered by enabling a low pass filter during a conversion to the YUV 4:2:2 format. The window size value preferably indicates the actual horizontal size of the window and is similar to the window x-size value in word 3 of the window descriptor.

When the composition of the last window of the last display line is completed, an empty-line header is preferably placed into the FIFO so that the display engine may release the display line for display.

Packetized data structures have been used primarily in the communication world where large amount of data needs to be transferred between hardware using a physical data link (e.g., wires). The idea is not known to have been used in the graphics world where localized and small data control structures need to be transferred between different design entities without requiring a large off-chip memory as a buffer. In one embodiment of the present system, header packets are used, and a general-purpose FIFO is used for routing. Routing may be accomplished in a relatively simple manner in the preferred embodiment because the write port of the FIFO is the only interface.

In the preferred embodiment, the graphics FIFO is a synchronous 32×33 FIFO built with a static dual-port RAM with one read port and one write port. The write port preferably is synchronous to a 81 MHz memory clock while the read port may be asynchronous (not synchronized) to the memory clock. The read port is preferably synchronous to a graphics processing clock, which runs preferably at 81 MHz, but not necessarily synchronized to the memory clock. Two graphics FIFO pointers are preferably generated, one for the read port and one for the write port. In this embodiment, each graphics FIFO pointer is a 6-bit binary counter which ranges from 000000b to 111111b, i.e., from 0 to 63. The graphics FIFO is only 32 words deep and requires only 5 bits to represent each 33-bit word in the graphics FIFO. An extra bit is preferably used to distinguish between FIFO full and FIFO empty states.

The graphics data words preferably include the 1-bit data type and 32-bit graphics data bits. The data type is 0 for the graphics data words. In order to adhere to a common design practice that generally limits the size of a DMA burst into a FIFO to half the size of the FIFO, the number of graphics data words in one DMA burst preferably does not exceed 16.

In an alternate embodiment, a graphics display FIFO is not used. In this embodiment, the graphics converter processes data from memory at the rate that it is read from memory. The memory and conversion functions are in a same clock domain. Other suitable FIFO designs may be used.

Figure 8:
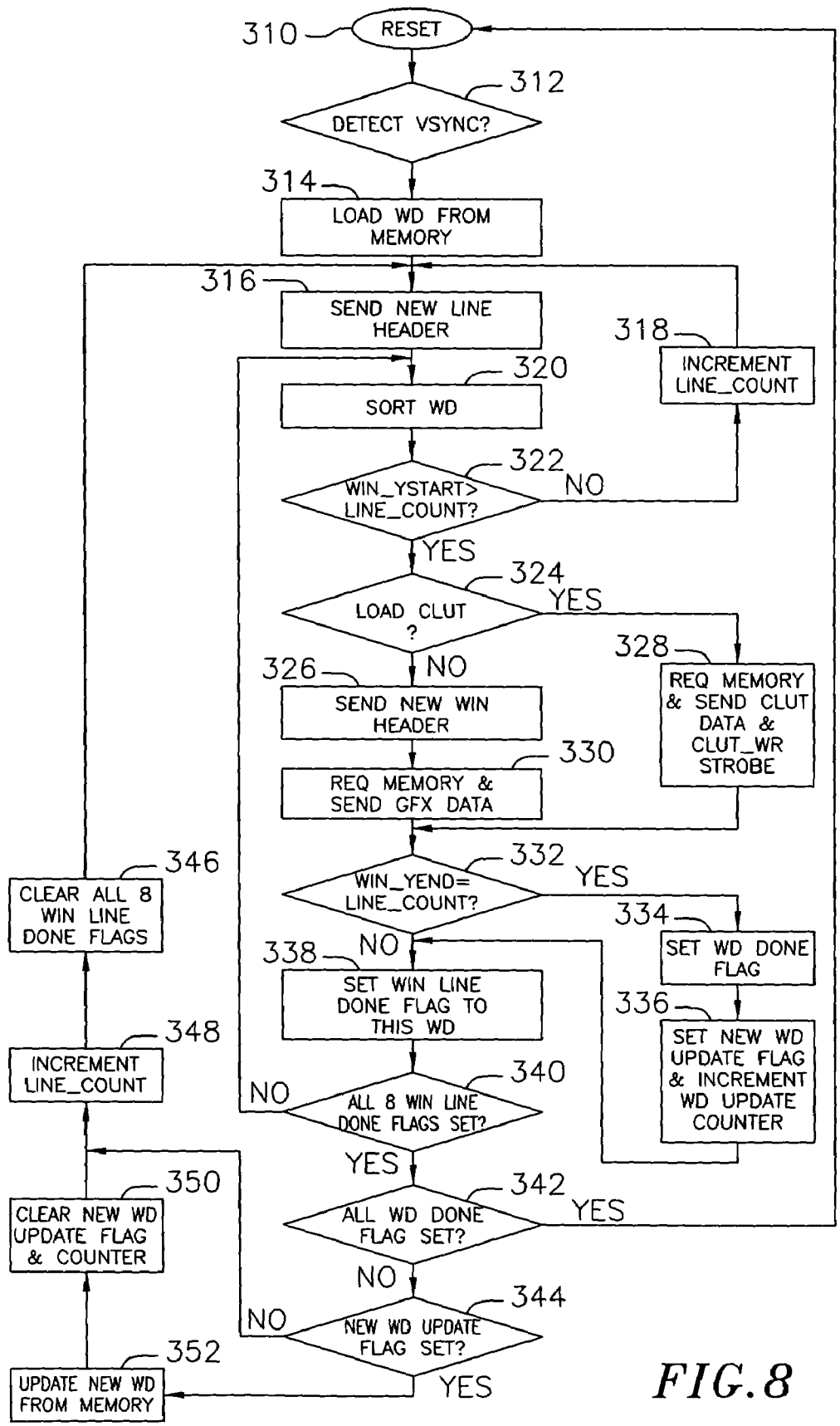
FIG. 8 is a flow diagram of a graphics window control data passing mechanism and a color look-up table loading mechanism.

Referring to FIG. 8, a flow diagram illustrates a process for loading and processing window descriptors. First the system is preferably reset in step 310. Then the system in step 312 preferably checks for a vertical sync ("VSYNC"). When the VSYNC is received, the system in step 314 preferably proceeds to load window descriptors into the window controller from the external SDRAM or other suitable memory over the DMA channel for window descriptors. The window controller may store up to eight window descriptors in one embodiment of the present invention.

The step in step 316 preferably sends a new line header indicating the start of a new display line. The system in step 320 preferably sorts the window descriptors in accordance with the process described in reference to FIG. 7. Although sorting is indicated as a step in this flow diagram, sorting actually may be a continuous process of selecting the bottom-most window, i.e., the window to be processed. The system in step 322 preferably checks to determine if a starting display line of the window is greater than the line count of the current display line. If the starting display line of the window is greater than the line count, i.e., if the current display line is above the starting display line of the bottom most window, the current display line is a blank line. Thus, the system in step 318 preferably increments the line count and sends another new line header in step 316. The process of sending a new line header and sorting window descriptor continues as long as the starting display line of the bottom most (in layer order) window is below the current display line.

The display engine and the associated graphics filter preferably operate in one of two modes, a field mode and a frame mode. In both modes, raw graphics data associated with graphics windows is preferably stored in frame format, including lines from both interlaced fields in the case of an interlaced display. In the field mode, the display engine preferably skips every other display line during processing. In the field mode, therefore, the system in step 318 preferably increments the line count by two each time to skip every other line. In the frame mode, the display engine processes every display line sequentially. In the frame mode, therefore, the system in step 318 preferably increments the line count by one each time.

When the system in step 322 determines that the starting display of the window is greater than the line count, the system in step 324 preferably determines from the header packet whether the window descriptor is for displaying a window or re-loading the CLUT. If the window header indicates that the window descriptor is for re-loading CLUT, the system in step 328 preferably sends the CLUT data to the CLUT and turns on the CLUT write strobe to load CLUT.

If the system in step 324 determines that the window descriptor is for displaying a window, the system in step 326 preferably sends a new window header to indicate that graphics data words for a new window on the display line are going to be transferred into the graphics FIFO. Then, the system in step 330 preferably requests the DMA module to send graphics data to the graphics FIFO over the DMA channel for graphics data. In the event the FIFO does not have sufficient space to store graphics data in a new data packet, the system preferably waits until such space is made available.

When graphics data for a display line of a current window is transferred to the FIFO, the system in step 332 preferably determines whether the last line of the current window has been transferred. If the last line has been transferred, a window descriptor done flag associated with the current window is preferably set. The window descriptor done flag indicates that the graphics data associated with the current window descriptor has been completely transferred. When the window descriptor done flag is set, i.e., when the current window descriptor is completely processed, the system sets a window descriptor done flag in step 334. Then the system in step 336 preferably sets a new window descriptor update flag and increments a window descriptor update counter to indicate that a new window descriptor is to be copied from the external memory.

Regardless of whether the last line of the current window has been processed, the system in step 338 preferably sets the window line done flag for the current window descriptor to signify that processing of this window descriptor on the current display line has been completed. The system in step 340 preferably checks the window line done flags associated with all eight window descriptors to determine whether they are all set, which would indicate that all the windows of the current display line have been processed. If not all window line done flags are set, the system preferably proceeds to step 320 to sort the window descriptors and repeat processing of the new bottom-most window descriptor.

If all eight window line done flags are determined to be set in step 340, all window descriptors on the current display line have been processed. In this case, the system in step 342 preferably checks whether an all window descriptor done flag has been set to determine whether all window descriptors have been processed completely. The all window descriptor done flag is set when processing of all window descriptors in the current frame or field have been processed completely. If the all window descriptor done flag is set, the system preferably returns to step 310 to reset and awaits another VSYNC in step 312. If not all window descriptors have been processed, the system in step 344 preferably determines if the new window descriptor update flag has been set. In the preferred embodiment, this flag would have been set in step 334 if the current window descriptor has been completely processed.

When the new window descriptor update flag is set, the system in step 352 preferably sets up the DMA to transfer a new window descriptor from the external memory. Then the system in step 350 preferably clears the new window descriptor update flag. After the system clears the new window descriptor update flag or when the new window descriptor update flag is not set in the first place, the system in step 348 preferably increments a line counter to indicate that the window descriptors for a next display line should be processed. The system in step 346 preferably clears all eight window line done flags to indicate that none of the window descriptors have been processed for the next display line. Then the system in step 316 preferably initiates processing of the new display line by sending a new line header to the FIFO.

Figure 9:
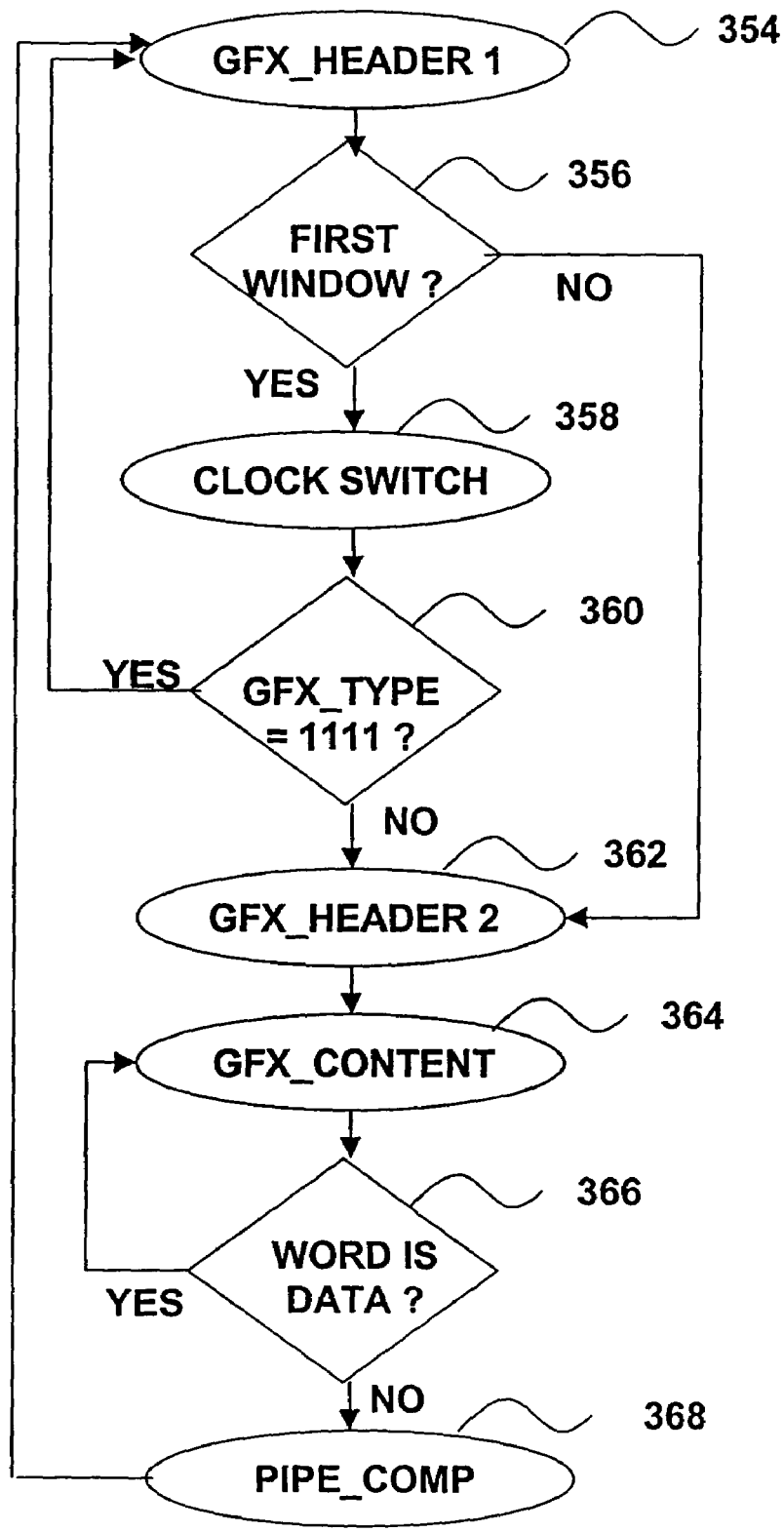
FIG. 9 is a state diagram of a state machine in a graphics converter that may be used during processing of header packets.

In the preferred embodiment, the graphics converter in the display engine converts raw graphics data having various different formats into a common format for subsequent compositing with video and for display. The graphics converter preferably includes a state machine that changes state based on the content of the window data packet. Referring to FIG. 9, the state machine in the graphics converter preferably controls unpacking and processing of the header packets. A first header word processing state 354 is preferably entered wherein a first window parameter of the first header word is checked (step 356) to determine if the window data packet is for a first graphics window of a new line. If the header packet is not for a first window of a new line, after the first header word is processed, the state preferably changes to a second header word processing state 362.

If the header packet is for a first graphics window of a new line, the state machine preferably enters a clock switch state 358. In the clock switch state, the clock for a graphics line buffer which is going to store the new line switches from a display clock to a memory clock, e.g., from a 13.5 MHz clock to a 81 MHz clock. From the clock switch state, a graphics type in the first header word is preferably checked (step 360) to determine if the header word represents an empty line. A graphics type of 1111b preferably refers to an empty line.

If the graphics type is 1111b, the state machine enters the first header word processing state 354, in which the first header word of the next header packet is processed. If the graphics type is not 1111b, i.e. the display line is not empty, the second header word is processed. Then the state machine preferably enters a graphics content state 364 wherein words from the FIFO are checked (step 366) one at a time to verify that they are data words. The state machine preferably remains in the graphics content state as long as each word read is a data word. While in the graphics content state, if a word received is not a data word, i.e., it is a first or second header word, then the state machine preferably enters a pipeline complete state 368 and then to the first header processing state 354 where reading and processing of the next window data packet is commenced.

Figure 10:
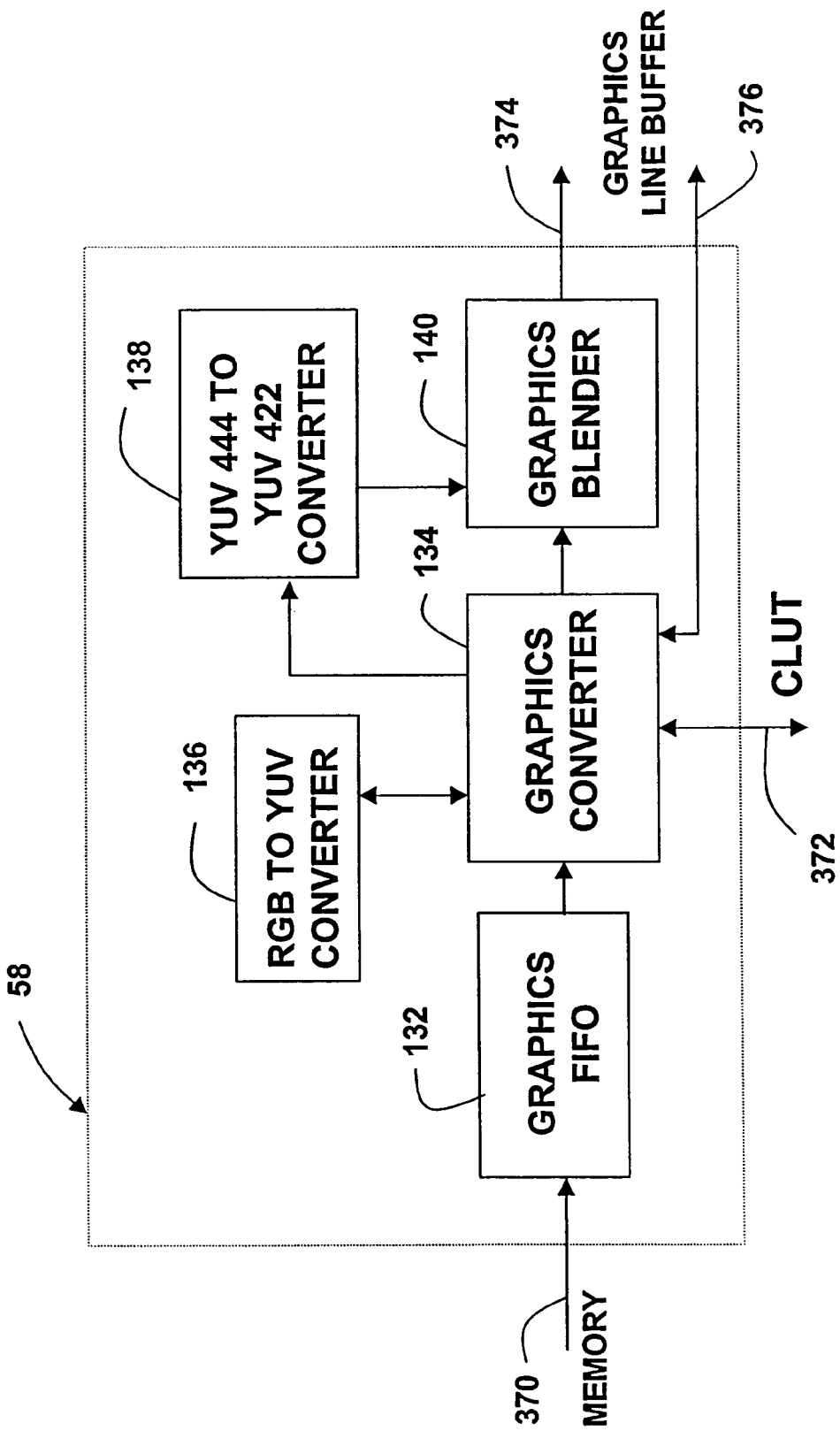
FIG. 10 is a block diagram of an embodiment of a display engine.

Referring to FIG. 10, the display engine 58 is preferably coupled to memory over a memory interface 370 and a CLUT over a CLUT interface 372. The display engine preferably includes the graphics FIFO 132 which receives the header packets and the graphics data from the memory controller over the memory interface. The graphics FIFO preferably provides received raw graphics data to the graphics converter 134 which converts the raw graphics data into the common compositing format. During the conversion of graphics format, the RGB to YUV converter 136 and data from the CLUT over the CLUT interface 372 are used to convert RGB formatted data and CLUT formatted data, respectively.

The graphics converter preferably processes all of the window layers of each scan line in half the time, or less, of an interlaced display line, due to the need to have lines from both fields available in the SRAM for use by the graphics filter when frame mode filtering is enabled. The graphics converter operates at 81 MHz in one embodiment of the present invention, and the graphics converter is able to process up to eight windows on each scan line and up to three full width windows.

For example, with a 13.5 MHz display clock, if the graphics converter processes 81 Mpixels per second, it can convert three windows, each covering the width of the display, in half of the active display time of an interlaced scan line. In one embodiment of the present invention, the graphics converter processes all the window layers of each scan line in half the time of an interlaced display line, due to the need to have lines from both fields available in the SRAM for use by the graphics filter. In practice, there may be some more time available since the active display time leaves out the blanking time, while the graphics converter can operate continuously.

Graphics pixels are preferably read from the FIFO in raw graphics format, using one of the multiple formats allowed in the present invention and specified in the window descriptor. Each pixel may occupy as little as two bits or as much as 16 bits in the preferred embodiment. Each pixel is converted to a YUVa24 format (also referred to as a YUV 4:4:2:2), such as two adjacent pixels sharing a UV pair and having unique Y and alpha values, and each of the Y, U, V and alpha components occupying eight bits. The conversion process is generally dependent on the pixel format type and the alpha specification method, both of which are indicated by the window descriptor for the currently active window. Preferably, the graphics converter uses the CLUT memory to convert CLUT format pixels into RGB or YUV pixels.

Conversions of RGB pixels may require conversion to YUV, and therefore, the graphics converter preferably includes a color space converter. The color space converter preferably is accurate for all coefficients. If the converter is accurate to eight or nine bits it can be used to accurately convert eight bit per component graphics, such as CLUT entries with this level of accuracy or RGB24 images.

The graphics converter preferably produces one converted pixel per clock cycle, even when there are multiple graphics pixels packed into one word of data from the FIFO. Preferably the graphics processing clock, which preferably runs at 81 MHz, is used during the graphics conversion. The graphics converter preferably reads data from the FIFO whenever both conditions are met, including that the converter is ready to receive more data, and the FIFO has data ready. The graphics converter preferably receives an input from a graphics blender, which is the next block in the pipeline, which indicates when the graphics blender is ready to receive more converted graphics data. The graphics converter may stall if the graphics blender is not ready, and as a result, the graphics converter may not be ready to receive graphics data from the FIFO.

The graphics converter preferably converts the graphics data into a YUValpha ("YUVa") format. This YUVa format includes YUV 4:2:2 values plus an 8-bit alpha value for every pixel, and as such it occupies 24 bits per pixel; this format is alternately referred to as a YUV 4:4:2:2. The YUV444-to-YUV422 converter 138 converts graphics data with the a YUV 4:4:4:4 format from the graphics converter into graphics data with the a YUV 4:4:2:2 format and provides the data to the graphics blender 140. The YUV444-to-YUV422 converter preferably has a capacity of performing low pass filtering to filter out high frequency components when needed. The graphics converter also sends and receives clock synchronization information to and from the graphics line buffers over a clock control interface 376.

When provided with the converted graphics data, the graphics blender 140 preferably composites graphics windows into graphics line buffers over a graphics line buffer interface 374. The graphics windows are alpha blended into blended graphics and preferably stored in graphics line buffers.

IV. Color Look-Up Table Loading Mechanism

A color look-up table ("CLUT") is preferably used to supply color and alpha values to the raw graphics data formatted to address information contents of the CLUT. For a window surface based display, there may be multiple graphics windows on the same display screen with different graphics formats. For graphics windows using a color look-up table (CLUT) format, it may be necessary to load specific color look-up table entries from external memory to on-chip memory before the graphics window is displayed.

The system preferably includes a display engine that processes graphics images formatted in a plurality of formats including a color look up table (CLUT) format. The system provides a data structure that describes the graphics in a window, provides a data structure that provides an indicator to load a CLUT, sorts the data structures into a list according to the location of the window on the display, and loads conversion data into a CLUT for converting the CLUT-formatted data into a different data format according to the sequence of data structures on the list.

In the preferred embodiment, each window on the display screen is described with a window descriptor. The same window descriptor is used to control CLUT loading as the window descriptor used to display graphics on screen. The window descriptor preferably defines the memory starting address of the graphics contents, the x position on the display screen, the width of the window, the starting vertical display line and end vertical display line, window layer, etc. The same window structure parameters and corresponding fields may be used to define the CLUT loading. For example, the graphics contents memory starting address may define CLUT memory starting address; the width of graphics window parameter may define the number of CLUT entries to be loaded; the starting vertical display line and ending vertical display line parameters may be used to define when to load the CLUT; and the window layer parameter may be used to define the priority of CLUT loading if several windows are displayed at the same time, i.e., on the same display line.

In the preferred embodiment, only one CLUT is used. As such, the contents of the CLUT are preferably updated to display graphics windows with CLUT formatted data that is not supported by the current content of the CLUT. One of ordinary skill in the art would appreciate that it is straightforward to use more than one CLUT and switch back and forth between them for different graphics windows.

In the preferred embodiment, the CLUT is closely associated with the graphics converter. In one embodiment of the present invention, the CLUT consists of one SRAM with 256 entries and 32 bits per entry. In other embodiments, the number of entries and bits per entry may vary. Each entry contains three color components; either RGB or YUV format, and an alpha component. For every CLUT-format pixel converted, the pixel data may be used as the address to the CLUT and the resulting value may be used by the converter to produce the YUVa (or alternatively RGBa) pixel value.

The CLUT may be re-loaded by retrieving new CLUT data via the direct memory access module when needed. It generally takes longer to re-load the CLUT than the time available in a horizontal blanking interval. Accordingly, in the preferred embodiment, a whole scan line time is allowed to re-load the CLUT. While the CLUT is being reloaded, graphics images in non-CLUT formats may be displayed. The CLUT reloading is preferably initiated by a window descriptor that contains information regarding CLUT reloading rather than a graphics window display information.

Figure 11:
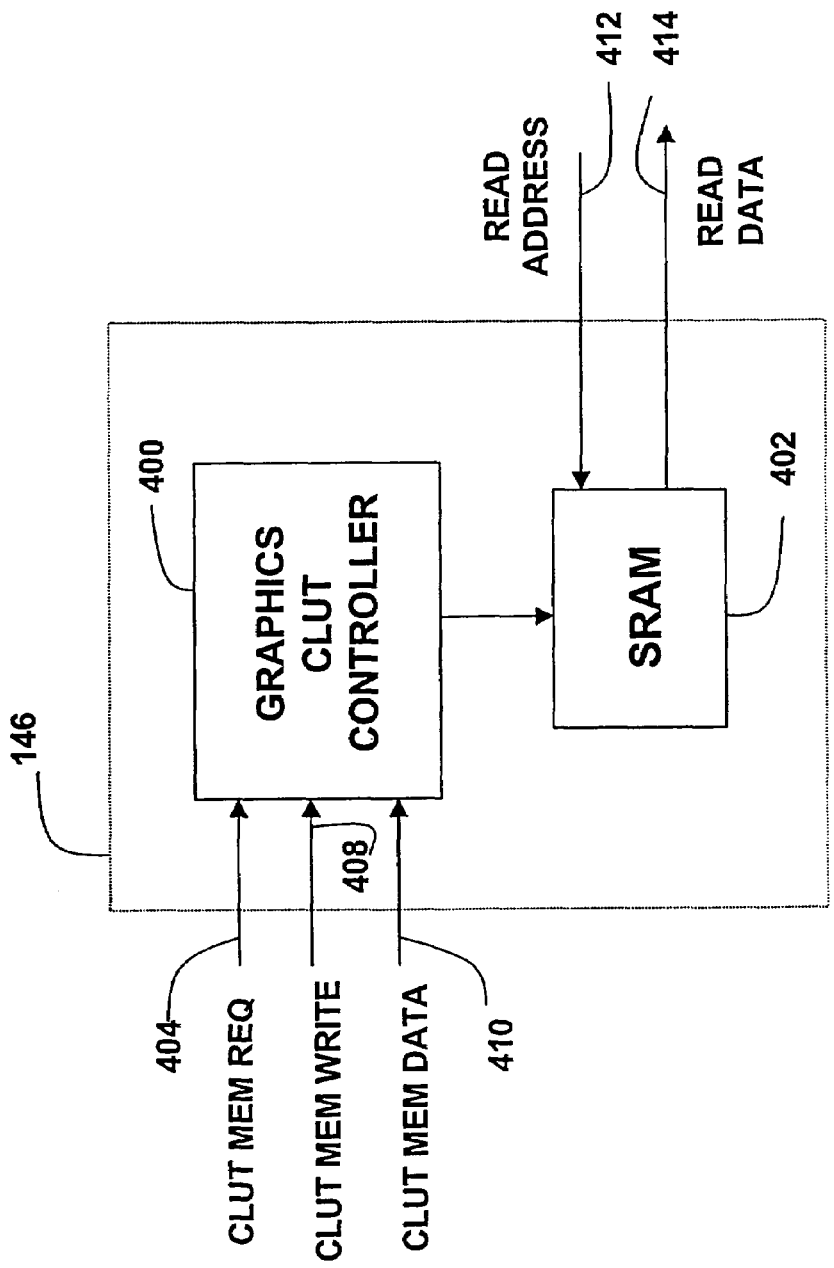
FIG. 11 is a block diagram of an embodiment of a color look-up table (CLUT)

Referring to FIG. 11, the graphics CLUT 146 preferably includes a graphics CLUT controller 400 and a static dual-port RAM (SRAM) 402. The SRAM preferably has a size of 256×32 which corresponds to 256 entries in the graphics CLUT. Each entry in the graphics CLUT preferably has 32 bits composed of Y+U+V+alpha from the most significant bit to the least significant bit. The size of each field, including Y, U, V, and alpha, is preferably eight bits.

The graphics CLUT preferably has a write port that is synchronized to a 81 MHz memory clock and a read port that may be asynchronous to the memory clock. The read port is preferably synchronous to the graphics processing clock, which runs preferably at 81 MHz, but not necessarily synchronized to the memory clock. During a read operation, the static dual-port RAM ("SRAM") is preferably addressed by a read address which is provided by graphics data in the CLUT images. During the read operation, the graphics data is preferably output as read data 414 when a memory address in the CLUT containing that graphics data is addressed by a read address 412.

During write operations, the window controller preferably controls the write port with a CLUT memory request signal 404 and a CLUT memory write signal 408. CLUT memory data 410 is also preferably provided to the graphics CLUT via the direct memory access module from the external memory. The graphics CLUT controller preferably receives the CLUT memory data and provides the received CLUT memory data to the SRAM for writing.

Figure 12:
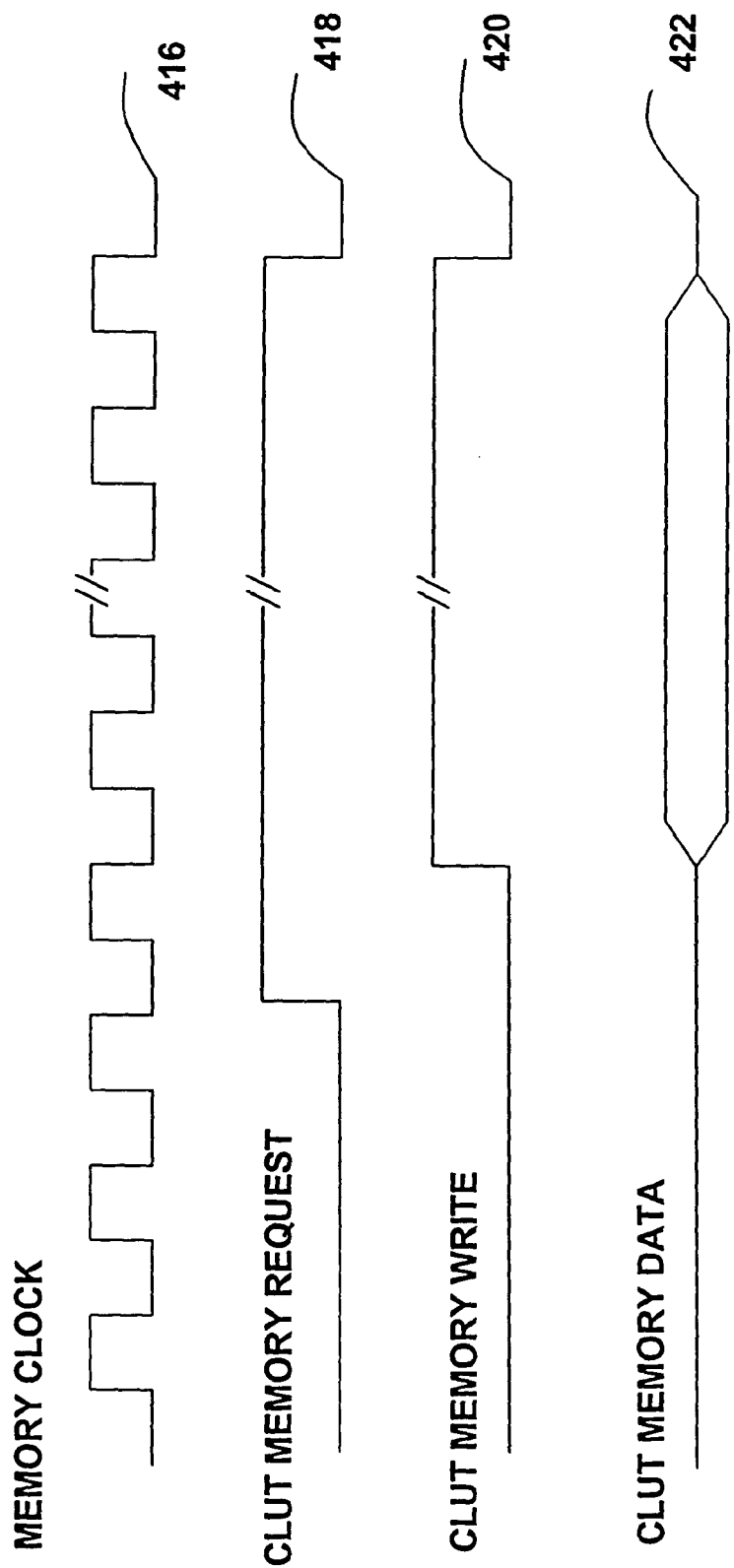
FIG. 12 is a timing diagram of signals that may be used to load a CLUT.

Referring to FIG. 12, an exemplary timing diagram shows different signals involved during a writing operation of the CLUT. The CLUT memory request signal 418 is asserted when the CLUT is to be re-loaded. A rising edge of the CLUT memory request signal 418 is used to reset a write pointer associated with the write port. Then the CLUT memory write signal 420 is asserted to indicate the beginning of a CLUT re-loading operation. The CLUT memory data 422 is provided synchronously to the 81 MHz memory clock 416 to be written to the SRAM. The write pointer associated with the write port is updated each time the CLUT is loaded with CLUT memory data.

In the preferred embodiment, the process of reloading a CLUT is associated with the process of processing window descriptors illustrated in FIG. 8 since CLUT re-loading is initiated by a window descriptor. As shown in steps 324 and 328 of FIG. 8, if the window descriptor is determined to be for reloading CLUT in step 324, the system in step 328 sends the CLUT data to the CLUT. The window descriptor for the CLUT reloading may appear anywhere in the window descriptor list. Accordingly, the CLUT reloading may take place at any time whenever CLUT data is to be updated.

Using the CLUT loading mechanism in one embodiment of the present invention, more than one window with different CLUT tables may be displayed on the same display line. In this embodiment, only the minimum required entries are preferably loaded into the CLUT, instead of loading all the entries every time. The loading of only the minimum required entries may save memory bandwidth and enables more functionality. The CLUT loading mechanism is preferably relatively flexible and easy to control, making it suitable for various applications. The CLUT loading mechanism of the present invention may also simplify hardware design, as the same state machine for the window controller may be used for CLUT loading. The CLUT preferably also shares the same DMA logic and layer/priority control logic as the window controller.

V. Graphics Line Buffer Control Scheme

In the preferred embodiment of the present invention, the system preferably blends a plurality of graphics images using line buffers. The system initializes a line buffer by loading the line buffer with data that represents transparent black, obtains control of a line buffer for a compositing operation, composites graphics contents into the line buffer by blending the graphics contents with the existing contents of the line buffer, and repeats the step of compositing graphics contents into the line buffer until all of the graphics surfaces for the particular line have been composited.

The graphics line buffer temporarily stores composited graphics images (blended graphics). A graphics filter preferably uses blended graphics in line buffers to perform vertical filtering and scaling operations to generate output graphics images. In the preferred embodiment, the display engine composites graphics images line by line using a clock rate that is faster than the pixel display rate, and graphics filters run at the pixel display rate. In other embodiments, multiple lines of graphics images may be composited in parallel. In still other embodiments, the line buffers may not be needed. Where line buffers are used, the system may incorporate an innovative control scheme for providing the line buffers containing blended graphics to the graphics filter and releasing the line buffers that are used up by the graphics filter.

The line buffers are preferably built with synchronous static dual-port random access memory ("SRAM") and dynamically switch their clocks between a memory clock and a display clock. Each line buffer is preferably loaded with graphics data using the memory clock and the contents of the line buffer is preferably provided to the graphics filter synchronously to the display clock. In one embodiment of the present invention, the memory clock is an 81 MHz clock used by the graphics converter to process graphics data while the display clock is a 13.5 MHz clock used to display graphics and video signals on a television screen. Other embodiments may use other clock speeds.

Figure 13:
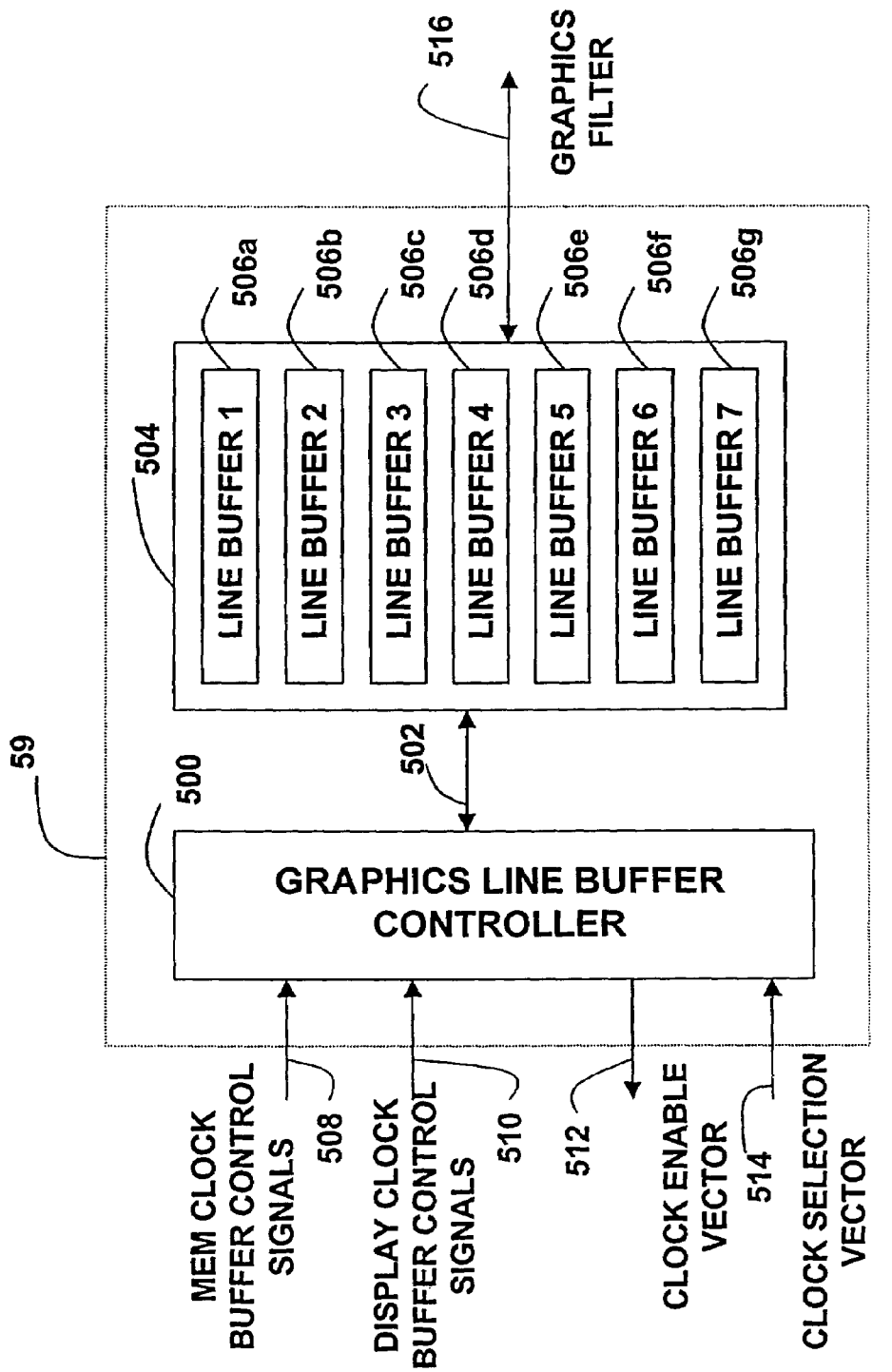
FIG. 13 is a block diagram illustrating exemplary graphics line buffers.

Referring to FIG. 13, the graphics line buffer preferably includes a graphics line buffer controller 500 and line buffers 504. The graphics line buffer controller 500 preferably receives memory clock buffer control signals 508 as well as display clock buffer control signals 510. The memory clock control signals and the display clock control signals are used to synchronize the graphics line buffers to the memory clock and the display clock, respectively. The graphics line buffer controller receives a clock selection vector 514 from the display engine to control which graphics line buffers are to operate in which clock domain. The graphics line buffer controller returns a clock enable vector to the display engine to indicate clock synchronization settings in accordance with the clock selection vector.

In the preferred embodiment, the line buffers 504 include seven line buffers 506*a-g*. The line buffers temporarily store lines of YUVa24 graphics pixels that are used by a subsequent graphics filter. This allows for four line buffers to be used for filtering and scaling, two are available for progressing by one or two lines at the end of every line, and one for the current compositing operation. Each line buffer may store an entire display line. Therefore, in this embodiment, the total size of the line buffers is (720 pixels/display line)*(3 bytes/pixel)*(7 lines)=15,120 bytes.

Each of the ports to the SRAM including line buffers is 24 bits wide to accommodate graphics data in YUVa24 format in this embodiment of the present invention. The SRAM has one read port and one write port. One read port and one write port are used for the graphics blender interface, which performs a read-modify-write typically once per clock cycle. In another embodiment of the present invention, an SRAM with only one port is used. In yet another embodiment, the data stored in the line buffers may be YUVa32 (4:4:4:4), RGBa32, or other formats. Those skilled in the art would appreciate that it is straightforward to vary the number of graphics line buffers, e.g., to use different number of taps for filter, the format of graphics data or the number of read and write ports for the SRAM.

The line buffers are preferably controlled by the graphics line buffer controller over a line buffer control interface 502. Over this interface, the graphics line buffer controller transfers graphics data to be loaded to the line buffers. The graphics filter reads contents of the line buffers over a graphics line buffer interface 516 and clears the line buffers by loading them with transparent black pixels prior to releasing them to be loaded with more graphics data for display.

Figure 14:
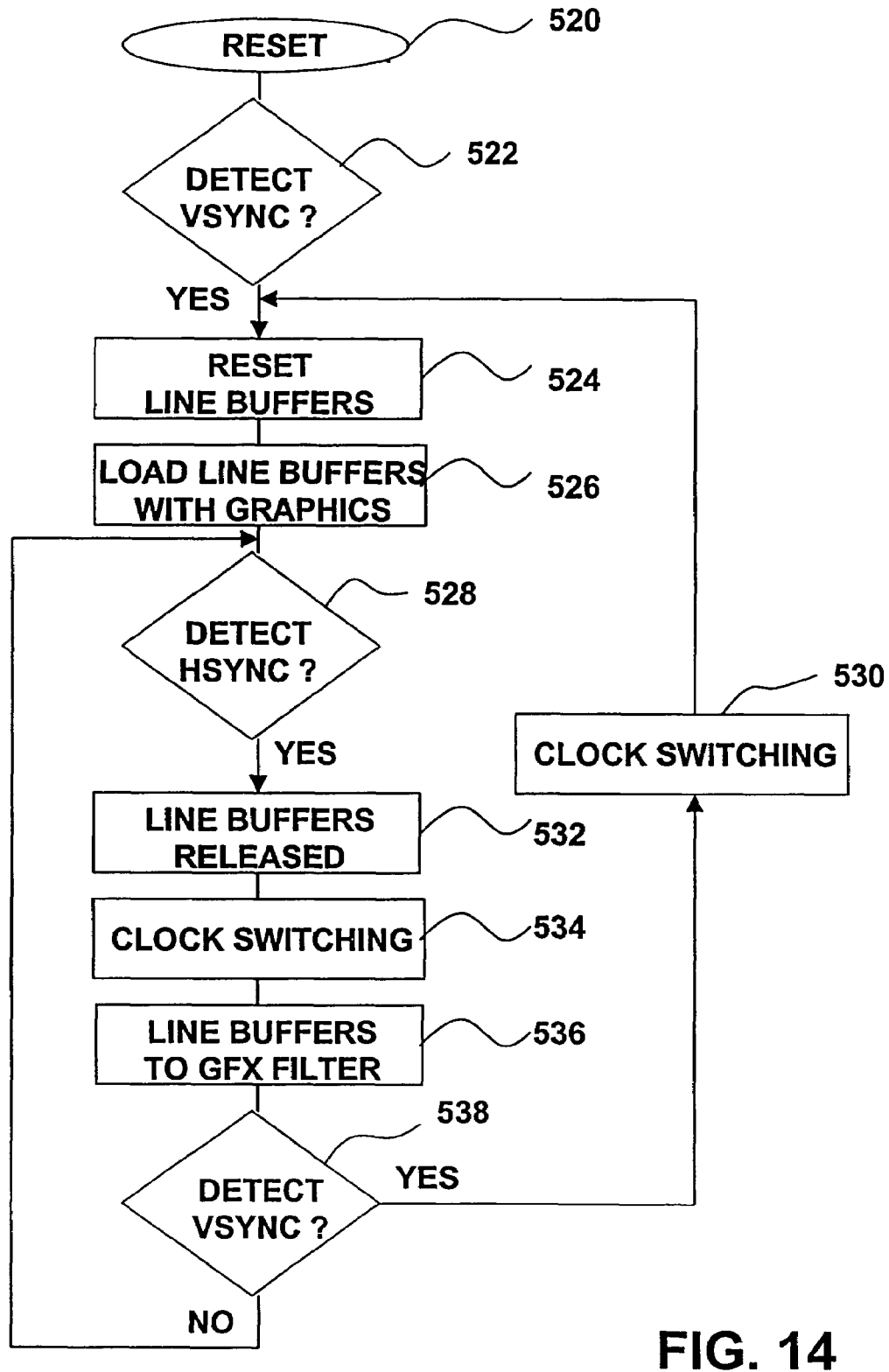
FIG. 14 is a flow diagram of a system for controlling the graphics line buffers of FIG. 13.

Referring FIG. 14, a flow diagram of a process of using line buffers to provide composited graphics data from a display engine to a graphics filter is illustrated. After the graphics display system is reset in step 520, the system in step 522 receives a vertical sync (VSYNC) indicating a field start. Initially, all line buffers preferably operate in the memory clock domain. Accordingly, the line buffers are synchronized to the 81 MHz memory clock in one embodiment of the present invention. In other embodiments, the speed of the memory clock may be different from 81 MHz, or the line buffers may not operate in the clock domain of the main memory. The system in step 524 preferably resets all line buffers by loading them with transparent black pixels.

The system in step 526 preferably stores composited graphics data in the line buffers. Since all buffers are cleared at every field start by the display engine to the equivalent of transparent black pixels, the graphics data may be blended the same way for any graphics window, including the first graphics window to be blended. Regardless of how many windows are composited into a line buffer, including zero windows, the result is preferably always the correct pixel data.

The system in step 528 preferably detects a horizontal sync (HSYNC) which signifies a new display line. At the start of each display line, the graphics blender preferably receives a line buffer release signal from the graphics filter when one or more line buffers are no longer needed by the graphics filter. Since four line buffers are used with the four-tap graphics filter at any given time, one to three line buffers are preferably made available for use by the graphics blender to begin constructing new display lines in them. Once a line buffer release signal is recognized, an internal buffer usage register is updated and then clock switching is performed to enable the display engine to work on the newly released one to three line buffers. In other embodiments, the number of line buffers may be more or less than seven, and more or less than three line buffers may be released at a time.

The system in step 534 preferably performs clock switching. Clock switching is preferably done in the memory clock domain by the display engine using a clock selection vector. Each bit of the clock selection vector preferably corresponds to one of the graphics line buffers. Therefore, in one embodiment of the present invention with seven graphics line buffers, there are seven bits in the clock selection vector. For example, a corresponding bit of logic 1 in the clock selection vector indicates that the line buffer operates in the memory clock domain while a corresponding bit of logic 0 indicates that the line buffer operates in the display clock domain.

Other embodiments may have different numbers of line buffers and the number of bits in the clock selection vector may vary accordingly. Clock switching logic preferably switches between the memory clock and the display clock in accordance with the clock selection vector. The clock selection vector is preferably also used to multiplex the memory clock buffer control signals and the display clock buffer control signals.

Since there is preferably no active graphics data at field and line starts, clock switching preferably is done at the field start and the line start to accommodate the graphics filter to access graphics data in real-time. At the field and line starts, clock switching may be done without causing glitches on the display side. Clock switching typically requires a dead cycle time. A clock enable vector indicates that the graphics line buffers are ready to synchronize to the clocks again. The clock enable vector is preferably the same size at the clock selection vector. The clock enable vector is returned to the display engine to be compared with the clock selection vector.

During clock switching, the clock selection vector is sent by the display engine to the graphics line buffer block. The clocks are preferably disabled to ensure a glitch-free clock switching. The graphics line buffers send the clock enable vector to the display engine with the clock synchronization settings requested in the clock selection vector. The display engine compares contents of the clock selection vector and the clock enable vector. When the contents match, the clock synchronization is preferably turned on again.

After the completion of clock switching during the video inactive region, the system in step 536 preferably provides the graphics data in the line buffers to the graphics filter for anti-flutter filtering, sample rate conversion (SRC) and display. At the end of the current display line, the system looks for a VSYNC in step 538. If the VSYNC is detected, the current field has been completed, and therefore, the system in step 530 preferably switches clocks for all line buffers to the memory clock and resets the line buffers in step 524 for display of another field. If the VSYNC is not detected in step 538, the current display line is not the last display line of the current field. The system continues to step 528 to detect another HSYNC for processing and displaying of the next display line of the current field.

VI. Window Soft Horizontal Scrolling Mechanism

Sometimes it is desirable to scroll a graphics window softly, e.g., display text that moves from left to right or from right to left smoothly on a television screen. There are some difficulties that may be encountered in conventional methods that seek to implement horizontal soft scrolling.

Graphics memory buffers are conventionally implemented using low-cost DRAM, SDRAM, for example. Such memory devices are typically slow and may require each burst transfer to be within a page. Smooth (or soft) horizontal scrolling, however, preferably enables the starting address to be set to any arbitrary pixel. This may conflict with the transfer of data in bursts within the well-defined pages of DRAM. In addition, complex control logic may be required to monitor if page boundaries are to be crossed during the transfer of pixel maps for each step during soft horizontal scrolling.

In the preferred embodiment, an implementation of a soft horizontal scrolling mechanism is achieved by incrementally modifying the content of a window descriptor for a particular graphics window. The window soft horizontal scrolling mechanism preferably enables positioning the contents of graphics windows on arbitrary positions on a display line.

In an embodiment of the present invention, the soft horizontal scrolling of graphics windows is implemented based on an architecture in which each graphics window is independently stored in a normal graphics buffer memory device (SDRAM, EDO-DRAM, DRAM) as a separate object. Windows are composed on top of each other in real time as required. To scroll a window to the left or right, a special field is defined in the window descriptor that tells how many pixels are to be shifted to the left or right.

The system according to the present invention provides a method of horizontally scrolling a display window to the left, which includes the steps of blanking out one or more pixels at a beginning of a portion of graphics data, the portion being aligned with a start address; and displaying the graphics data starting at the first non-blanked out pixel in the portion of the graphics data aligned with the start address.

The system according to the present invention also provides a method of horizontally scrolling a display window to the right which includes the steps of moving a read pointer to a new start address that is immediately prior to a current start address, blanking out one or more pixels at a beginning of a portion of graphics data, the portion being aligned to the new start address, and displaying the graphics data starting at the first non-blanked out pixel in the portion of the graphics data aligned with the new start address.

In practice, each graphics window is preferably addressed using an integer word address. For example, if the memory system uses 32 bit words, then the address of the start of a window is defined to be aligned to a multiple of 32 bits, even if the first pixel that is desired to be displayed is not so aligned. Each graphics window also preferably has associated with it a horizontal offset parameter, in units of pixels, that indicates a number of pixels to be ignored, starting at the indicated starting address, before the active display of the window starts. In the preferred embodiment, the horizontal offset parameter is the blank start pixel value in the word 3 of the window descriptor. For example, if the memory system uses 32-bit words and the graphics format of a window uses 8 bits per pixel, each 32-bit word contains four pixels. In this case, the display of the window may ignore one, two or three pixels (8, 16, or 24 bits), causing an effective left shift of one, two, or three pixels.

In the embodiment illustrated by the above example, the memory system uses 32-bit words. In other embodiments, the memory system may use more or less number of bits per word, such as 16 bits per word or 64 bits per word. In addition, pixels in other embodiments may have various different number of bits per pixel, such as 1, 2, 4, 8, 16, 24 and 32.

Figure 15:
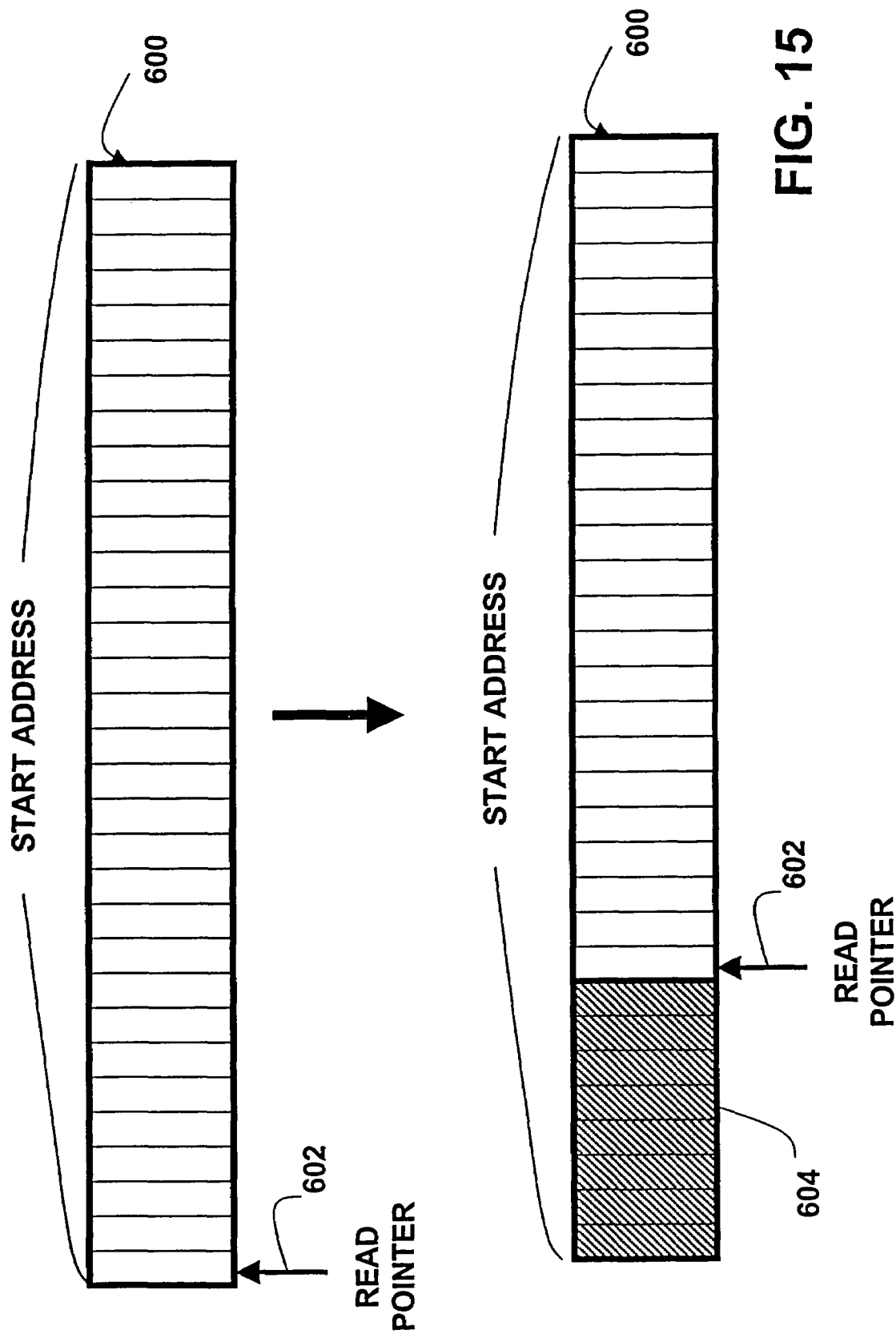
FIG. 15 is a representation of left scrolling using a window soft horizontal scrolling mechanism.

Referring to FIG. 15, in the preferred embodiment, a first pixel (e.g., the first 8 bits) 604 of a 32-bit word 600, which is aligned to the start address, is blanked out. The remaining three 8-bit pixels, other than the blanked out first pixel, are effectively shifted to the left by one pixel. Prior to blanking out, a read pointer 602 points to the first bit of the 32-bit word. After blanking out, the read pointer 602 points to the ninth bit of the 32-bit word.

Further, a shift of four pixels is implemented by changing the start address by one to the next 32-bit word. Shifts of any number of pixels are thereby implemented by a combination of adjusting the starting word address and adjusting the pixel shift amount. The same mechanism may be used for any number of bits per pixel (1, 2, 4, etc.) and any memory word size.

To shift a pixel or pixels to the right, the shifting cannot be achieved simply by blanking some of the bits at the start address since any blanking at the start will simply have an effect of shifting pixels to the left. Further, the shifting to the right cannot be achieved by blanking some of the bits at the end of the last data word of a display line since display of a window starts at the start address regardless of the position of the last pixel to be displayed.

Therefore, in one embodiment of the present invention, when the graphics display is to be shifted to the right, a read pointer pointing at the start address is preferably moved to an address that is just before the start address, thereby making that address the new start address. Then, a portion of the data word aligned with the new start address is blanked out. This provides the effect of shifting the graphics display to the right.

For example, a memory system may use 32-bit words and the graphics format of a window may use 2 bits per pixel, e.g., a CLUT 2 format. If the graphics display is to be shifted by a pixel to the right, the read pointer is moved to an address that is just before the start address, and that address becomes a new start address. Then, the first 30 bits of the 32-bit word that is aligned with the new start address are blanked out. In this case, blanking out of a portion of the 32-bit word that is aligned with the new start address has the effect of shifting the graphics display to the right.

Figure 16:
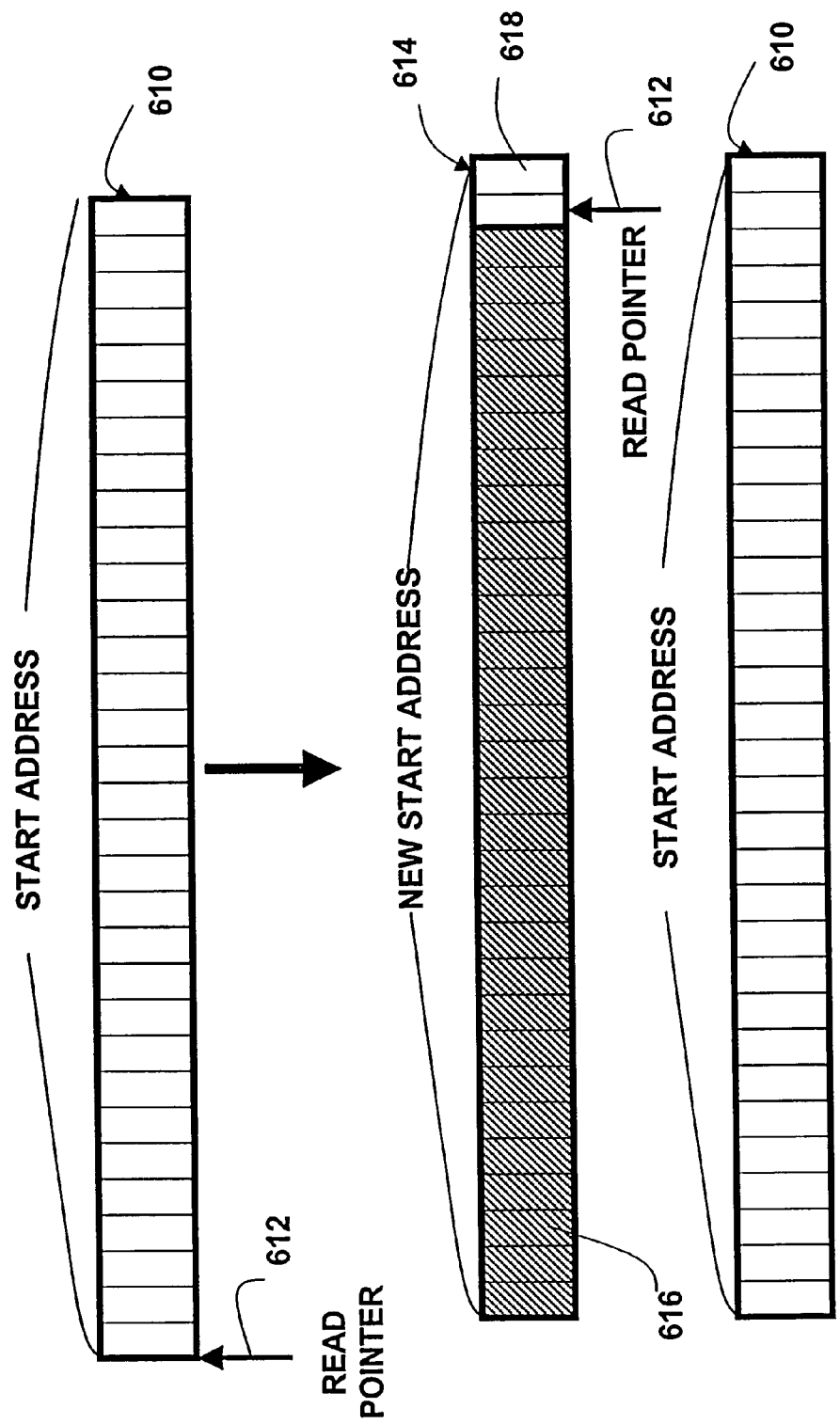
FIG. 16 is a representation of right scrolling using a window soft horizontal scrolling mechanism.

Referring to FIG. 16, a 32-bit word 610 that is aligned with the starting address is shifted to the right by one pixel. The 32 bit word 610 has a CLUT 2 format, and therefore contains 16 pixels. A read pointer 612 points at the beginning of the 32-bit word 610. To shift the pixels in the 32-bit word 610 to the right, an address that is just before the start address is made a new start address. A 32-bit data word 618 is aligned with the new start address. Then, the first 30 bits (15 pixels) 616 of the 32-bit data word 618 aligned with the new start address are blanked out. The read pointer 612 points at a new location, which is the $31^{st}$ bit of the new start address. The $31^{st}$ bit and the $32^{nd}$ bit of the new start address may constitute a pixel 618. Insertion of the pixel 618 in front of 16 pixels of the 32-bit data word 610 effectively shifts those 16 pixels to the right by one pixel.

VII. Anti-Aliased Text and Graphics

TV-based applications, such as interactive program guides, enhanced TV, TV navigators, and web browsing on TV frequently require the display of text and line-oriented graphics on the display. A graphical element or glyph generally represents an image of text or graphics. Graphical element may refer to text glyphs or graphics. In conventional methods of displaying text on TV or computer displays, graphical elements are rendered as arrays of pixels (picture elements) with two states for every pixel, i.e. the foreground and background colors.

In some cases the background color is transparent, allowing video or other graphics to show through. Due to the relatively low resolution of most present day TVs, diagonal and round edges of graphical elements generally show a stair-stepped appearance which may be undesirable; and fine details are constrained to appear as one or more complete pixels (dots), which may not correspond well to the desired appearance. The interlaced nature of TV displays causes horizontal edges of graphical elements, or any portion of graphical elements with a significant vertical gradient, to show a "fluttering" appearance with conventional methods.

Some conventional methods blend the edges of graphical elements with background colors in a frame buffer, by first reading the color in the frame buffer at every pixel where the graphical element will be written, combining that value with the foreground color of the graphical element, and writing the result back to the frame buffer memory. This method requires there to be a frame buffer; it requires the frame buffer to use a color format that supports such blending operations, such as RGB24 or RGB16, and it does not generally support the combination of graphical elements over full motion video, as such functionality may require repeating the read, combine and write back function of all pixels of all graphical elements for every frame or field of the video in a timely manner.

The system preferably displays a graphical element by filtering the graphical element with a low pass filter to generate a multi-level value per pixel at an intended final display resolution and uses the multi-level values as alpha blend values for the graphical element in the subsequent compositing stage.

In one embodiment of the present invention, a method of displaying graphical elements on televisions and other displays is used. A deep color frame buffer with, for example, 16, 24, or 32 bits per pixel, is not required to implement this method since this method is effective with as few as two bits per pixel. Thus, this method may result in a significant reduction in both the memory space and the memory bandwidth required to display text and graphics. The method preferably provides high quality when compared with conventional methods of anti-aliased text, and produces higher display quality than is available with conventional methods that do not support anti-aliased text.

Figure 17:
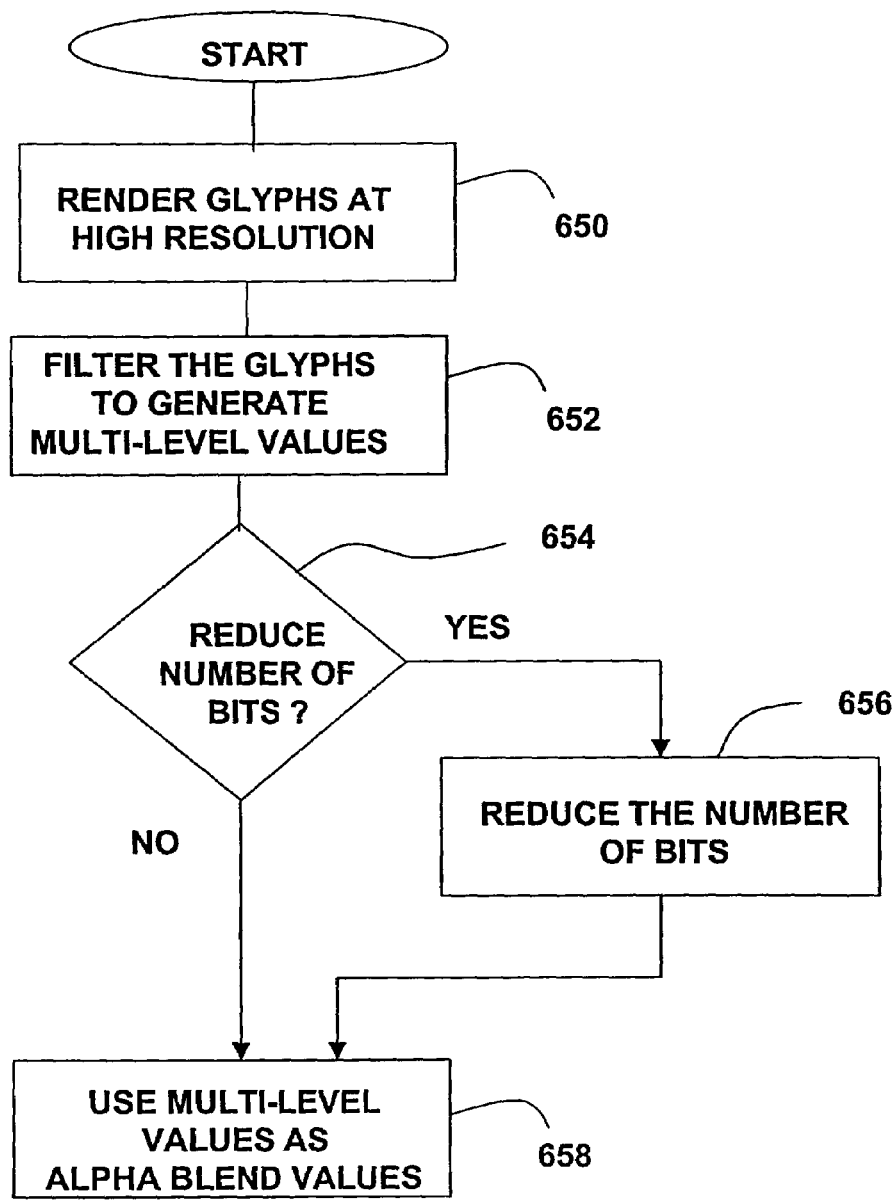
FIG. 17 is a flow diagram illustrating a system that uses graphics elements or glyphs for anti-aliased text and graphics applications.

Referring to FIG. 17, a flow diagram illustrates a process of providing very high quality display of graphical elements in one embodiment of the present invention. First, the bi-level graphical elements are filtered by the system in step 652. The graphical elements are preferably initially rendered by the system in step 650 at a significantly higher resolution than the intended final display resolution, for example, four times the final resolution in both horizontal and vertical axes. The filter may be any suitable low pass filter, such as a "box" filter. The result of the filtering operation is a multi-level value per pixel at the intended display resolution.

The number of levels may be reduced to fit the number of bits used in the succeeding steps. The system in step 654 determines whether the number of levels are to be reduced by reducing the number of bits used. If the system determines that the number of levels are to be reduced, the system in step 656 preferably reduces the number of bits. For example, the result of box-filtering 4×4 super-sampled graphical elements normally results in 17 possible levels; these may be converted through truncation or other means to 16 levels to match a 4 bit representation, or eight levels to match a 3 bit representation, or four levels to match a 2 bit representation. The filter may provide a required vertical axis low pass filter function to provide anti-flutter filter effect for interlaced display.

In step 658, the system preferably uses the resulting multilevel values, either with or without reduction in the number of bits, as alpha blend values, which are preferably pixel alpha component values, for the graphical elements in a subsequent compositing stage. The multi-level graphical element pixels are preferably written into a graphics display buffer where the values are used as alpha blend values when the display buffer is composited with other graphics and video images.

In an alternate embodiment, the display buffer is defined to have a constant foreground color consistent with the desired foreground color of the text or graphics, and the value of every pixel in the display buffer is defined to be the alpha blend value for that pixel. For example, an Alpha-4 format specifies four bits per pixel of alpha blend value in a graphics window, where the 4 bits define alpha blend values of 0/16, 1/16, 2/16, . . . , 13/16, 14/16, and 16/16. The value 15/16 is skipped in this example in order to obtain the endpoint values of 0 and 16/16 (1) without requiring the use of an additional bit. In this example format, the display window has a constant foreground color which is specified in the window descriptor.

In another alternate embodiment, the alpha blend value per pixel is specified for every pixel in the graphical element by choosing a CLUT index for every pixel, where the CLUT entry associated with every index contains the desired alpha blend value as part of the CLUT contents. For example, a graphical element with a constant foreground color and 4 bits of alpha per pixel can be encoded in a CLUT 4 format such that every pixel of the display buffer is defined to be a 4 bit CLUT index, and each of the associated 16 CLUT entries has the appropriate alpha blend value (0/16, 1/16, 2/16, . . . , 14/16, 16/16) as well as the (same) constant foreground color in the color portion of the CLUT entries.

In yet another alternate embodiment, the alpha per pixel values are used to form the alpha portion of color+alpha pixels in the display buffer, such as alphaRGB(4,4,4,4) with 4 bits for each of alpha, Red, Green, and Blue, or alphaRGB32 with 8 bits for each component. This format does not require the use of a CLUT.

In still another alternate embodiment, the graphical element may or may not have a constant foreground color. The various foreground colors are processed using a low-pass filter as described earlier, and the outline of the entire graphical element (including all colors other than the background) is separately filtered also using a low pass filter as described. The filtered foreground color is used as either the direct color value in, e.g., an alphaRGB format (or other color space, such as alphaYUV) or as the color choice in a CLUT format, and the result of filtering the outline is used as the alpha per pixel value in either a direct color format such as alphaRGB or as the choice of alpha value per CLUT entry in a CLUT format.

The graphical elements are displayed on the TV screen by compositing the display buffer containing the graphical elements with optionally other graphics and video contents while blending the subject display buffer with all layers behind it using the alpha per pixel values created in the preceding steps. Additionally, the translucency or opacity of the entire graphical element may be varied by specifying the alpha value of the display buffer via such means as the window alpha value that may be specified in a window descriptor.

VIII. Video Synchronization

When a composite video signal (analog video) is received into the system, it is preferably digitized and separated into YUV (luma and chroma) components for processing. Samples taken for YUV are preferably synchronized to a display clock for compositing with graphics data at the video compositor. Mixing or overlaying of graphics with decoded analog video may require synchronizing the two image sources exactly. Undesirable artifacts such as jitter may be visible on the display unless a synchronization mechanism is implemented to correctly synchronize the samples from the analog video to the display clock. In addition, analog video often does not adhere strictly to the television standards such as NTSC and PAL. For example, analog video which originates in VCRs may have synchronization signals that are not aligned with chroma reference signals and also may have inconsistent line periods. Thus, the synchronization mechanism preferably should correctly synchronize samples from non-standard analog videos as well.

The system, therefore, preferably includes a video synchronizing mechanism that includes a first sample rate converter for converting a sampling rate of a stream of video samples to a first converted rate, a filter for processing at least some of the video samples with the first converted rate, and a second sample rate converter for converting the first converted rate to a second converted rate.

Figure 18:
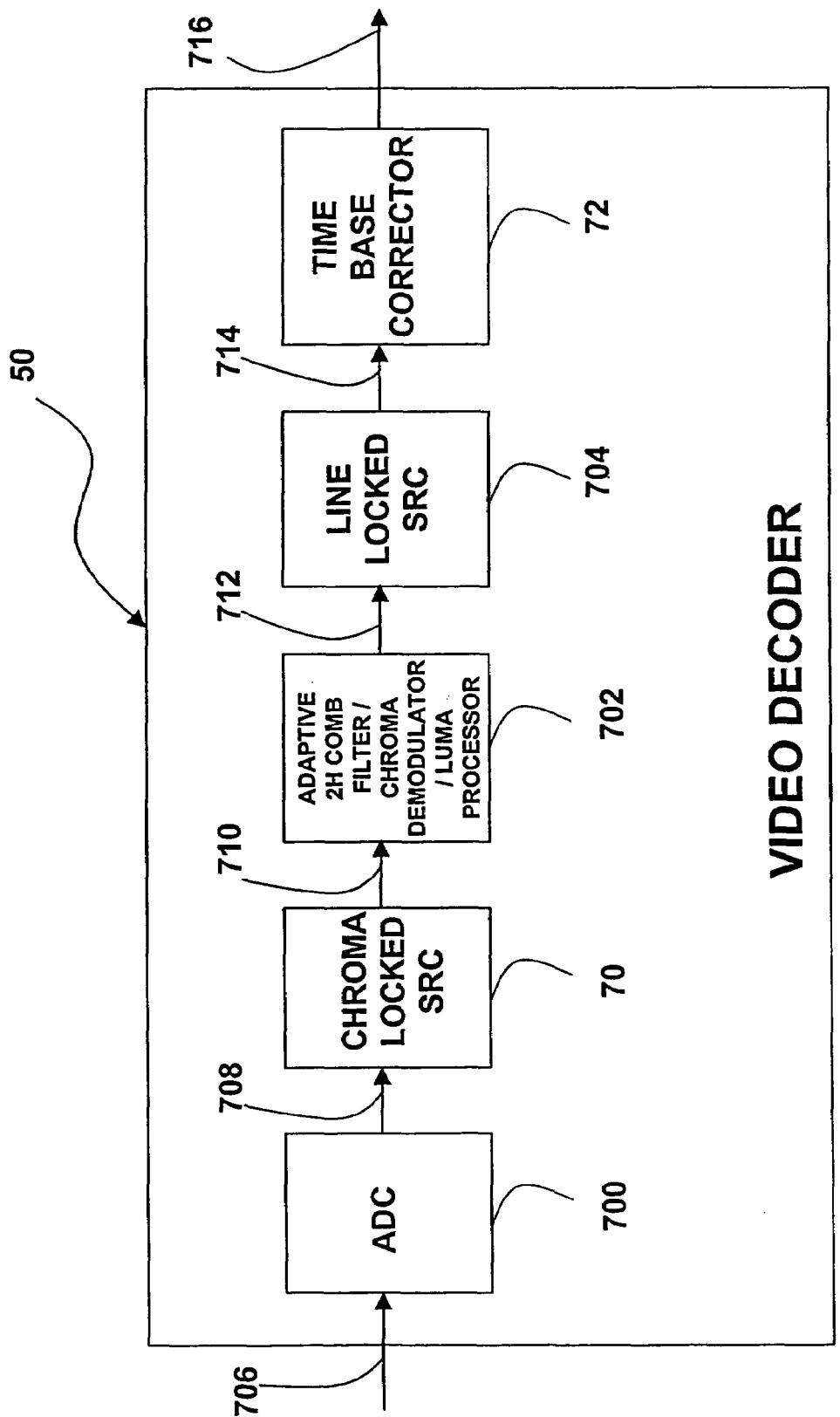
FIG. 18 is a block diagram of certain functional blocks of a video decoder for performing video synchronization.

Referring to FIG. 18, the video decoder 50 preferably samples and synchronizes the analog video input. The video receiver preferably receives an analog video signal 706 into an analog-to-digital converter (ADC) 700 where the analog video is digitized. The digitized analog video 708 is preferably sub-sampled by a chroma-locked sample rate converter (SRC) 708. A sampled video signal 710 is provided to an adaptive 2H comb filter/chroma demodulator/luma processor 702 to be separated into YUV (luma and chroma) components. In the 2H comb filter/chroma demodulator/luma processor 702, the chroma components are demodulated. In addition, the luma component is preferably processed by noise reduction, coring and detail enhancement operations. The adaptive 2H comb filter provides the sampled video 712, which has been separated into luma and chroma components and processed, to a line-locked SRC 704. The luma and chroma components of the sample video is preferably sub-sampled once again by the line-locked SRC and the sub-sampled video 714 is provided to a time base corrector (TBC) 72. The time base corrector preferably provides an output video signal 716 that is synchronized to a display clock of the graphics display system. In one embodiment of the present invention, the display clock runs at a nominal 13.5 MHz.

The synchronization mechanism preferably includes the chroma-locked SRC 70, the line-locked SRC 704 and the TBC 72. The chroma-locked SRC outputs samples that are locked to chroma subcarrier and its reference bursts while the line-locked SRC outputs samples that are locked to horizontal syncs. In the preferred embodiment, samples of analog video are over-sampled by the ADC 700 and then down-sampled by the chroma-locked SRC to four times the chroma subcarrier frequency (Fsc). The down-sampled samples are down-sampled once again by the line-locked SRC to line-locked samples with an effective sample rate of nominally 13.5 MHz. The time base corrector is used to align these samples to the display clock, which runs nominally at 13.5 MHz.

Analog composite video has a chroma signal frequency interleaved in frequency with the luma signal. In an NTSC standard video, this chroma signal is modulated on to the Fsc of approximately 3.579545 MHz, or exactly 227.5 times the horizontal line rate. The luma signal covers a frequency span of zero to approximately 4.2 MHz. One method for separating the luma from the chroma is to sample the video at a rate that is a multiple of the chroma sub-carrier frequency, and use a comb filter on the sampled data. This method generally imposes a limitation that the sampling frequency is a multiple of the chroma sub-carrier frequency (Fsc).

Using such a chroma-locked sampling frequency generally imposes significant costs and complications on the implementation, as it may require the creation of a sample clock of the correct frequency, which itself may require a stable, low noise controllable oscillator (e.g. a VCXO) in a control loop that locks the VCXO to the chroma burst frequency. Different sample frequencies are typically required for different video standards with different chroma subcarrier frequencies. Sampling at four times the subcarrier frequency, i.e. 14.318 MHz for NTSC standard and 17.72 MHz for PAL standard, generally requires more anti-alias filtering before digitization than is required when sampling at higher frequencies such as 27 MHz. In addition, such a chroma-locked clock frequency is often unrelated to the other frequencies in a large scale digital device, requiring multiple clock domains and asynchronous internal interfaces.

In the preferred embodiment, however, the samples are not taken at a frequency that is a multiple of Fsc. Rather, in the preferred embodiment, an integrated circuit takes samples of the analog video at a frequency that is essentially arbitrary and that is greater than four times the Fsc (4Fsc=14.318 MHz). The sampling frequency preferably is 27 MHz and preferably is not locked to the input video signal in phase or frequency. The sampled video data then goes through the chroma-locked SRC that down-samples the data to an effective sampling rate of 4Fsc. This and all subsequent operations are preferably performed in digital processing in a single integrated circuit.

The effective sample rate of 4Fsc does not require a clock frequency that is actually at 4Fsc, rather the clock frequency can be almost any higher frequency, such as 27 MHz, and valid samples occur on some clock cycles while the overall rate of valid samples is equal to 4Fsc. The down-sampling (decimation) rate of the SRC is preferably controlled by a chroma phase and frequency tracking module. The chroma phase and frequency tracking module looks at the output of the SRC during the color burst time interval and continuously adjusts the decimation rate in order to align the color burst phase and frequency. The chroma phase and frequency tracking module is implemented as a logical equivalent of a phase locked loop (PLL), where the chroma burst phase and frequency are compared in a phase detector to the effective sample rate, which is intended to be 4Fsc, and the phase and frequency error terms are used to control the SRC decimation rate.

The decimation function is applied to the incoming sampled video, and therefore the decimation function controls the chroma burst phase and frequency that is applied to the phase detector. This system is a closed feedback loop (control loop) that functions in much the same way as a conventional PLL, and its operating parameters are readily designed in the same way as those of PLLs.

Figure 19:
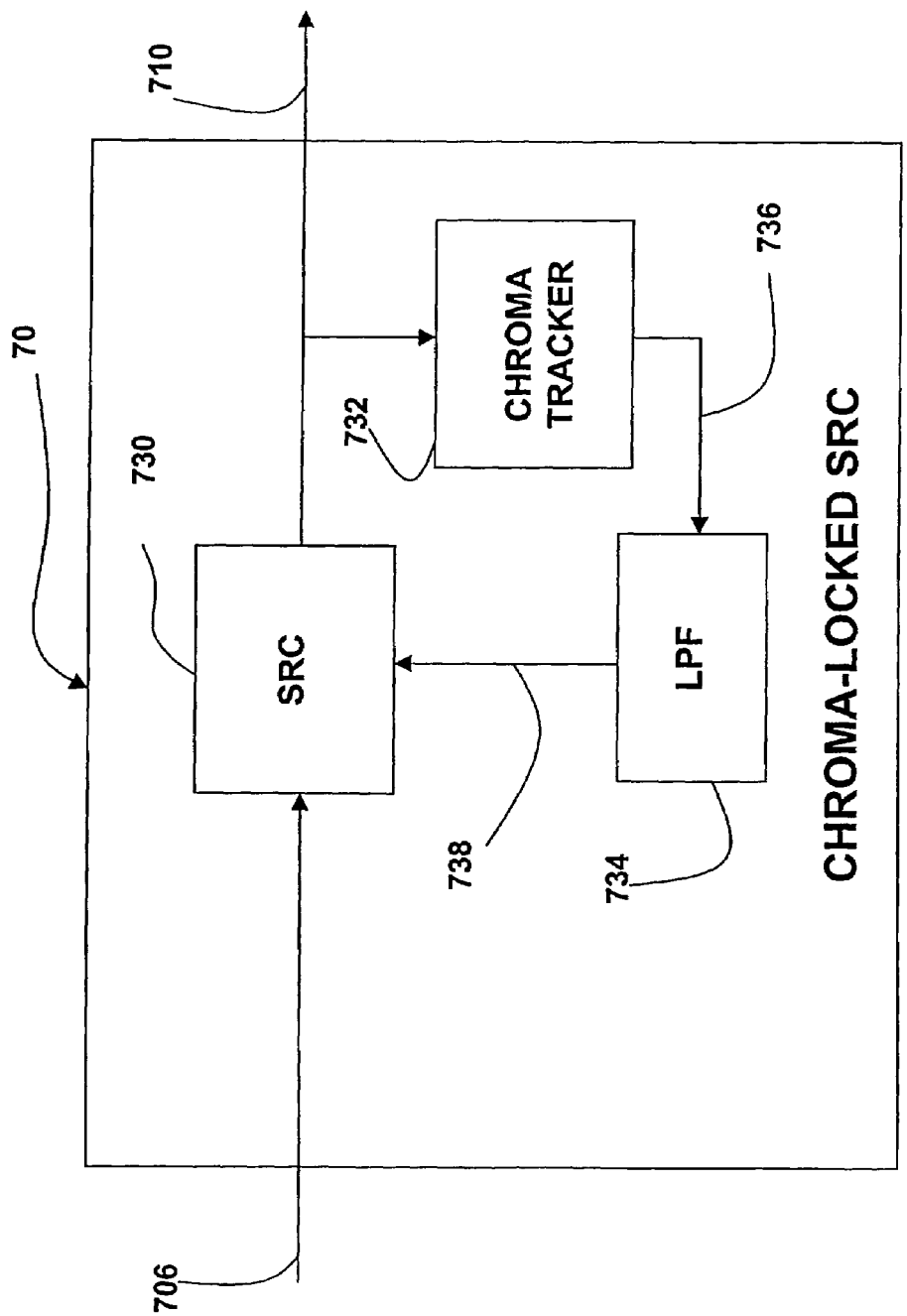
FIG. 19 is a block diagram of an embodiment of a chroma-locked sample rate converter (SRC)

Referring to FIG. 19, the chroma-locked SRC 70 preferably includes a sample rate converter (SRC) 730, a chroma tracker 732 and a low pass filter (LPF). The SRC 730 is preferably a polyphase filter having time-varying coefficients. The SRC is preferably implemented with 35 phases and the conversion ratio of 35/66. The SRC 730 preferably interpolates by exactly 35 and decimates by (66+epsilon), i.e. the decimation rate is preferably adjustable within a range determined by the minimum and maximum values of epsilon, generally a small range. Epsilon is a first adjustment value, which is used to adjust the decimation rate of a first sample rate converter, i.e., the chroma-locked sample rate converter.

Epsilon is preferably generated by the control loop comprising the chroma tracker 732 and the LPF 734, and it can be negative, positive or zero. When the output samples of the SRC 730 are exactly frequency and phase locked to the color sub-carrier then epsilon is zero. The chroma tracker tracks phase and frequency of the chroma bursts and compares them against an expected pattern.

In one embodiment of the present invention, the conversion rate of the chroma-locked SRC is adjusted so that, in effect, the SRC samples the chroma burst at exactly four times per chroma subcarrier cycle. The SRC takes the samples at phases 0 degrees, 90 degrees, 180 degrees and 270 degrees of the chroma sub-carrier cycle. This means that a sample is taken at every cycle of the color sub-carrier at a zero crossing, a positive peak, zero crossing and a negative peak, (0, +1, 0, −1). If the pattern obtained from the samples is different from (0, +1, 0, −1), this difference is detected and the conversion ratio needs to be adjusted inside the control loop.

When the output samples of the chroma-locked SRC are lower in frequency or behind in phase, e.g., the pattern looks like (−1, 0, +1, 0), then the chroma tracker 732 will make epsilon negative. When epsilon is negative, the sample rate conversion ratio is higher than the nominal 35/66, and this has the effect of increasing the frequency or advancing the phase of samples at the output of the chroma-locked SRC. When the output samples of the chroma-locked SRC are higher in frequency or leading in phase, e.g., the pattern looks like (+1, 0, −1, 0), then the chroma tracker 732 will make epsilon positive. When epsilon is positive, the sample rate conversion ratio is lower than the nominal 35/66, and this has the effect of decreasing the frequency or retarding the phase of samples out of the chroma-locked SRC. The chroma tracker provides error signal 736 to the LPF 734 that filters the error signal to filter out high frequency components and provides the filtered error signal to the SRC to complete the control loop.

The sampling clock may run at the system clock frequency or at the clock frequency of the destination of the decoded digital video. If the sampling clock is running at the system clock, the cost of the integrated circuit may be lower than one that has a system clock and a sub-carrier locked video decoder clock. A one clock integrated circuit may also cause less noise or interference to the analog-to-digital converter on the IC. The system is preferably all digital, and does not require an external crystal or a voltage controlled oscillator.

Figure 20:
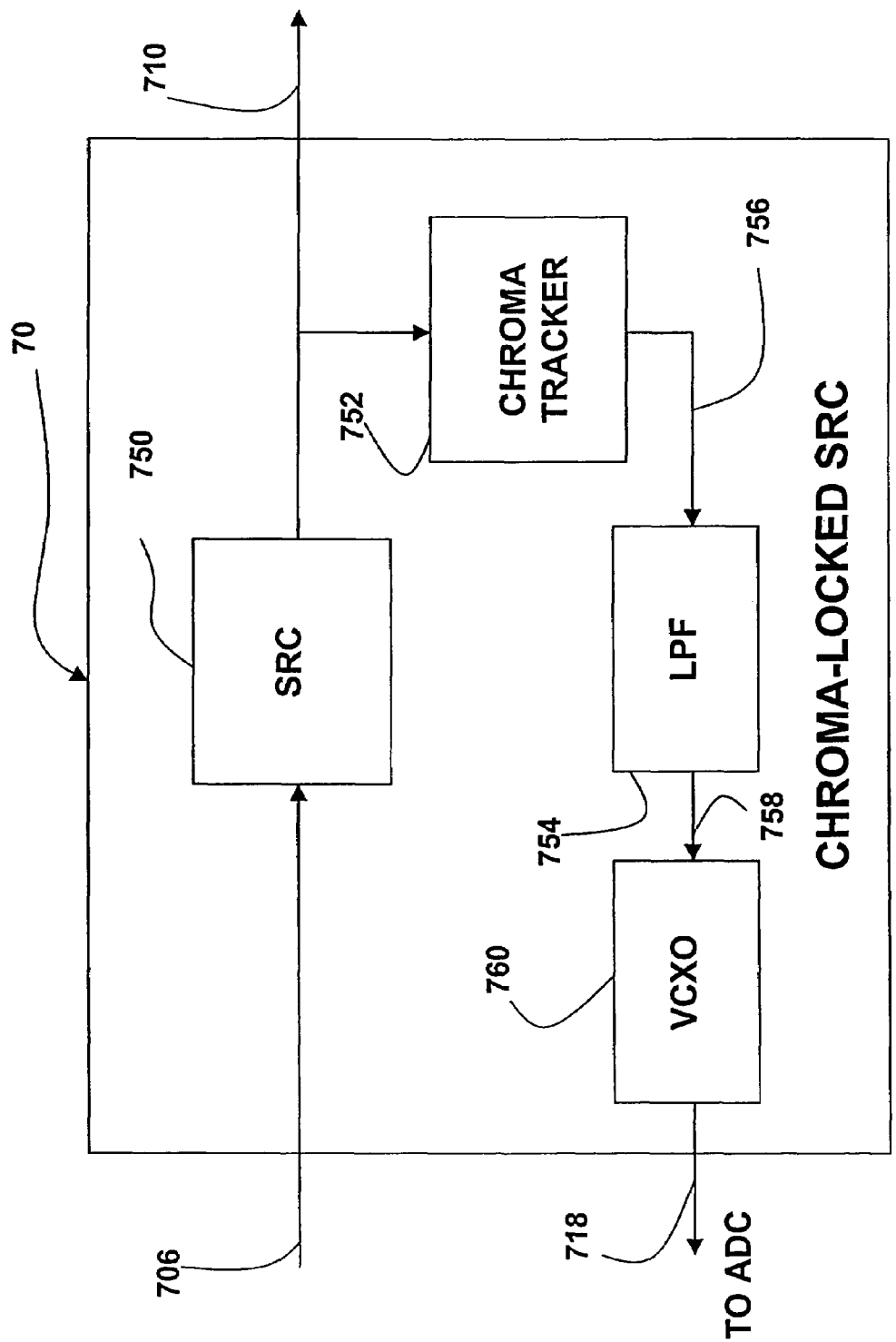
FIG. 20 is a block diagram of an alternate embodiment of the chroma-locked SRC of FIG. 19.

Referring to FIG. 20, an alternate embodiment of the chroma-locked SRC 70 preferably varies the sampling rate while the conversion rate is held constant. A voltage controlled oscillator (e.g., VCXO) 760 varies the sampling rate by providing a sampling frequency signal 718 to the ADC 700. The conversion rate in this embodiment is fixed at 35/66 in the SRC 750 which is the ratio between four times the chroma sub-carrier frequency and 27 MHz.

In this embodiment, the chroma burst signal at the output of the chroma-locked SRC is compared with the expected chroma burst signal in a chroma tracker 752. The error signals 756 from the comparison between the converted chroma burst and the expected chroma burst are passed through a low pass filter 754 and then filtered error signals 758 are provided to the VCXO 760 to control the oscillation frequency of the VCXO. The oscillation frequency of the VCXO changes in response to the voltage level of the provided error signals. Use of input voltage to control the oscillation frequency of a VCXO is well known in the art. The system as described here is a form of a phase locked loop (PLL), the design and use of which is well known in the art.

After the completion of chroma-luma separation and other processing to the chroma and luma components, the samples with the effective sample rate of 4 Fsc (i.e. 4 times the chroma subcarrier frequency) are preferably decimated to samples with a sample rate of nominally 13.5 MHz through the use of a second sample rate converter. Since this sample rate is less than the electrical clock frequency of the digital integrated circuit in the preferred embodiment, only some clock cycles carry valid data. In this embodiment, the sample rate is preferably converted to 13.5 MHz, and is locked to the horizontal line rate through the use of horizontal sync signals. Thus, the second sample rate converter is a line-locked sample rate converter (SRC).

The line-locked sample rate converter converts the current line of video to a constant (Pout) number of pixels. This constant number of pixels Pout is normally 858 for ITU-R BT.601 applications and 780 for NTSC square pixel applications. The current line of video may have a variable number of pixels (Pin). In order to do this conversion from a chroma-locked sample rate, the following steps are performed. The number of input samples Pin of the current line of video is accurately measured. This line measurement is used to calculate the sample rate conversion ratio needed to convert the line to exactly Pout samples. An adjustment value to the sample rate conversion ratio is passed to a sample rate converter module in the line-locked SRC to implement the calculated sample rate conversion ratio for the current line. The sample conversion ratio is calculated only once for each line. Preferably, the line-locked SRC also scales YUV components to the proper amplitudes required by ITU-R BT.601.

The number of samples detected in a horizontal line may be more or less if the input video is a non-standard video. For example, if the incoming video is from a VCR, and the sampling rate is four times the color sub-carrier frequency (4Fsc), then the number of samples taken between two horizontal syncs may be more or less than 910, where 910 is the number of samples per line that is obtained when sampling NTSC standard video at a sampling frequency of 4Fsc. For example, the horizontal line time from a VCR may vary if the video tape has been stretched.

The horizontal line time may be accurately measured by detecting two successive horizontal syncs. Each horizontal sync is preferably detected at the leading edge of the horizontal sync. In other embodiments, the horizontal syncs may be detected by other means. For example, the shape of the entire horizontal sync may be looked at for detection. In the preferred embodiment, the sample rate for each line of video has been converted to four times the color sub-carrier frequency (4Fsc) by the chroma-locked sample rate converter. The measurement of the horizontal line time is preferably done at two levels of accuracy, an integer pixel accuracy and a sub-sample accuracy.

The integer pixel accuracy is preferably done by counting the integer number of pixels that occur between two successive sync edges. The sync edge is presumed to be detected when the data crosses some threshold value. For example, in one embodiment of the present invention, the analog-to-digital converter (ADC) is a 10-bit ADC, i.e., converts an input analog signal into a digital signal with ($2^{10}-1=1023$) scale levels. In this embodiment, the threshold value is chosen to represent an appropriate slicing level for horizontal sync in the 10-bit number system of the ADC; a typical value for this threshold is 128. The negative peak (or a sync tip) of the digitized video signal normally occurs during the sync pulses. The threshold level would normally be set such that it occurs at approximately the mid-point of the sync pulses. The threshold level may be automatically adapted by the video decoder, or it may be set explicitly via a register or other means.

The horizontal sync tracker preferably detects the horizontal sync edge to a sub-sample accuracy of ($\frac{1}{16}$)th of a pixel in order to more accurately calculate the sample rate conversion. The incoming samples generally do not include a sample taken exactly at the threshold value for detecting horizontal sync edges. The horizontal sync tracker preferably detects two successive samples, one of which has a value lower than the threshold value and the other of which has a value higher than the threshold value.

After the integer pixel accuracy is determined (sync edge has been detected) the sub-pixel calculation is preferably started. The sync edge of a horizontal sync is generally not a vertical line, but has a slope. In order to remove noise, the video signal goes through a low pass filter. The low pass filter generally decreases sharpness of the transition, i.e., the low pass filter may make the transition from a low level to a high level last longer.

The horizontal sync tracker preferably uses a sub-sample interpolation technique to obtain an accurate measurement of sync edge location by drawing a straight line between the two successive samples of the horizontal sync signal just above and just below the presumed threshold value to determine where the threshold value has been crossed.

Three values are preferably used to determine the sub-sample accuracy. The three values are the threshold level (T), the value of the sample that crossed the threshold level (V2) and the value of the previous sample that did not cross the threshold level (V1). The sub-sample value is the ratio of (T−V1)/(V2−V1). In the present embodiment a division is not performed. The difference (V2−V1) is divided by 16 to make a variable called DELTA. V1 is then incremented by DELTA until it exceeds the threshold T. The number of times that DELTA is added to V1 in order to make it exceed the threshold (T) is the sub-pixel accuracy in terms of $\frac{1}{16}^{th}$ of a pixel.

For example, if the threshold value T is presumed to be 146 scale levels, and if the values V1 and V2 of the two successive samples are 140 and 156, respectively, the DELTA is calculated to be 1, and the crossing of the threshold value is determined through interpolation to be six DELTAs away from the first of the two successive samples. Thus, if the sample with value 140 is the nth sample and the sample with the value 156 is the (n+1)th sample, the (n+($\frac{6}{16}$))th sample would have had the threshold value. Since the horizontal sync preferably is presumed to be detected at the threshold value of the sync edge, a fractional sample, i.e., $\frac{6}{16}$ sample, is added to the number of samples counted between two successive horizontal syncs.

In order to sample rate convert the current number of input pixels Pin to the desired output pixels Pout, the sample rate converter module has a sample rate conversion ratio of Pin/Pout. The sample rate converter module in the preferred embodiment of the line-locked sample rate converter is a polyphase filter with time-varying coefficients. There is a fixed number of phases (I) in the polyphase filter. In the preferred embodiment, the number of phases (I) is 33. The control for the polyphase filter is the decimation rate (d_act) and a reset phase signal. The line measurement Pin is sent to a module that converts it to a decimation rate d_act such that I/d_act (33/d_act) is equal to Pin/Pout. The decimation rate d_act is calculated as follows: d_act=(I/Pout)*Pin.

If the input video line is the standardized length of time and the four times the color sub-carrier is the standardized frequency then Pin will be exactly 910 samples. This gives a sample rate conversion ratio of (858/910). In the present embodiment the number of phases (the interpolation rate) is 33. Therefore the nominal decimation rate for NTSC is 35 (=(33/858)*910). This decimation rate d_act may then be sent to the sample rate converter module. A reset phase signal is sent to the sample rate converter module after the sub-sample calculation has been done and the sample rate converter module starts processing the current video line. In the preferred embodiment, only the active portion of video is processed and sent on to a time base corrector. This results in a savings of memory needed. Only 720 samples of active video are produced as ITU-R BT.601 output sample rates. In other embodiments, the entire horizontal line may be processed and produced as output.

In the preferred embodiment, the calculation of the decimation rate d_act is done somewhat differently from the equation d_act=(I/Pout)*Pin. The results are the same, but there are savings to hardware. The current line length, Pin, will have a relatively small variance with respect to the nominal line length. Pin is nominally 910. It typically varies by less than 62. For NTSC, this variation is less than 5 microseconds. The following calculation is done: d_act=((I/Pout)*(Pin−Pin_ nominal))+d_act_nominal This preferably results in a hardware savings for the same level of accuracy. The difference (Pin−Pin_nominal) may be represented by fewer bits than are required to represent Pin so a smaller multiplier can be used. For NTSC, d_act_nominal is 35 and Pin_nominal is 910. The value (I/Pout)*(Pin−Pin_ nominal) may now be called a delta_dec (delta decimation rate) or a second adjustment value.

Therefore, in order to maintain the output sample rate of 858 samples per horizontal line, the conversion rate applied preferably is 33/(35+delta_dec) where the samples are interpolated by 33 and decimated by (35+delta_dec). A horizontal sync tracker preferably detects horizontal syncs, accurately counts the number of samples between two successive horizontal syncs and generates delta_dec.

If the number of samples between two successive horizontal syncs is greater than 910, the horizontal sync tracker generates a positive delta_dec to keep the output sample rate at 858 samples per horizontal line. On the other hand, if the number of samples between two successive horizontal syncs is less than 910, the horizontal sync tracker generates a negative delta_dec to keep the output sample rate at 858 samples per horizontal line.

For PAL standard video, the horizontal sync tracker generates the delta_dec to keep the output sample rate at 864 samples per horizontal line.

In summary, the position of each horizontal sync pulse is determined to sub-pixel accuracy by interpolating between two successive samples, one of which being immediately below the threshold value and the other being immediately above the threshold value. The number of samples between the two successive horizontal sync pulses is preferably calculated to sub-sample accuracy by determining the positions of two successive horizontal sync pulses, both to sub-pixel accuracy. When calculating delta_dec, the horizontal sync tracker preferably uses the difference between 910 and the number of samples between two successive horizontal syncs to reduce the amount of hardware needed.

In an alternate embodiment, the decimation rate adjustment value, delta_dec, which is calculated for each line, preferably goes through a low pass filter before going to the sample rate converter module. One of the benefits of this method is filtering of variations in the line lengths of adjacent lines where the variations may be caused by noise that affects the accuracy of the measurement of the sync pulse positions.

In another alternative embodiment, the input sample clock is not free running, but is instead line-locked to the input analog video, preferably 27 MHz. The chroma-locked sample rate converter converts the 27 MHz sampled data to a sample rate of four times the color sub-carrier frequency. The analog video signal is demodulated to luma and chroma component video signals, preferably using a comb filter. The luma and chroma component video signals are then sent to the line-locked sample rate converter where they are preferably converted to a sample rate of 13.5 MHz. In this embodiment the 13.5 MHz sample rate at the output may be exactly one-half of the 27 MHz sample rate at the input. The conversion ratio of the line-locked sample rate converter is preferably exactly one-half of the inverse of the conversion ratio performed by the chroma-locked sample rate converter.

Figure 21:
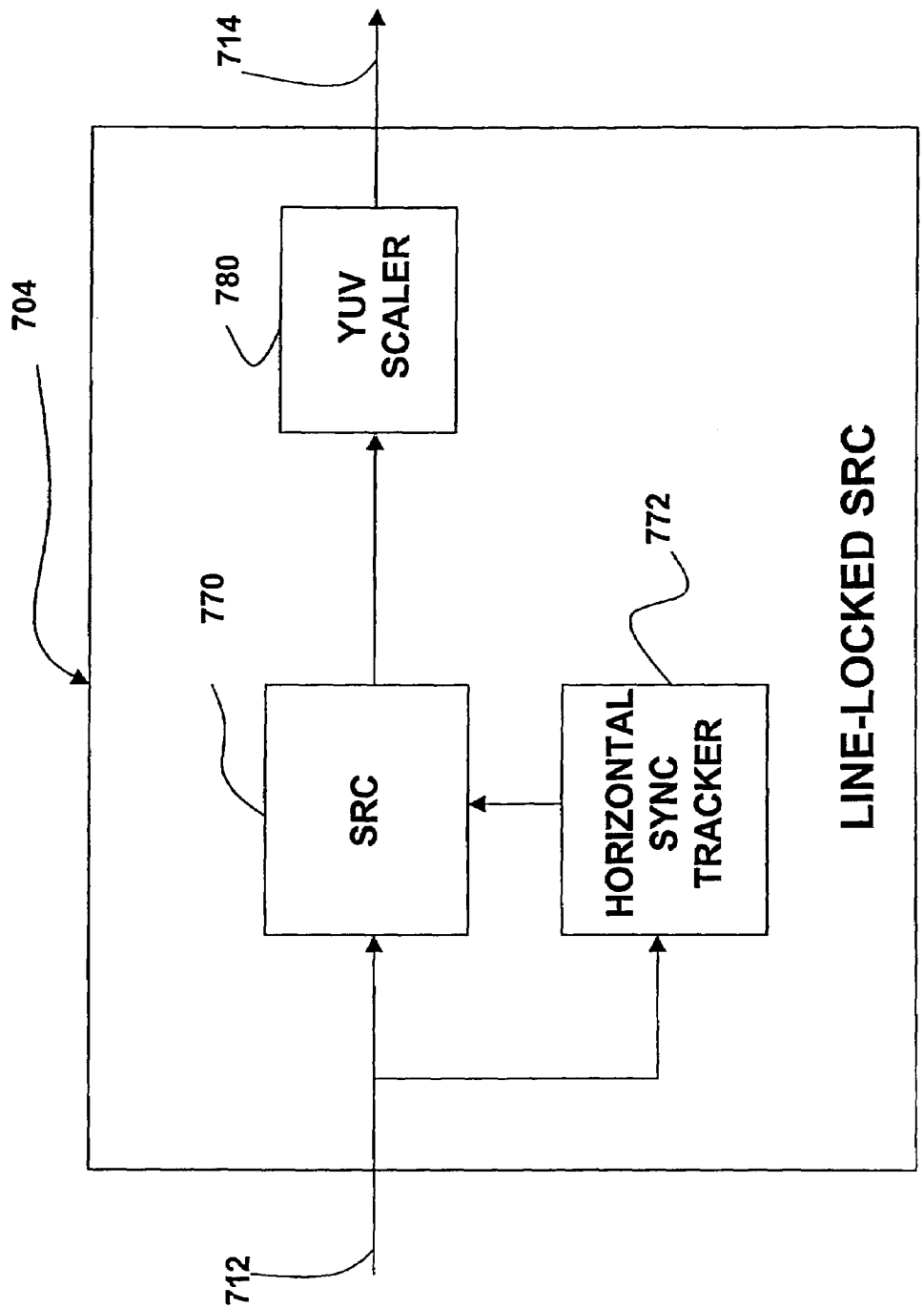
FIG. 21 is a block diagram of an exemplary line-locked SRC.

Referring to FIG. 21, the line-locked SRC 704 preferably includes an SRC 770 which preferably is a polyphase filter with time varying coefficients. The number of phases is preferably fixed at 33 while the nominal decimation rate is 35. In other words, the conversion ratio used is preferably 33/(35+delta_dec) where delta_dec may be positive or negative. The delta_dec is a second adjustment value, which is used to adjust the decimation rate of the second sample rate converter. Preferably, the actual decimation rate and phase are automatically adjusted for each horizontal line so that the number of samples per horizontal line is 858 (720 active Y samples and 360 active U and V samples) and the phase of the active video samples is aligned properly with the horizontal sync signals.

In the preferred embodiment, the decimation (down-sampling) rate of the SRC is preferably controlled by a horizontal sync tracker 772. Preferably, the horizontal sync tracker adjusts the decimation rate once per horizontal line in order to result in a correct number and phase of samples in the interval between horizontal syncs. The horizontal sync tracker preferably provides the adjusted decimation rate to the SRC 770 to adjust the conversion ratio. The decimation rate is preferably calculated to achieve a sub-sample accuracy of $1/16$. Preferably, the line-locked SRC 704 also includes a YUV scaler 780 to scale YUV components to the proper amplitudes required by ITU-R BT.601.

The time base corrector (TBC) preferably synchronizes the samples having the line-locked sample rate of nominally 13.5 MHz to the display clock that runs nominally at 13.5 MHz. Since the samples at the output of the TBC are synchronized to the display clock, passthrough video may be provided to the video compositor without being captured first.

To produce samples at the sample rate of nominally 13.5 MHz, the composite video may be sampled in any conventional way with a clock rate that is generally used in the art. Preferably, the composite video is sampled initially at 27 MHz, down sampled to the sample rate of 14.318 MHz by the chroma-locked SRC, and then down sampled to the sample rate of nominally 13.5 MHz by the line-locked SRC. During conversion of the sample rates, the video decoder uses for timing the 27 MHz clock that was used for input sampling. The 27 MHz clock, being free-running, is not locked to the line rate nor to the chroma frequency of the incoming video.

In the preferred embodiment, the decoded video samples are stored in a FIFO the size of one display line of active video at 13.5 MHz, i.e., 720 samples with 16 bits per sample or 1440 bytes. Thus, the maximum delay amount of this FIFO is one display line time with a normal, nominal delay of one-half a display line time. In the preferred embodiment, video samples are outputted from the FIFO at the display clock rate that is nominally 13.5 MHz. Except for vertical syncs of the input video, the display clock rate is unrelated to the timing of the input video. In alternate embodiments, larger or smaller FIFOs may be used.

Even though the effective sample rate and the display clock rate are both nominally 13.5 MHz the rate of the sampled video entering the FIFO and the display rate are generally different. This discrepancy is due to differences between the actual frequencies of the effective input sample rate and the display clock. For example, the effective input sample rate is nominally 13.5 MHz but it is locked to operate at 858 times the line rate of the video input, while the display clock operates nominally at 13.5 MHz independently of the line rate of the video input.

Since the rates of data entering and leaving the FIFO are typically different, the FIFO will tend to either fill up or become empty, depending on relative rates of the entering and leaving data. In one embodiment of the present invention, video is displayed with an initial delay of one-half a horizontal line time at the start of every field. This allows the input and output rates to differ up to the point where the input and output horizontal phases may change by up to one-half a horizontal line time without causing any glitches at the display.

The FIFO is preferably filled up to approximately one-half full during the first active video line of every field prior to taking any output video. Thus, the start of each display field follows the start of every input video field by a fixed delay that is approximately equal to one-half the amount of time for filling the entire FIFO. As such, the initial delay at the start of every field is one-half a horizontal line time in this embodiment, but the initial delay may be different in other embodiments.

Figure 22:
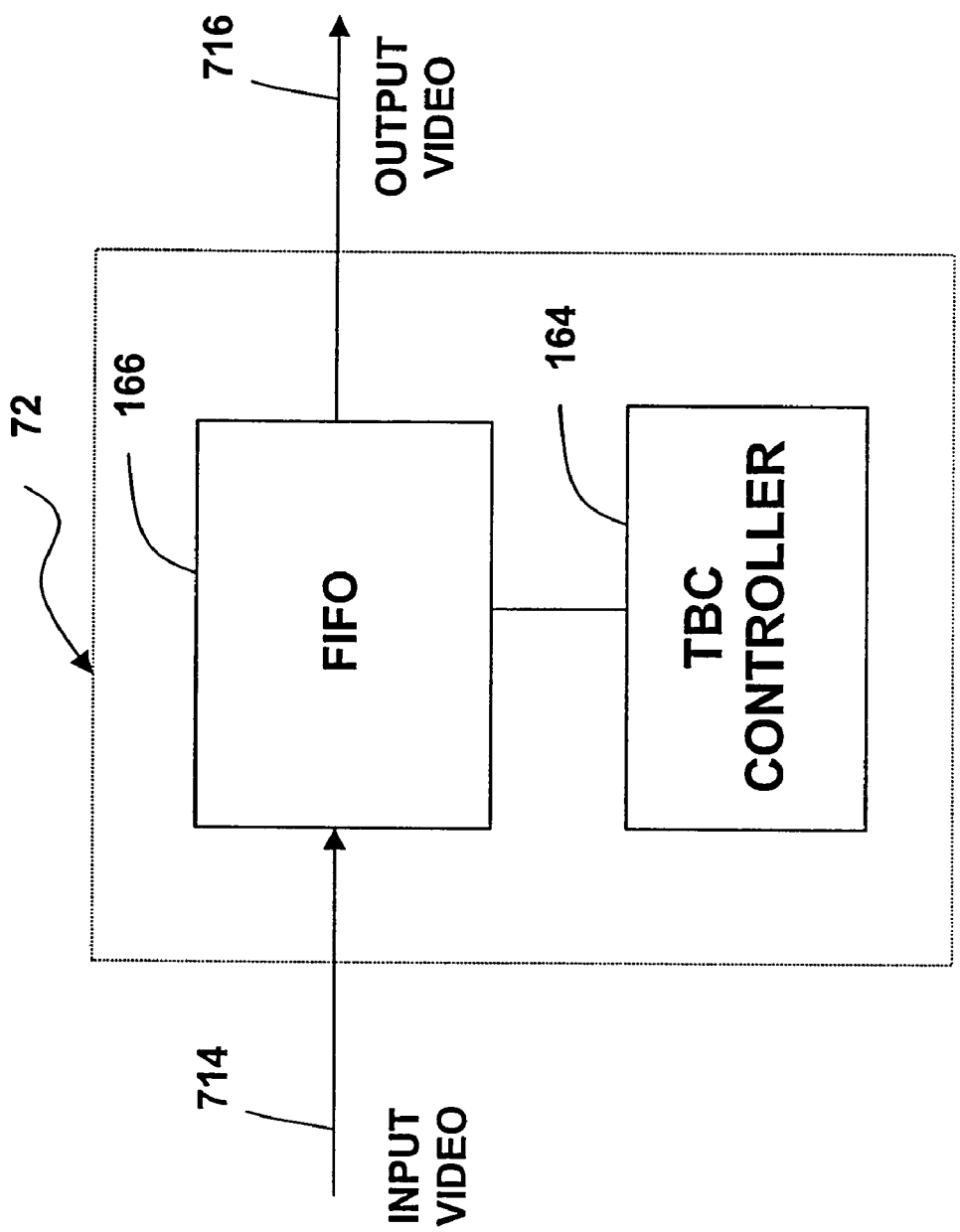
FIG. 22 is a block diagram of an exemplary time base corrector (TBC)

Referring to FIG. 22, the time base corrector (TBC) 72 includes a TBC controller 164 and a FIFO 166. The FIFO 166 receives an input video 714 at nominally 13.5 MHz locked to the horizontal line rate of the input video and outputs a delayed input video as an output video 716 that is locked to the display clock that runs nominally at 13.5 MHz. The initial delay between the input video and the delayed input video is half a horizontal line period of active video, e.g., 53.5 μs per active video in a horizontal line/2=26.75 μs for NTSC standard video.

The TBC controller 164 preferably generates a vertical sync (VSYNC) for display that is delayed by one-half a horizontal line from an input VSYNC. The TBC controller 164 preferably also generates timing signals such as NTSC or PAL standard timing signals. The timing signals are preferably derived from the VSYNC generated by the TBC controller and preferably include horizontal sync. The timing signals are not affected by the input video, and the FIFO is read out synchronously to the timing signals. Data is read out of the FIFO according to the timing at the display side while the data is written into the FIFO according to the input timing. A line reset resets the FIFO write pointer to signal a new line. A read pointer controlled by the display side is updated by the display timing.

As long as the accumulated change in FIFO fullness, in either direction, is less than one-half a video line, the FIFO will generally neither underflow nor overflow during the video field. This ensures correct operation when the display clock frequency is anywhere within a fairly broad range centered on the nominal frequency. Since the process is repeated every field, the FIFO fullness changes do not accumulate beyond one field time.

Figure 23:
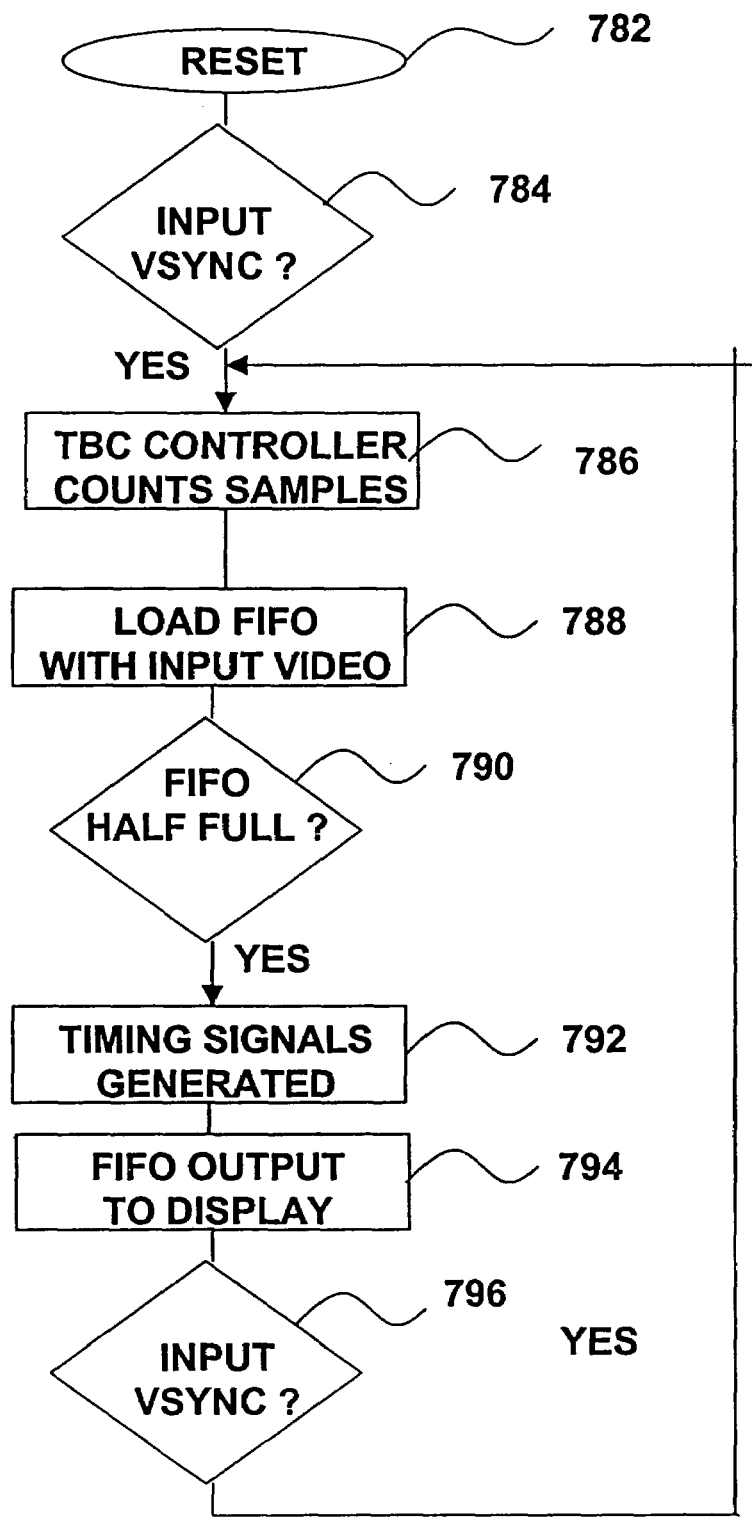
FIG. 23 is a flow diagram of a process that employs a TBC to synchronize an input video to a display clock.

Referring to FIG. 23, a flow diagram of a process using the TBC 72 is illustrated. The process resets in step 782 at system start up. The system preferably checks for vertical sync (VSYNC) of the input video in step 784. After receiving the input VSYNC, the system in step 786 preferably starts counting the number of incoming video samples. The system preferably loads the FIFO in step 788 continuously with the incoming video samples. While the FIFO is being loaded, the system in step 790 checks if enough samples have been received to fill the FIFO up to a half full state.

When enough samples have been received to fill the FIFO to the half full state, the system in step 792 preferably generates timing signals including horizontal sync to synchronize the output of the TBC to the display clock. The system in step 794 preferably outputs the content of the FIFO continuously in sync with the display clock. The system in step 796 preferably checks for another input VSYNC. When another input vertical sync is detected, the process starts counting the number of input video samples again and starts outputting output video samples when enough input video samples have been received to make the FIFO half full.

In other embodiments of the present invention, the FIFO size may be smaller or larger. The minimum size acceptable is determined by the maximum expected difference in the video source sample rate and the display sample rate. Larger FIFOs allow for greater variations in sample rate timing, however at greater expense. For any chosen FIFO size, the logic that generates the sync signal that initiates display video fields should incur a delay from the input video timing of one-half the delay of the entire FIFO as described above. However, it is not required that the delay be one-half the delay of the entire FIFO.

IX. Video Scaler

In certain applications of graphics and video display hardware, it may be necessary or desirable to scale the size of a motion video image either upwards or downwards. It may also be desirable to minimize memory usage and memory bandwidth demands. Therefore it is desirable to scale down before writing to memory, and to scale up after reading from memory, rather than the other way around in either case. Conventionally there is either be separate hardware to scale down before writing to memory and to scale up after reading from memory, or else all scaling is done in one location or the other, such as before writing to memory, even if the scaling direction is upwards.

In the preferred embodiment, a video scaler performs both scaling-up and scaling-down of either digital video or digitized analog video. The video scaler is preferably configured such that it can be used for either scaling down the size of video images prior to writing them to memory or for scaling up the size of video images after reading them from memory. The size of the video images are preferably downscaled prior to being written to memory so that the memory usage and the memory bandwidth demands are minimized. For similar reasons, the size of the video images are preferably upscaled after reading them from memory.

In the former case, the video scaler is preferably in the signal path between a video input and a write port of a memory controller. In the latter case, the video scaler is preferably in the signal path between a read port of the memory controller and a video compositor. Therefore, the video scaler may be seen to exist in two distinct logical places in the design, while in fact occupying only one physical implementation.

This function is preferably achieved by arranging a multiplexing function at the input of the scaling engine, with one input to the multiplexer being connected to the video input port and the other connected to the memory read port. The memory write port is arranged with a multiplexer at its input, with one input to the multiplexer connected to the output of the scaling engine and the other connected to the video input port. The display output port is arranged with a multiplexer at its input, with one connected to the output of the scaling engine and the other input connected to the output of the memory read port.

In the preferred embodiment, there are different clock domains associated with the video input and the display output functions of the chip. The video scaling engine uses a clock that is selected between the video input clock and the display output clock (display clock). The clock selection uses a glitch-free clock selection logic, i.e. a circuit that prevents the creation of extremely narrow clock pulses when the clock selection is changed. The read and write interfaces to memory both use asynchronous interfaces using FIFOs, so the memory clock domain may be distinct from both the video input clock domain and the display output clock domain.

Figure 24:
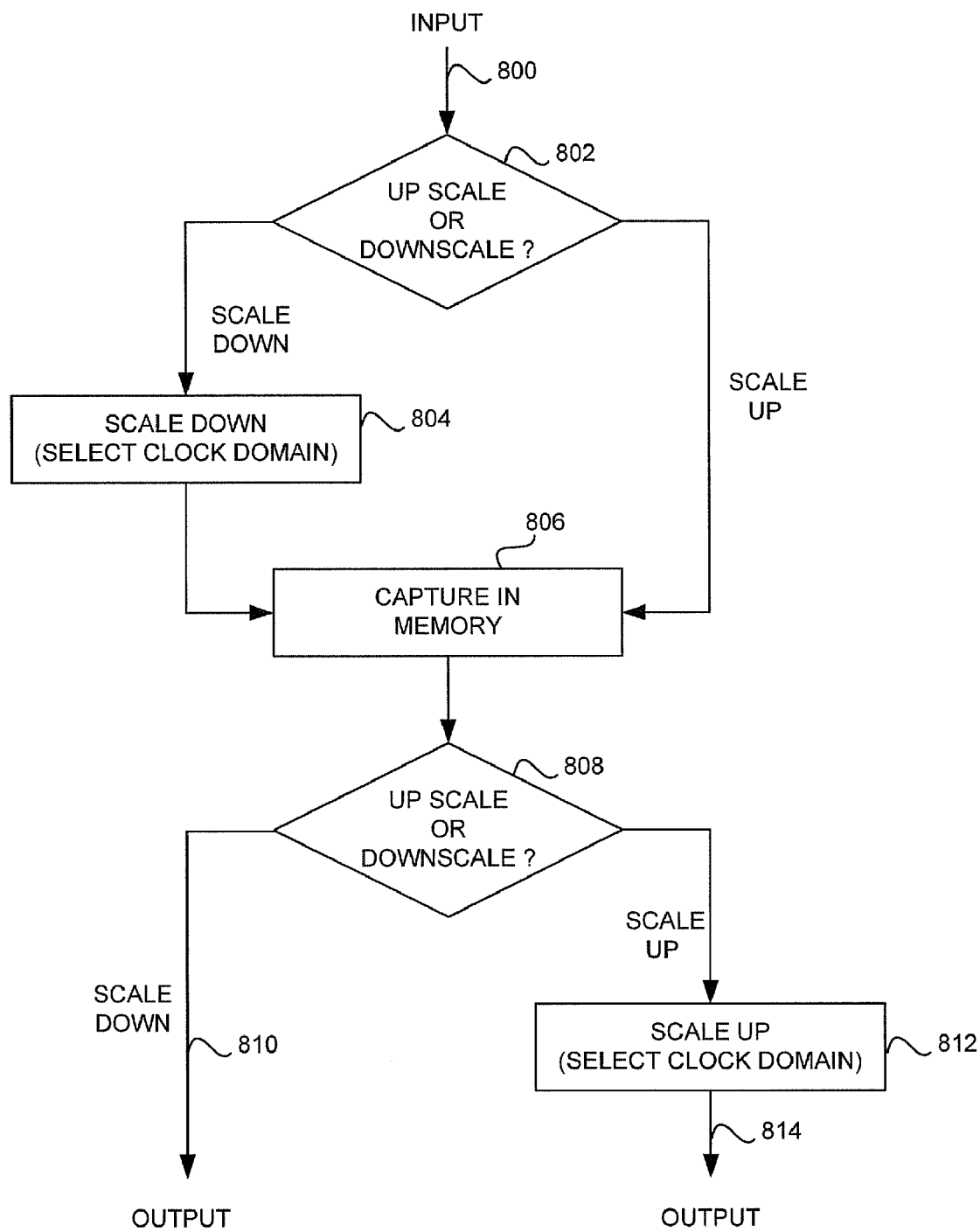
FIG. 24 is a flow diagram of a process for video scaling in which downscaling is performed prior to capture of video in memory and upscaling is performed after reading video data out of memory.

Referring to FIG. 24, a flow diagram illustrates a process of alternatively upscaling or downscaling the video input 800. The system in step 802 preferably selects between a downscaling operation and an upscaling operation. If the downscaling operation is selected, the system in step 804 preferably downscales the input video prior to capturing the input video in memory in step 806. If the upscaling operation is selected in step 802, the system in step 806 preferably captures the input video in memory without scaling it.

Then the system in step 808 outputs the downscaled video as downscaled output 810. The system in step 808, however, sends non-scaled video in the upscale path to be upscaled in step 812. The system in step 812 upscales the non-scaled video and outputs it as upscaled video output 814.

The video pipeline preferably supports up to one scaled video window and one passthrough video window, plus one background color, all of which are logically behind the set of graphics windows. The order of these windows, from back to front, is fixed as background, then passthrough, then scaled video. The video windows are preferably always in YUV format, although they can be in either 4:2:2 or 4:2:0 variants of YUV. Alternatively they can be in RGB or other formats.

When digital video, e.g., MPEG is provided to the graphics display system or when analog video is digitized, the digital video or the digitized analog video is provided to a video compositor using one of three signal paths, depending on processing requirements. The digital video and the digitized analog video are provided to the video compositor as passthrough video over a passthrough path, as upscaled video over an upscale path and a downscaled video over a downscale path.

Either of the digital video or the analog video may be provided to the video compositor as the passthrough video while the other of the digital video or the analog video is provided as an upscaled video or a downscaled video. For example, the digital video may be provided to the video compositor over the passthrough path while, at the same time, the digitized analog video is downscaled and provided to the video compositor over the downscale path as a video window. In one embodiment of the present invention where the scaler engine is shared between the upscale path and the downscale path, the scaler engine may upscale video in either the vertical or horizontal axis while downscaling video in the other axis. However, in this embodiment, an upscale operation and a downscale operation on the same axis are not performed at the same time since only one filter is used to perform both upscaling and downscaling for each axis.

Referring to FIG. 24 a single video scaler 52 preferably performs both the downscaling and upscaling operations. In particular, signals of the downscale path only are illustrated. The video scaler 52 includes a scaler engine 182, a set of line buffers 178, a vertical coefficient memory 180A and a horizontal coefficient memory 180B. The scaler engine 182 is implemented as a set of two polyphase filters, one for each of horizontal and vertical dimensions.

In one embodiment of the present invention, the vertical polyphase filter is a four-tap filter with programmable coefficients from the vertical coefficient memory 180A. In other embodiments, the number of taps in the vertical polyphase filter may vary. In one embodiment of the present invention, the horizontal polyphase filter is an eight-tap filter with programmable coefficients from the horizontal coefficient memory 180B. In other embodiments, the number of taps in the horizontal polyphase filter may vary.

The vertical and the horizontal coefficient memories may be implemented in SRAM or any other suitable memory. Depending on the operation to be performed, e.g. a vertical or horizontal axis, and scaling-up or scaling-down, appropriate filter coefficients are used, respectively, from the vertical and horizontal coefficient memories. Selection of filter coefficients for scaling-up and scaling-down operations are well known in the art.

The set of line buffers 178 are used to provide input of video data to the horizontal and vertical polyphase filters. In this embodiment, three line buffers are used, but the number of the line buffers may vary in other embodiments. In this embodiment, each of the three line buffers is used to provide an input to one of the taps of the vertical polyphase filter with four taps. The input video is provided to the fourth tap of the vertical polyphase filter. A shift register having eight cells in series is used to provide inputs to the eight taps of the horizontal polyphase filter, each cell providing an input to one of the eight taps.

In this embodiment, a digital video signal 820 and a digitized analog signal video 822 are provided to a first multiplexer 168 as first and second inputs. The first multiplexer 168 has two outputs. A first output of the first multiplexer is provided to the video compositor as a pass through video 186. A second output of the first multiplexer is provided to a first input of a second multiplexer 176 in the downscale path.

In the downscale path, the second multiplexer 176 provides either the digital video or the digitized analog video at the second multiplexer's first input to the video scaler 52. The video scaler provides a downscaled video signal to a second input of a third multiplexer 162. The third multiplexer provides the downscaled video to a capture FIFO 158 which stores the captured downscaled video. The memory controller 126 takes the captured downscaled video and stores it as a captured downscaled video image into a video FIFO 148. An output of the video FIFO is coupled to a first input of a fourth multiplexer 188. The fourth multiplexer provides the output of the video FIFO, which is the captured downscaled video image, as an output 824 to the graphics compositor, and this completes the downscale path. Thus, in the downscale path, either the digital video or the digitized analog video is downscaled first, and then captured.

Figure 25:
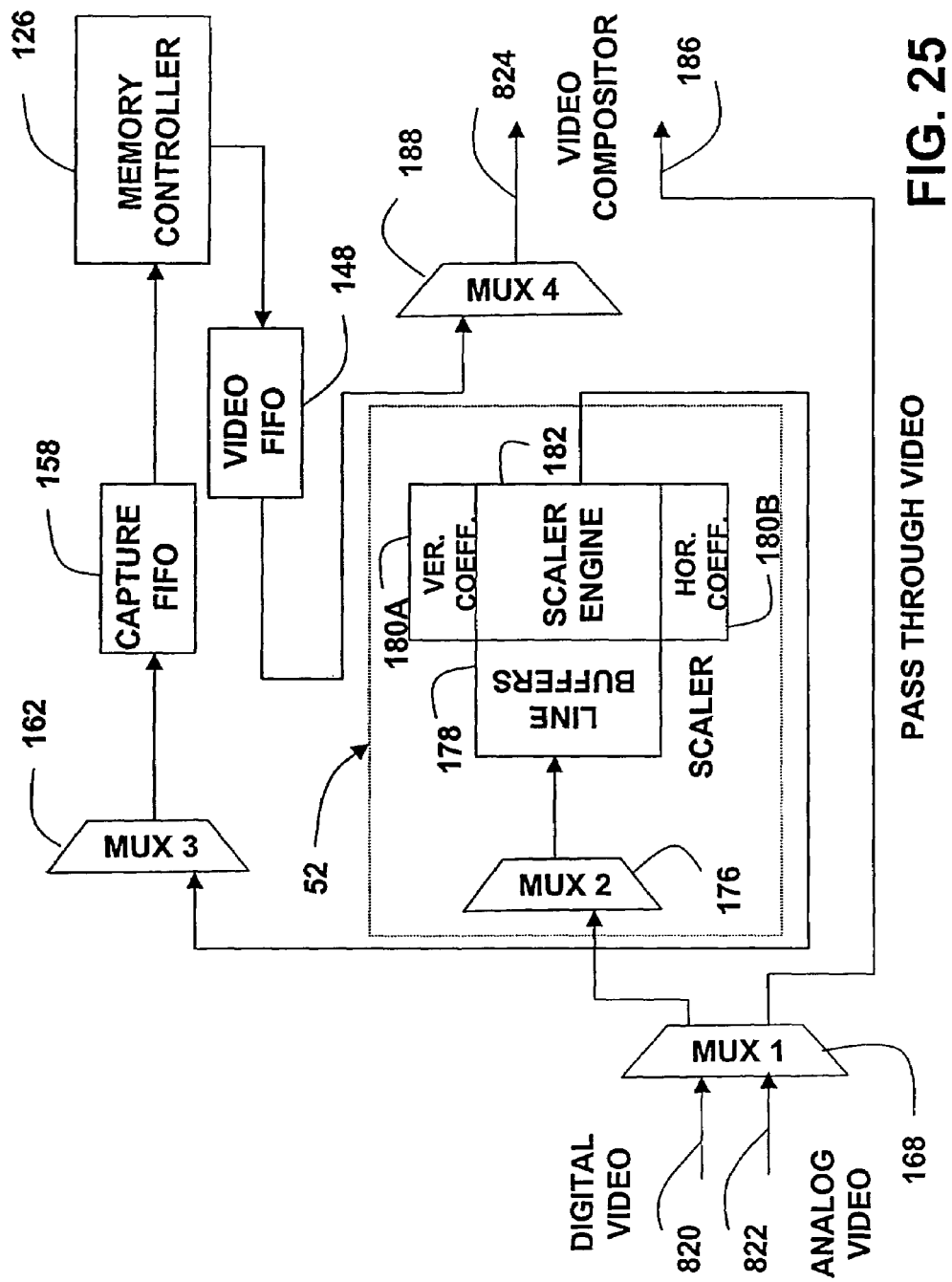
FIG. 25 is a detailed block diagram of components used during video scaling with signal paths involved in downscaling.
Figure 26:
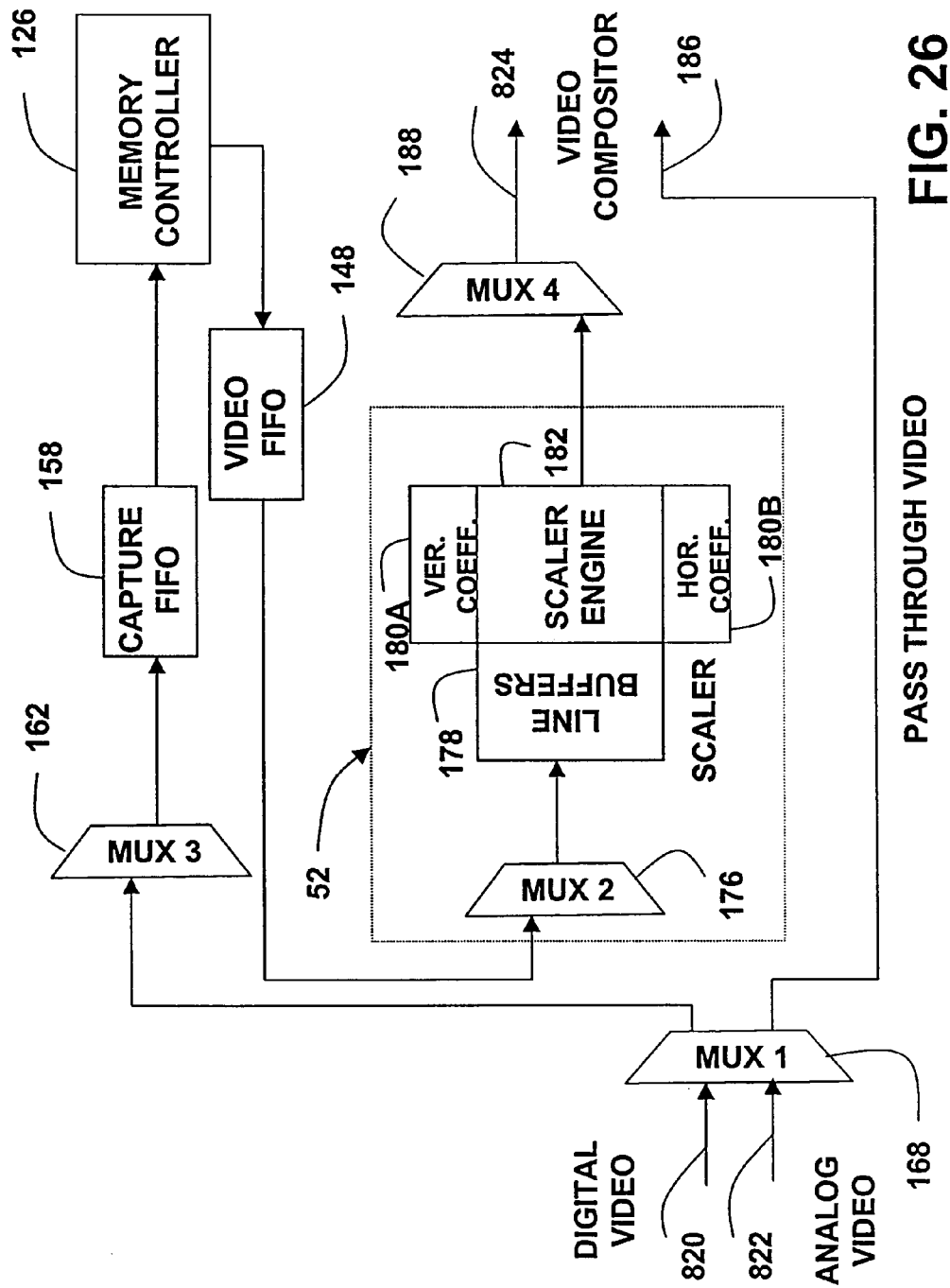
FIG. 26 is a detailed block diagram of components used during video scaling with signal paths involved in upscaling.

FIG. 26 is similar to FIG. 25, but in FIG. 26, signals of the upscale path are illustrated. In the upscale path, the third multiplexer 162 provides either the digital video 820 or the digitized analog video 822 to the capture FIFO 158 which captures and stores input as a captured video image. This captured video image is provided to the memory controller 126 which takes it and provides to the video FIFO 148 which stores the captured video image.

An output of the video FIFO 148 is provided to a second input of the second multiplexer 176. The second multiplexer provides the captured video image to the video scaler 52. The video scaler scales up the captured video image and provides it to a second input of the fourth multiplexer 188 as an upscaled captured video image. The fourth multiplexer provides the upscaled captured video image as the output 824 to the video compositor. Thus, in the upscale path, either the digital video or the digitized analog video is captured first, and then upscaled.

Figure 27:
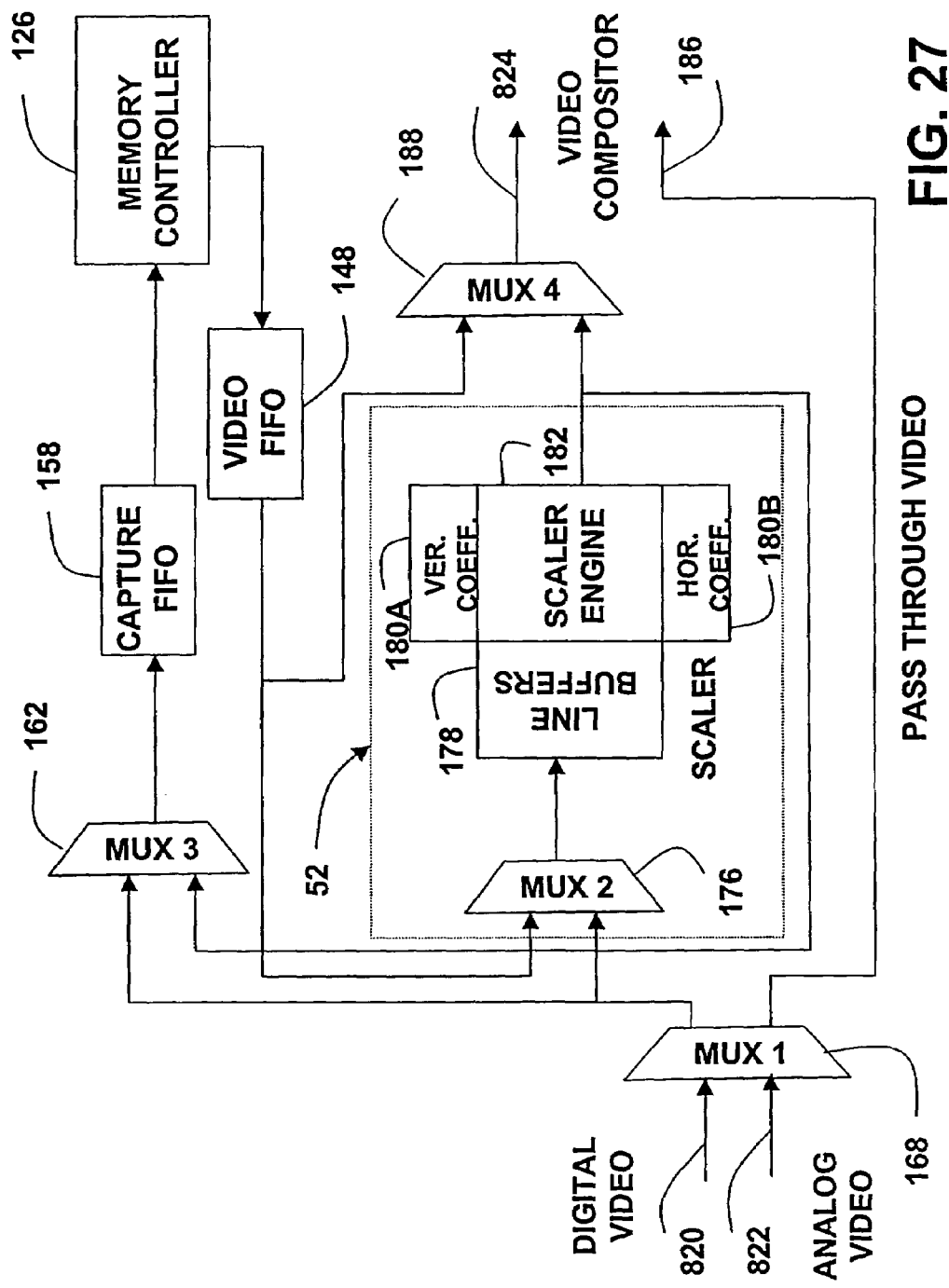
FIG. 27 is a detailed block diagram of components that may be used during video scaling with signal paths indicated for both upscaling and downscaling.

Referring to FIG. 27, FIG. 27 is similar to FIG. 25 and FIG. 26, but in FIG. 27, signals of both the upscale path and the downscale path are illustrated.

X. Blending of Graphics and Video Surfaces

The graphics display system of the present invention is capable of processing an analog video signal, a digital video signal and graphics data simultaneously. In the graphics display system, the analog and digital video signals are processed in the video display pipeline while the graphics data is processed in the graphics display pipeline. After the processing of the video signals and the graphics data have been completed, they are blended together at a video compositor. The video compositor receives video and graphics data from the video display pipeline and the graphics display pipeline, respectively, and outputs to the video encoder ("VEC").

The system may employ a method of compositing a plurality of graphics images and video, which includes blending the plurality of graphics images into a blended graphics image, combining a plurality of alpha values into a plurality of composite alpha values, and blending the blended graphics image and the video using the plurality of composite alpha values.

Figure 28:
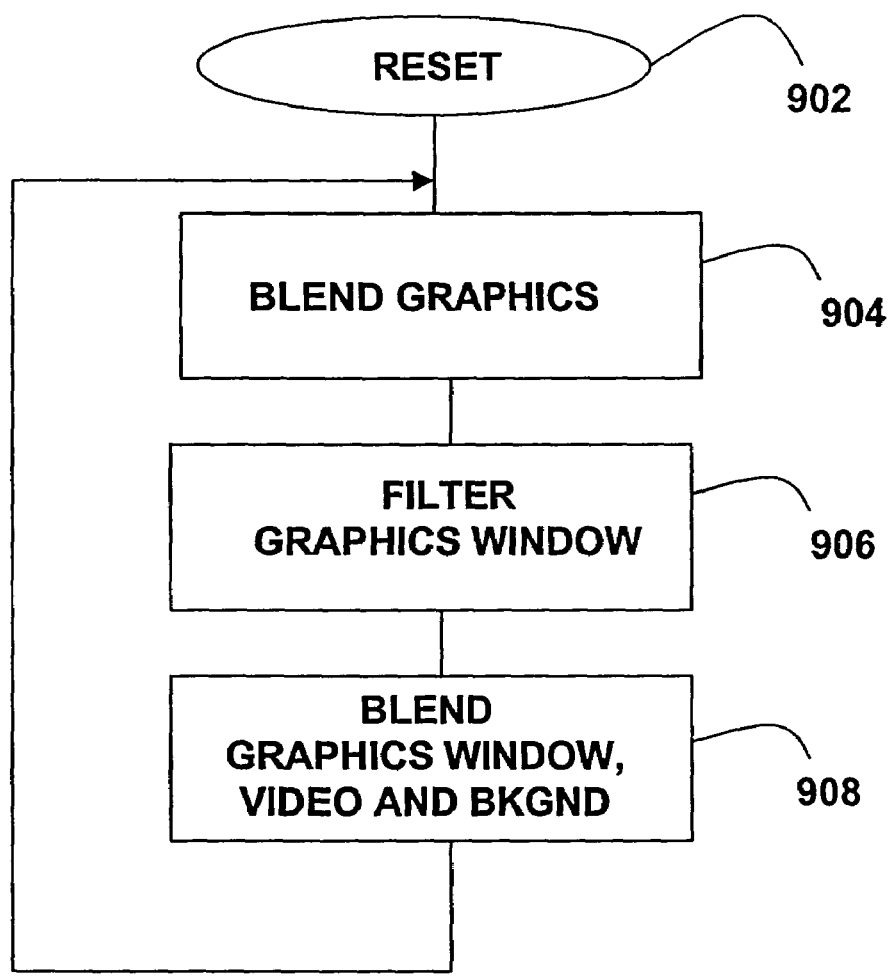
FIG. 28 is a flow diagram of an exemplary process for blending graphics and video surfaces.

Referring to FIG. 28, a flow diagram of a process of blending video and graphics surfaces is illustrated. The graphics display system resets in step 902. In step 904, the video compositor blends the passthrough video and the background color with the scaled video window, using the alpha value which is associated with the scaled video window. The result of this blending operation is then blended with the output of the graphics display pipeline. The graphics output has been pre-blended in the graphics blender in step 904 and filtered in step 906, and blended graphics contain the correct alpha value for multiplication by the video output. The output of the video blend function is multiplied by the video alpha which is obtained from the graphics pipeline and the resulting video and graphics pixel data stream are added together to produce the final blended result.

In general, during blending of different layers of graphics and/or video, every layer {L1, L2, L3 ... Ln}, where L1 is the back-most layer, each layer is blended with the composition of all of the layers behind it, beginning with L2 being blended on top of L1. The intermediate result R(i) from the blending of pixels P(i) of layer L(i) over the pixels P(i−1) of layer L(i−1) using alpha value A(i) is: R(i)=A(i)*P(i)+(1−A(i))*P(i−1).

The alpha values {A(i)} are in general different for every layer and for every pixel of every layer. However, in some important applications, it is not practical to apply this formula directly, since some layers may need to be processed in spatial dimensions (e.g. 2 dimensional filtering or scaling) before they can be blended with the layer or layers behind them. While it is generally possible to blend the layers first and then perform the spatial processing, that would result in processing the layers that should not be processed if these layers are behind the subject layer that is to be processed. Processing of the layers that are not to be processed may be undesirable.

Processing the subject layer first would generally require a substantial amount of local storage of the pixels in the subject layer, which may be prohibitively expensive. This problem is significantly exacerbated when there are multiple layers to be processed in front of one or more layers that are not to be processed. In order to implement the formula above directly, each of the layers would have to be processed first, i.e. using their own local storage and individual processing, before they could be blended with the layer behind.

In the preferred embodiment, rather than blending all the layers from back to front, all of the layers that are to be processed (e.g. filtered) are layered together first, even if there is one or more layers behind them over which they should be blended, and the combined upper layers are then blended with the other layers that are not to be processed. For example, layers {1, 2 and 3} may be layers that are not to be processed, while layers {4, 5, 6, 7, and 8} may be layers that are to undergo processing, while all 8 layers are to be blended together, using {A(i)} values that are independent for every layer and pixel. The layers that are to be filtered, upper layers, may be the graphics windows. The lower layers may include the video window and passthrough video.

In the preferred embodiment, all of the layers that are to be filtered (referred to as "upper" layers) are blended together from back to front using a partial blending operation. In an alternate embodiment, two or more of the upper layers may be blended together in parallel. The back-most of the upper layers is not in general the back-most layer of the entire operation.

In the preferred embodiment, at each stage of the blending, an intermediate alpha value is maintained for later use for blending with the layers that are not to be filtered (referred to as the "lower" layers).

The formula that represents the preferred blending scheme is:

$$R(i)=A(i)*P(i)+(1-A(i))*P(i-1)$$

and $$AR(i)=AR(i-1)*(1-A(i))$$

where R(i) represents the color value of the resulting blended pixel, P(i) represents the color value of the current pixel, A(i) represents the alpha value of the current pixel, P(i−1) represents the value at the location of the current pixel of the composition of all of the upper layers behind the current pixel, initially this represents black before any layers are blended, AR(i) is the alpha value resulting from each instance of this operation, and AR(i−1) represents the intermediate alpha value at the location of the current pixel determined from all of the upper layers behind the current pixel, initially this represents transparency before any layers are blended. AR represents the alpha value that will subsequently be multiplied by the lower layers as indicated below, and so an AR value of 1 (assuming alpha ranges from 0 to 1) indicates that the current pixel is transparent and the lower layers will be fully visible when multiplied by 1.

In other words, in the preferred embodiment, at each stage of blending the upper layers, the pixels of the current layer are blended using the current alpha value, and also an intermediate alpha value is calculated as the product (1−A(i))* (AR(i−1)). The key differences between this and the direct evaluation of the conventional formula are: (1) the calculation of the product of the set of {(1−A(i))} for the upper layers, and (2) a virtual transparent black layer is used to initialize the process for blending the upper layers, since the lower layers that would normally be blended with the upper layers are not used at this point in this process.

The calculation of the product of the sets of $\{(1-A(i)\}$ for the upper layers is implemented, in the preferred embodiment, by repeatedly calculating $AR(i)=AR(i-1)*(1-A(i))$ at each layer, such that when all layers $\{i\}$ have been processed, the result is that AR=the product of all $(1-A(i))$ values for all upper layers. Alternatively in other embodiments, the composite alpha value for each pixel of blended graphics may be calculated directly as the product of all (1-alpha value of the corresponding pixel of the graphics image on each layer)'s without generating an intermediate alpha at each stage.

To complete the blending process of the entire series of layers, including the upper and lower layers, once the upper layers have been blended together as described above, they may be processed as desired and then the result of this processing, a composite intermediate image, is blended with the lower layer or layers. In addition, the resulting alpha values preferably are also processed in essentially the same way as the image components. The lower layers can be blended in the conventional fashion, so at some point there can be a single image representing the lower layers. Therefore two images, one representing the upper layers and one representing the lower layers can be blended together. In this operation, the AR(n) value at each pixel that results from the blending of the upper layers and any subsequent processing is used to be multiplied with the composite lower layer.

Mathematically this latter operation is as follows: let L(u) be the composite upper layer resulting from the process described above and after any processing, let AR(u) be the composite alpha value of the upper layers resulting from the process above and after any processing, let L(l) be the composite lower layer that results from blending all lower layers in the conventional fashion and after any processing, and let Result be the final result of blending all the upper and lower layers, after any processing. Then, Result=L(u)+AR(u)*L(l). L(u) does not need to be multiplied by any additional alpha values, since all such multiplication operations were already performed at an earlier stage.

In the preferred embodiment, a series of images makes up the upper layers. These are created by reading pixels from memory, as in a conventional graphics display device. Each pixel is converted into a common format if it is not already in that format; in this example the YUV format is used. Each pixel also has an alpha value associated with it. The alpha values can come from a variety of sources, including (1) being part of the pixel value read from memory (2) an element in a color look-up table (CLUT) in cases where the pixel format uses a CLUT (3) calculated from the pixel color value, e.g. alpha as a function of Y, (4) calculated using a keying function, i.e. some pixel values are transparent (i.e. alpha=0) and others are opaque (alpha=1) based on a comparison of the pixel value with a set of reference values, (5) an alpha value may be associated with a region of the image as described externally, such as a rectangular region, described by the four corners of the rectangle, may have a single alpha value associated with it, or (6) some combination of these.

The upper layers are preferably composited in memory storage buffers called line buffers. Each line buffer preferably is sized to contain pixels of one scan line. Each line buffer has an element for each pixel on a line, and each pixel in the line buffer has elements for the color components, in this case Y, U and V, and one for the intermediate alpha value AR. Before compositing of each line begins, the appropriate line buffer is initialized to represent a transparent black having already been composited into the buffer; that is, the YUV value is set to the value that represents black (i.e. Y=0, U=V=128) and the alpha value AR is set to represent (1−transparent)=(1−0)=1.

Each pixel of the current layer on the current line is combined with the value pre-existing in the line buffer using the formulas already described, i.e., $R(i)=A(i)*P(i)+(1-A(i))*P(i-1)$ and $AR(i)=AR(i-1)*(1-A(i))$.

In other words, the color value of the current pixel P(i) is multiplied by its alpha value A(i), and the pixel in the line buffer representing the same location on the line P(i−1) is read from the line buffer, multiplied by (1−A(i)), and added to the previous result, producing the resulting pixel value R(i). Also, the alpha value at the same location in the line buffer (AR(i−1)) is read from the buffer and multiplied by (1−A(i)), producing AR(i). The results R(i) and AR(i) are then written back to the line buffer in the same location.

When multiplying a YUV value by an alpha value between 0 and 1, the offset nature of the U and V values should preferably be accounted for. In other words, U=V=128 represents a lack of color and it is the value that should result from a YUV color value being multiplied by 0. This can be done in at least two ways. In one embodiment of the present invention, 128 is subtracted from the U and V values before multiplying by alpha, and then 128 is added to the result. In another embodiment, U and V values are directly multiplied by alpha, and it is ensured that at the end of the entire compositing process all of the coefficients multiplied by U and V sum to 1, so that the offset 128 value is not distorted significantly.

Each of the layers in the group of upper layers is preferably composited into a line buffer starting with the back-most of the upper layers and progressing towards the front until the front-most of the upper layers has been composited into the line buffer. In this way, a single hardware block, i.e., the display engine, may be used to implement the formula above for all of the upper layers. In this arrangement, the graphics compositor engine preferably operates at a clock frequency that is substantially higher than the pixel display rate. In one embodiment of the present invention, the graphics compositor engine operates at 81 MHz while the pixel display rate is 13.5 MHz.

This process repeats for all of the lines in the entire image, starting at the top scan line and progressing to the bottom. Once the compositing of each scan line into a line buffer has been completed, the scan line becomes available for use in processing such as filtering or scaling. Such processing may be performed while subsequent scan lines are being composited into other line buffers. Various processing operations may be selected such as anti-flutter filtering and vertical scaling.

In alternative embodiments more than one graphics layer may be composited simultaneously, and in some such embodiments it is not necessary to use line buffers as part of the compositing process. If all upper layers are composited simultaneously, the combination of all upper layers can be available immediately without the use of intermediate storage.

Figure 29:
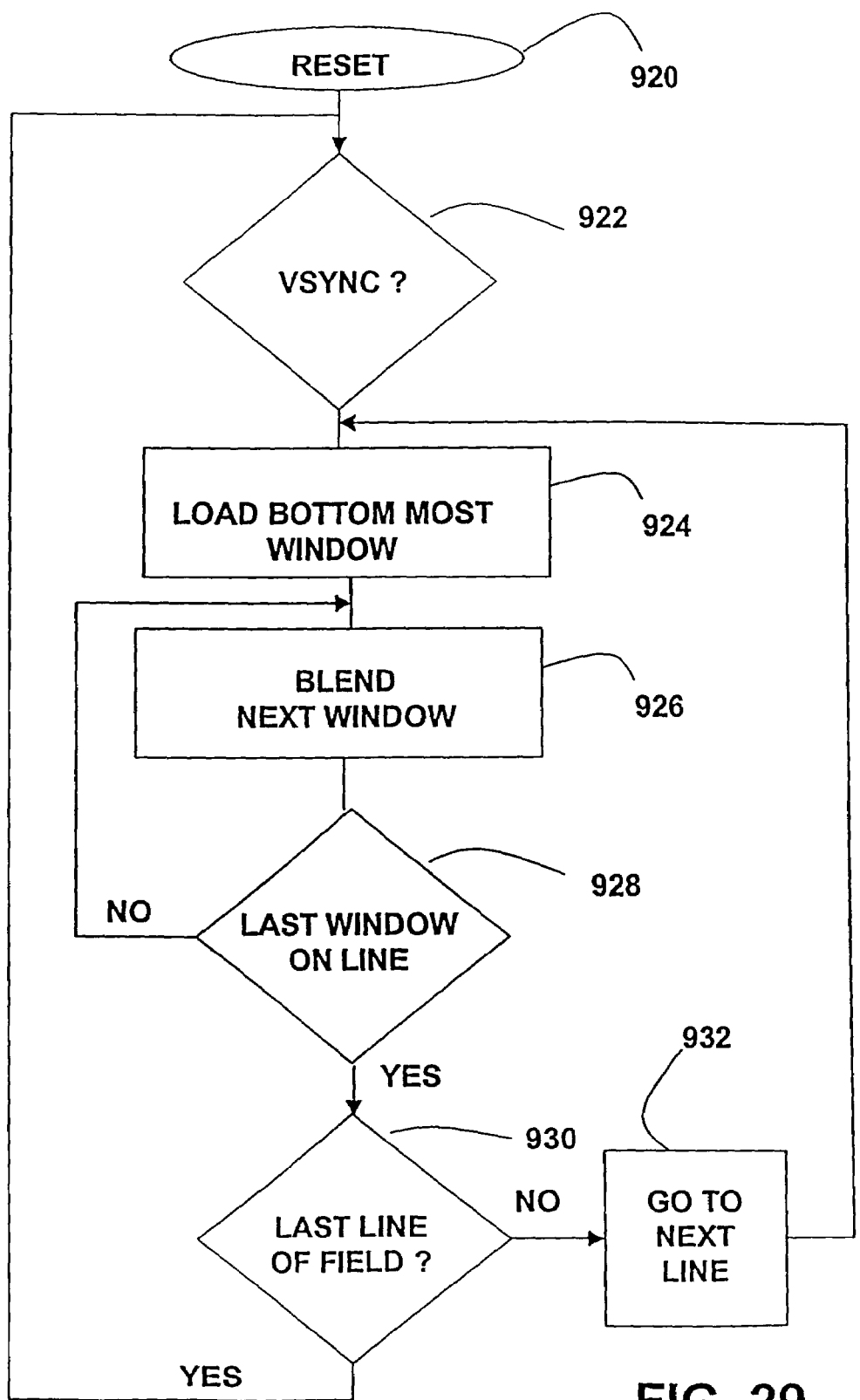
FIG. 29 is a flow diagram of an exemplary process for blending graphics windows into a combined blended graphics output.

Referring to FIG. 29, a flow diagram of a process of blending graphics windows is illustrated. The system preferably resets in step 920. In step 922, the system preferably checks for a vertical sync (VSYNC). If a VSYNC has been received, the system in step 924 preferably loads a line from the bottom most graphics window into a graphics line buffer. Then the system in step 926 preferably blends a line from the next graphics window into the line buffer. Then the system in step 928 preferably determines if the last graphics window visible on a current display line has been blended. If the last graphics window has not been blended, the system continues on with the blending system in step 926.

If the last window of the current display line has been reached, the system preferably checks in step 930 to determine if the last graphics line of a current display field has been blended. If the last graphics line has been blended, the system awaits another VSYNC in step 922. If the last graphics line has not been blended, the system goes to the next display line in step 932 and repeats the blending process.

Figure 30:
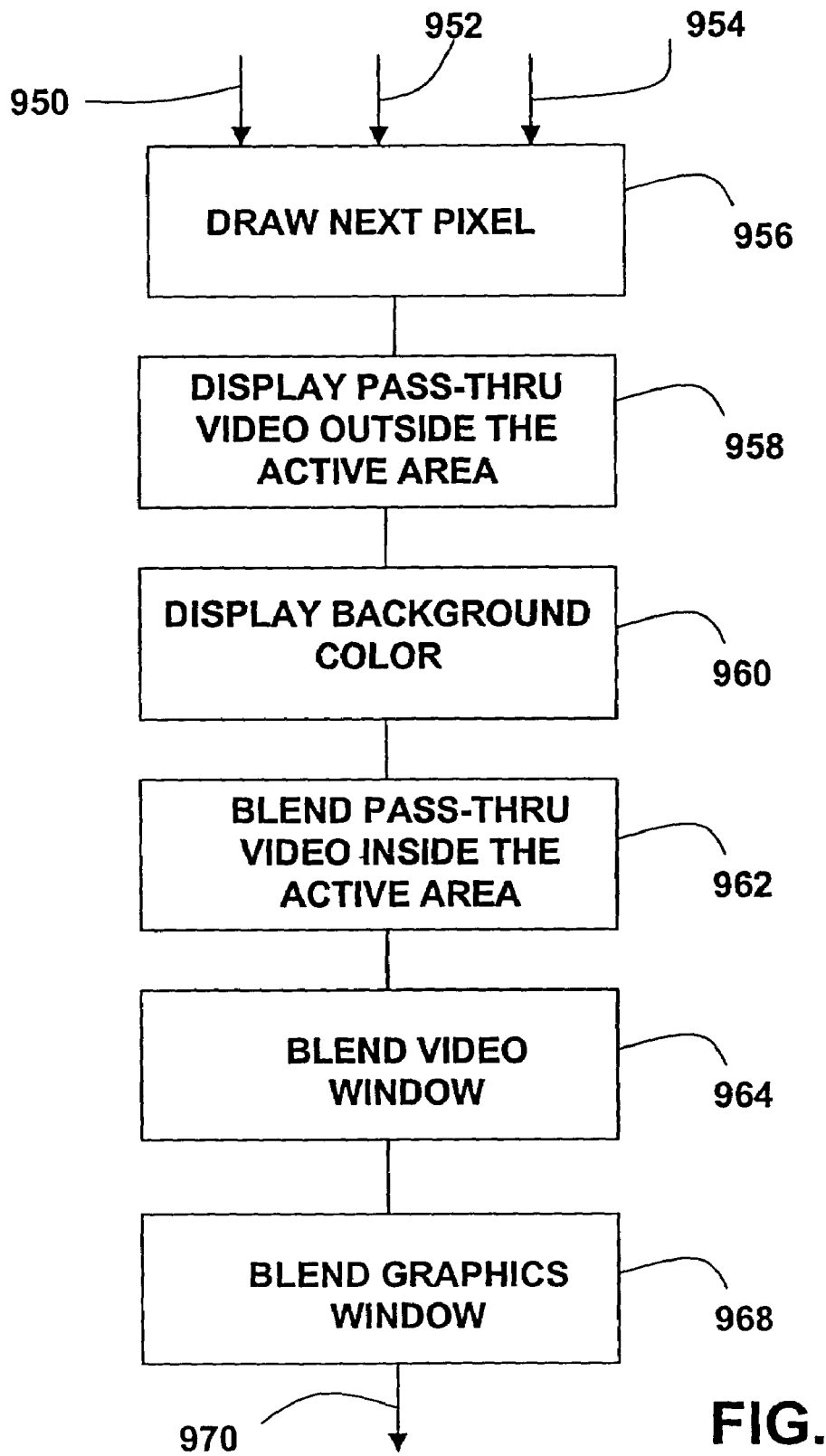
FIG. 30 is a flow diagram of an exemplary process for blending graphics, video and background color.

Referring to FIG. 30, a flow diagram of a process of receiving blended graphics 950, a video window 952 and a passthrough video 954 and blending them. A background color preferably is also blended in one embodiment of the present invention. As step 956 indicates, the video compositor preferably displays each pixel as they are composited without saving pixels to a frame buffer or other memory.

When the video signals and graphics data are blended in the video compositor, the system in step 958 preferably displays the passthrough video 954 outside the active window area first. There are 525 scan lines in each frame and 858 pixels in each scan line of NTSC standard television signals, when a sample rate of 13.5 MHz is used, per ITU-R Bt.601. An active window area of the NTSC standard television is inside an NTSC frame. There are 625 scan lines per frame and 864 pixels in each scan line of PAL standard television, when using the ITU-R Bt.601 standard sample rate of 13.5 MHz. An active window area of the PAL standard television is inside a PAL frame.

Within the active window area, the system in step 960 preferably blends the background color first. On top of the background color, the system in step 962 preferably blends the portion of the passthrough video that falls within the active window area. On top of the passthrough window, the system in step 964 preferably blends the video window. Finally, the system in step 968 blends the graphics window on top of the composited video window and outputs composited video 970 for display.

Interlaced displays, such as televisions, have an inherent tendency to display an apparent vertical motion at the horizontal edges of displayed objects, with horizontal lines, and on other points on the display where there is a sharp contrast gradient along the vertical axis. This apparent vertical motion is variously referred to as flutter, flicker, or judder.

While some image elements can be designed specifically for display on interlaced TVs or filtered before they are displayed, when multiple such image objects are combined onto one screen, there are still visible flutter artifacts at the horizontal top and bottom edges of these objects. While it is also possible to include filters in hardware to minimize visible flutter of the display, such filters are costly in that they require higher memory bandwidth from the display memory, since both even and odd fields should preferably be read from memory for every display field, and they tend to require additional logic and memory on-chip.

One embodiment of the present invention includes a method of reducing interlace flutter via automatic blending. This method has been designed for use in graphics displays device that composites visible objects directly onto the screen; for example, the device may use windows, window descriptors and window descriptor lists, or similar mechanisms. The top and bottom edges (first and last scan lines) of each object (or window) are displayed such that the alpha blend value (alpha blend factor) of these edges is adjusted to be one-half of what it would be if these same lines were not the top and bottom lines of the window.

For example, a window may constitute a rectangular shape, and the window may be opaque, i.e. it's alpha blend factor is 1, on a scale of 0 to 1. All lines on this window except the first and last are opaque when the window is rendered. The top and bottom lines are adjusted so that, in this case, the alpha blend value becomes 0.5, thereby causing these lines to be mixed 50% with the images that are behind them. This function occurs automatically in the preferred implementation. Since in the preferred implementation, windows are rectangular objects that are rendered directly onto the screen, the locations of the top and bottom lines of every window are already known.

In one embodiment, the function of dividing the alpha blend values for the top and bottom lines by two is implemented only for the top fields of the interlaced display. In another embodiment, the function of dividing the alpha blend values for the top and bottom lines by two is implemented only for the bottom fields of the interlaced display.

In the preferred embodiment, there exists also the ability to alpha blend each window with the windows behind it, and this alpha value can be adjusted for every pixel, and therefore for every scan line. These characteristics of the application design are used advantageously, as the flutter reduction effect is implemented by controlling the alpha blend function using information that is readily available from the window control logic.

In a specific illustrative example, the window is solid opaque white, and the image behind it is solid opaque black. In the absence of the disclosed method, at the top and bottom edges of the window there would be a sharp contrast between black and white, and when displayed on an interlaced TV, significant flutter would be visible. Using the disclosed method, the top and bottom lines are blended 50% with the background, resulting in a color that is halfway between black and white, or gray. When displayed on an interlaced TV, the apparent visual location of the top and bottom edges of the object is constant, and flutter is not apparent. The same effect applies equally well for other image examples.

The method of reducing interlace flutter of this embodiment does not require any increase in memory bandwidth, as the alternate field (the one not currently being displayed) is not read from memory, and there is no need for vertical filtering, which would have required logic and on-chip memory.

The same function can alternatively be implemented in different graphics hardware designs. For example in designs using a frame buffer (conventional design), graphic objects can be composited into the frame buffer with an alpha blend value that is adjusted to one-half of its normal value at the top and bottom edges of each object. Such blending can be performed in software or in a blitter that has a blending capability.

XI. Anti-Flutter Filtering/Vertical Scaling

In the preferred embodiment, the vertical filtering and anti-flutter filtering are performed on blended graphics by one graphics filter. One function of the graphics filter is low pass filtering in the vertical dimension. The low pass filtering may be performed in order to minimize the "flutter" effect inherent in interlaced displays such as televisions. The vertical downscaling or upscaling operation may be performed in order to change the pixel aspect ratio from the square pixels that are normal for computer, Internet and World Wide Web content into any of the various oblong aspect ratios that are standard for televisions as specified in ITU-R 601B. In order to be able to perform vertical scaling of the upper layers the system preferably includes seven line buffers. This allows for four line buffers to be used for filtering and scaling, two are available for progressing by one or two lines at the end of every line, and one for the current compositing operation.

When scaling or filtering are performed, the alpha values in the line buffers are filtered or scaled in the same way as the YUV values, ensuring that the resulting alpha values correctly represent the desired alpha values at the proper location. Either or both of these operations, or neither, or other processing, may be performed on the contents of the line buffers.

Once the optional processing of the contents of the line buffers has been completed, the result is the completed set of upper layers with the associated alpha value (product of (1−A(i)). These results are used directly for compositing the upper layers with the lower layers, using the formula: Result=L(u)−AR(u)*L(1) as explained in detail in reference to blending of graphics and video. If the lower layers require any processing independent of processing required for the upper layers or for the resulting image, the lower layers are processed before being combined with the upper layers; however in one embodiment of the present invention, no such processing is required.

Each of the operations described above is preferably implemented digitally using conventional ASIC technology. As part of the normal ASIC technology the logical operations are segmented into pipeline stages, which may require temporary storage of logic values from one clock cycle to the next. The choice of how many pipeline stages are used in each of the operations described above is dependent on the specific ASIC technology used, the clock speed chosen, the design tools used, and the preference of the designer, and may vary without loss of generality. In the preferred embodiment the line buffers are implemented as dual port memories allowing one read and one write cycle to occur simultaneously, facilitating the read and write operations described above while maintaining a clock frequency of 81 MHz. In this embodiment the compositing function is divided into multiple pipeline stages, and therefore the address being read from the memory is different from the address being written to the same memory during the same clock cycle.

Each of the arithmetic operations described above in the preferred embodiment use 8 bit accuracy for each operand; this is generally sufficient for providing an accurate final result. Products are rounded to 8 bits before the result is used in subsequent additions.

Figure 31:
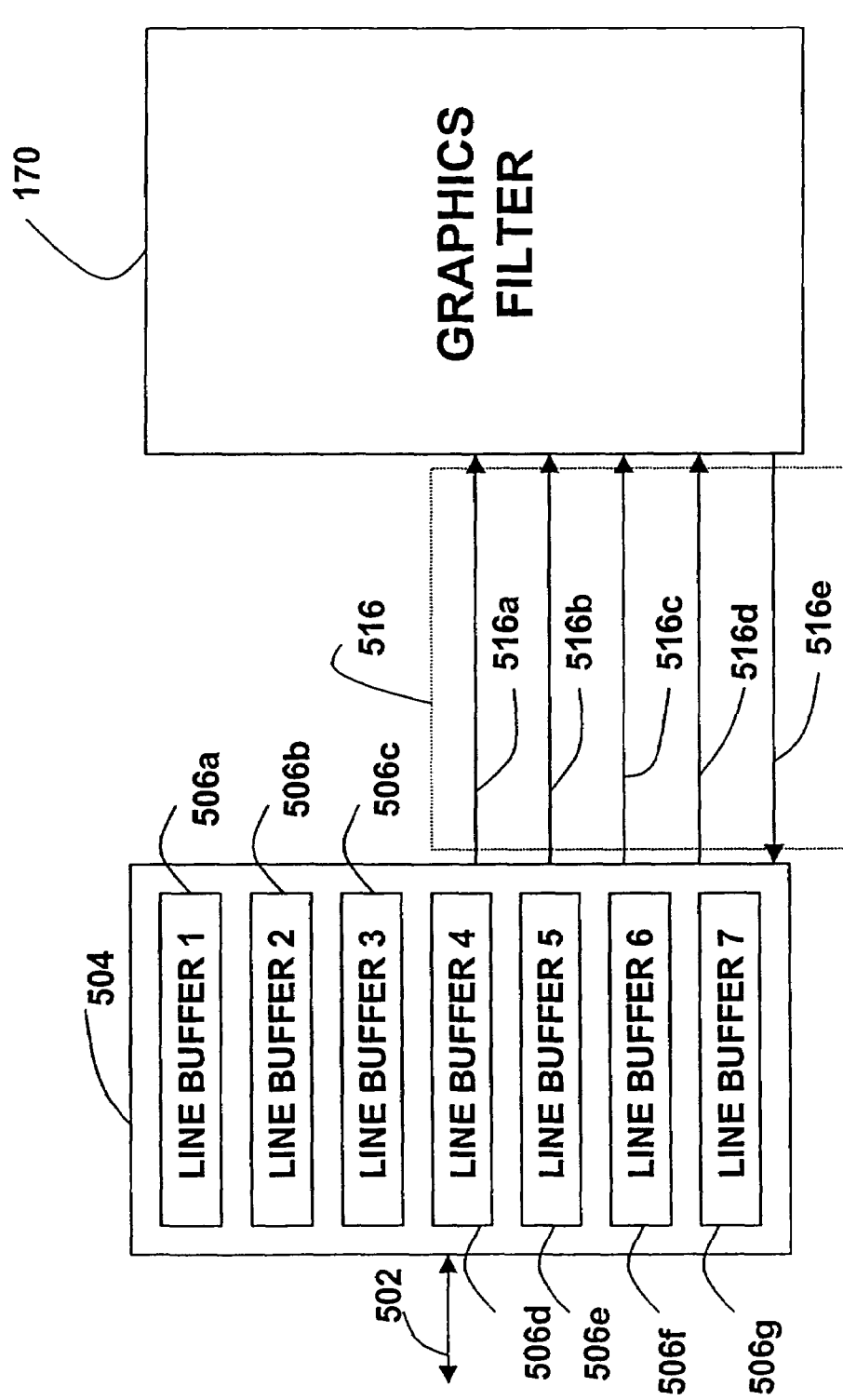
FIG. 31 is a block diagram of a polyphase filter that performs both anti-flutter filtering and vertical scaling of graphics windows.

Referring to FIG. 31, a block diagram illustrates an interaction between the line buffers 504 and a graphics filter 172. The line buffers comprises a set of line buffers 1-7 506a-g. The line buffers are controlled by a graphics line buffer controller over a line buffer control interface 502. In one embodiment of the present invention, the graphics filter is a four-tap polyphase filter, so that four lines of graphics data 516a-d are provided to the graphics filter at a time. The graphics filter 172 sends a line buffer release signal 516e to the line buffers to notify that one to three line buffers are available for compositing additional graphics display lines.

In another embodiment, line buffers are not used, but rather all of the upper layers are composited concurrently. In this case, there is one graphics blender for each of the upper layers active at any one pixel, and the clock rate of the graphics blender may be approximately equal to the pixel display rate. The clock rate of the graphics blenders may be somewhat slower or faster, if FIFO buffers are used at the output of the graphics blenders.

The mathematical formulas implemented are the same as in the first embodiment described. The major difference is that instead of performing the compositing function iteratively by reading and writing a line buffer, all layers are composited concurrently and the result of the series of compositor blocks is immediately available for processing, if required, and for blending with the lower layers, and line buffers are not used for purposes of compositing.

Line buffers may still be needed in order to implement vertical filtering or vertical scaling, as those operations typically require more than one line of the group of upper layers to be available simultaneously, although fewer line buffers are generally required here than in the preferred embodiment. Using multiple graphics blenders operating at approximately the pixel rate simplifies the implementation in applications where the pixel rate is relatively fast for the ASIC technology used, for example in HDTV video and graphics systems where the pixel rate is 74.25 MHz.

XII. Unified Memory Architecture/Real Time Scheduling

Recently, improvements to memory fabrication technologies have resulted in denser memory chips. However memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. In the preferred embodiment, a unified memory architecture is used. In the unified memory architecture, all the tasks (also referred to as "clients"), including CPU, display engine and IO devices, share the same memory.

The unified memory architecture preferably includes a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior.

In an alternate embodiment, two memory controllers are used in a dual memory controller system. The memory controllers may be 16 bit memory controllers or 32-bit memory controllers. Each memory controller can support different configuration of SDRAM device types and banks, or other forms of memory besides SDRAM. A first memory space addressed by a first memory controller is preferably adjacent and contiguous to a second memory space addressed by a second memory controller so that software applications view the first and second memory spaces as one continuous memory space. The first and the second memory controllers may be accessed concurrently by different clients. The software applications may be optimized to improve performance.

For example, a graphics memory may be allocated through the first memory controller while a CPU memory is allocated through the second memory controller. While a display engine is accessing the first memory controller, a CPU may access the second memory controller at the same time. Therefore, a memory access latency of the CPU is not adversely affected in this instance by memory being accessed by the display engine and vice versa. In this example, the CPU may also access the first memory controller at approximately the same time that the display engine is accessing the first memory controller, and the display controller can access memory from the second memory controller, thereby allowing sharing of memory across different functions, and avoiding many copy operations that may otherwise be required in conventional designs.

Figure 32:
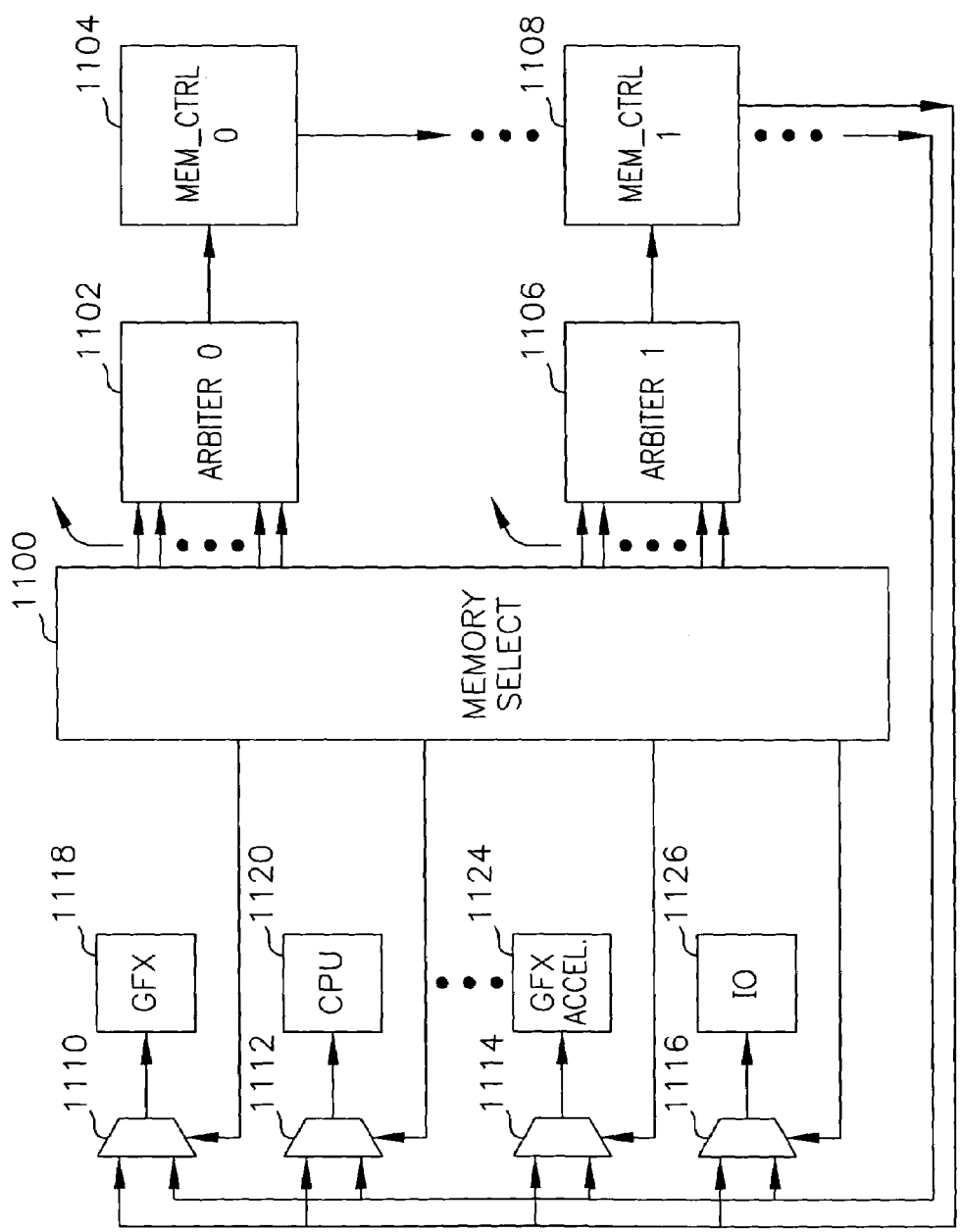
FIG. 32 is a functional block diagram of an exemplary memory service request and handling system with dual memory controllers.

Referring to FIG. 32, a dual memory controller system services memory requests generated by a display engine 1118, a CPU 1120, a graphics accelerator 1124 and an input/output module 1126 are provided to a memory select block 1100. The memory select block 1100 preferably routes the memory requests to a first arbiter 1102 or to a second arbiter 1106 based on the address of the requested memory. The first arbiter 1102 sends memory requests to a first memory controller 1104 while the second arbiter 1106 sends memory requests to a second memory controller 1108. The design of arbiters for handling requests from tasks with different priorities is well known in the art.

The first memory controller preferably sends address and control signals to a first external SDRAM and receives a first data from the first external SDRAM. The second memory controller preferably sends address and control signals to a second external SDRAM and receives a second data from the second external SDRAM. The first and second memory controllers preferably provide first and second data received, respectively, from the first and second external SDRAMs to a device that requested the received data.

The first and second data from the first and second memory controllers are preferably multiplexed, respectively, by a first multiplexer 1110 at an input of the display engine, by a second multiplexer 1112 at an input of the CPU, by a third multiplexer 1114 at an input of the graphics accelerator and by a fourth multiplexer 1116 at an input of the I/O module. The multiplexers provide either the first or the second data, as selected by memory select signals provided by the memory select block, to a corresponding device that has requested memory.

An arbiter preferably uses an improved form of real time scheduling to meet real-time latency requirements while improving performance for latency-sensitive tasks. First and second arbiters may be used with the flexible real time scheduling. The real time scheduling is preferably implemented on both the first arbiter and the second arbiter independently.

When using a unified memory, memory latencies caused by competing memory requests by different tasks should preferably be addressed. In the preferred embodiment, a real-time scheduling and arbitration scheme for unified memory is implemented, such that all tasks that use the unified memory meet their real-time requirements. With this innovative use of the unified memory architecture and real-time scheduling, a single unified memory is provided to the CPU and other devices of the graphics display system without compromising quality of graphics or other operations and while simultaneously minimizing the latency experienced by the CPU.

The methodology used preferably implements real-time scheduling using Rate Monotonic Scheduling ("RMS"). It is a mathematical approach that allows the construction of provably correct schedules of arbitrary numbers of real-time tasks with arbitrary periods for each of the tasks. This methodology provides for a straight forward means for proof by simulation of the worst case scenario, and this simulation is simple enough that it can be done by hand. RMS, as normally applied, makes a number of simplifying assumptions in the creation of a priority list.

In the normal RMS assumptions, all tasks are assumed to have constant periods, such that a request for service is made by the task with stated period, and all tasks have a latency tolerance that equals that task's period. Latency tolerance is defined as the maximum amount of time that can pass from the moment the task requests service until that task's request has been completely satisfied. During implementation of one embodiment of the present invention, the above assumptions have been modified, as described below.

In the RMS method, all tasks are generally listed along with their periods. They are then ordered by period, from the shortest to the longest, and priorities are assigned in that order. Multiple tasks with identical periods can be in any relative order. In other words, the relative order amongst them can be decided by, for example, flipping a coin.

Proof of correctness, i.e. the guarantee that all tasks meet their deadlines, is constructed by analyzing the behavior of the system when all tasks request service at exactly the same time; this time is called the "critical instant". This is the worst case scenario, which may not occur in even a very large set of simulations of normal operation, or perhaps it may never occur in normal operation, however it is presumed to be possible. As each task is serviced, it uses the shared resource, memory clock cycles in the present invention, in the degree stated by that task. If all tasks meet their deadlines, the system is guaranteed to meet all tasks' deadlines under all conditions, since the critical instant analysis simulates the worst case.

When the lowest priority real-time task meets its deadline, without any higher priority tasks missing their deadlines, then all tasks are proven to meet their deadlines. As soon as any task in this simulation fails to meet its deadline, the test has failed and the task set cannot be guaranteed, and therefore the design should preferably be changed in order to guarantee proper operation under worst case conditions.

In the RMS methodology, real-time tasks are assumed to have periodic requests, and the period and the latency tolerance are assumed to have the same value. Since the requests may not be in fact periodic, it is clearer to speak in terms of "minimum interval" rather than period. That is, any task is assumed to be guaranteed not to make two consecutive requests with an interval between them that is any shorter than the minimum interval.

The deadline, or the latency tolerance, is the maximum amount of time that may pass between the moment a task makes a request for service and the time that the service is completed, without impairing the function of the task. For example, in a data path with a constant rate source (or sink), a FIFO, and memory access from the FIFO, the request may occur as soon as there is enough data in the FIFO that if service is granted immediately the FIFO does not underflow (or overflow in case of a read operation supporting a data sink). If service is not completed before the FIFO overflows (or underflows in the case of a data sink) the task is impaired.

In the RMS methodology, those tasks that do not have specified real-time constraints are preferably grouped together and served with a single master task called the "sporadic server", which itself has the lowest priority in the system. Arbitration within the set of tasks served by the sporadic server is not addressed by the RMS methodology, since it is not a real-time matter. Thus, all non-real-time tasks are served whenever there is resource available, however the latency of serving any one of them is not guaranteed.

To implement real-time scheduling based on the RMS methodology, first, all of the tasks or clients that need to access memory are preferably listed, not necessarily in any particular order. Next, the period of each of the tasks is preferably determined. For those with specific bandwidth requirements (in bytes per second of memory access), the period is preferably calculated from the bandwidth and the burst size. If the deadline is different from the period for any given task, that is listed as well. The resource requirement when a task is serviced is listed along with the task. In this case, the resource requirement is the number of memory clock cycles required to service the memory access request. The tasks are sorted in order of increasing period, and the result is the set of priorities, from highest to lowest. If there are multiple tasks with the same period, they can be given different, adjacent priorities in any random relative order within the group; or they can be grouped together and served with a single priority, with round-robin arbitration between those tasks at the same priority.

In practice, the tasks sharing the unified memory do not all have true periodic behavior. In one embodiment of the present invention, a block out timer, associated with a task that does not normally have a period, is used in order to force a bounded minimum interval, similar to a period, on that task. For example a block out timer associated with the CPU has been implemented in this embodiment. If left uncontrolled, the CPU can occupy all available memory cycles, for example by causing a never-ending stream of cache misses and memory requests. At the same time, CPU performance is determined largely by "average latency of memory access", and so the CPU performance would be less than optimal if all CPU memory accessed were consigned to a sporadic server, i.e., at the lowest priority.

In this embodiment, the CPU task has been converted into two logical tasks. A first CPU task has a very high priority for low latency, and it also has a block out timer associated with it such that once a request by the CPU is made, it cannot submit a request again until the block out timer has timed out. In this embodiment, the CPU task has the top priority. In other embodiments, the CPU task may have a very high priority but not the top priority. The timer period has been made programmable for system tuning, in order to accommodate different system configurations with different memory widths or other options.

In one embodiment of the present invention, the block out timer is started when the CPU makes a high priority request. In another embodiment, the block out timer is started when the high priority request by the CPU is serviced. In other embodiments, the block out timer may be started at any time in the interval between the time the high priority request is made and the time the high priority request is serviced.

A second CPU task is preferably serviced by a sporadic server in a round-robin manner. Therefore if the CPU makes a long string of memory requests, the first one is served as a high priority task, and subsequent requests are served by the low priority sporadic server whenever none of the real-time tasks have requests pending, until the CPU block out timer times out. In one embodiment of the present invention, the graphics accelerator and the display engine are also capable of requesting more memory cycles than are available, and so they too use similar block out timer.

For example, the CPU read and write functions are grouped together and treated as two tasks. A first task has a theoretical latency bound of 0 and a period that is programmable via a block out timer, as described above. A second task is considered to have no period and no deadline, and it is grouped into the set of tasks served by the sporadic server via a round robin at the lowest priority. The CPU uses a programmable block out timer between high priority requests in this embodiment.

For another example, a graphics display task is considered to have a constant bandwidth of 27 MB/s, i.e., 16 bits per pixel at 13.5 MHz. However, the graphics bandwidth in one embodiment of the present invention can vary widely from much less than 27 MB/s to a much greater figure, but 27 MB/s is a reasonable figure for assuring support of a range of applications. For example, in one embodiment of the present invention, the graphics display task utilizes a block out timer that enforces a period of 2.37 μs between high priority requests, while additional requests are serviced on a best-effort basis by the sporadic server in a low priority round robin manner.

Figure 33:
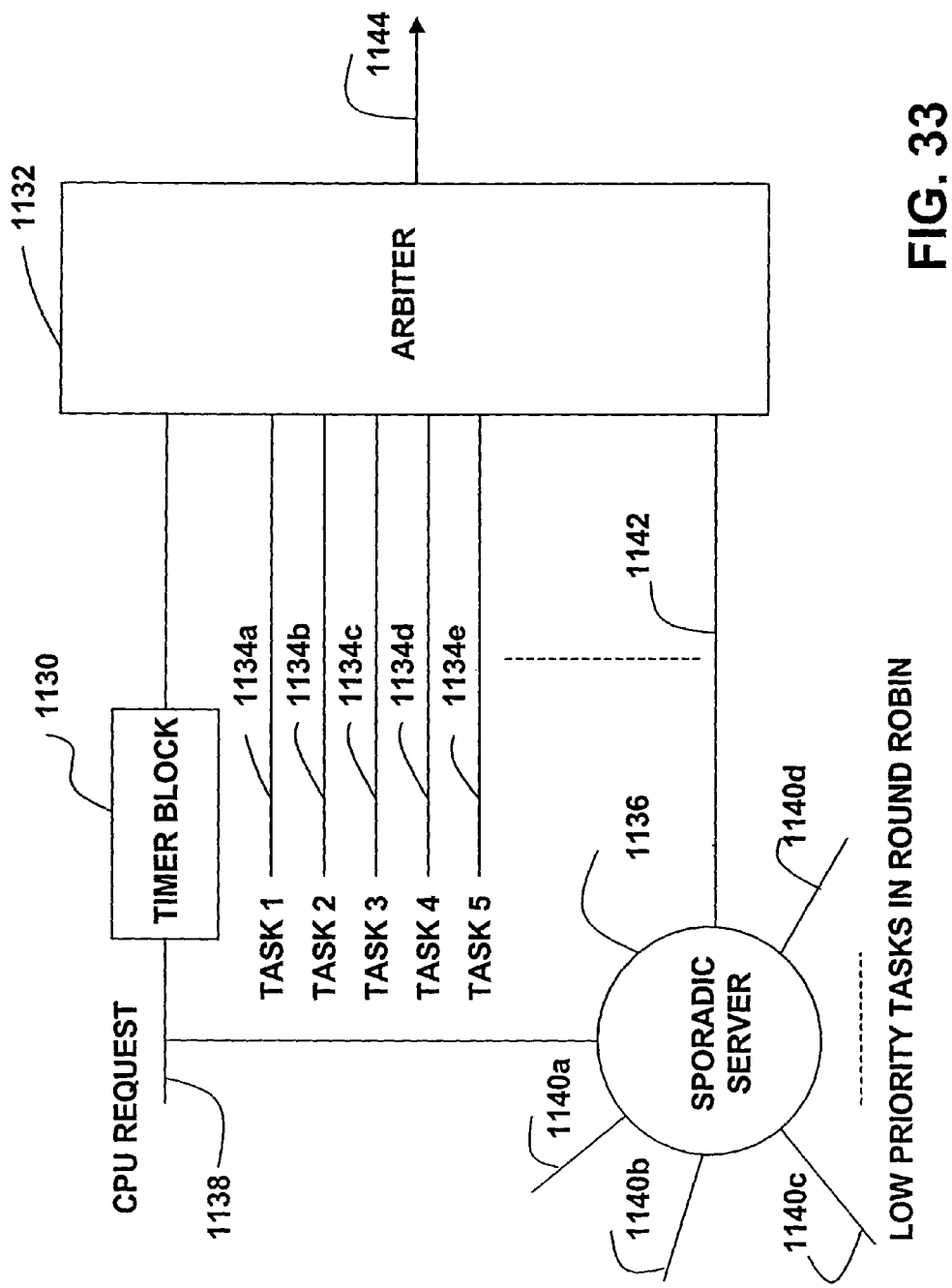
FIG. 33 is a functional block diagram of an implementation of a real time scheduling system.

Referring to FIG. 33, a block diagram illustrates an implementation of a real-time scheduling using an RMS methodology. A CPU service request 1138 is preferably coupled to an input of a block out timer 1130 and a sporadic server 1136. An output of the block out timer 1130 is preferably coupled to an arbiter 1132 as a high priority service request. Tasks 1-5 1134a-e may also be coupled to the arbiter as inputs. An output of the arbiter is a request for service of a task that has the highest priority among all tasks that have a pending memory request.

In FIG. 33, only the CPU service request 1138 is coupled to a block out timer. In other embodiments, service requests from other tasks may be coupled to their respective block out timers. The block out timers are used to enforce a minimum interval between two successive accesses by any high priority task that is non-periodic but may require expedited servicing. Two or more such high priority tasks may be coupled to their respective block out timers in one embodiment of the present invention. Devices that are coupled to their respective block out timers as high priority tasks may include a graphics accelerator, a display engine, and other devices.

In addition to the CPU request 1138, low priority tasks 1140a-d may be coupled to the sporadic server 1136. In the sporadic server, these low priority tasks are handled in a round robin manner. The sporadic server sends a memory request 1142 to the arbiter for the next low priority task to be serviced.

Figure 34:
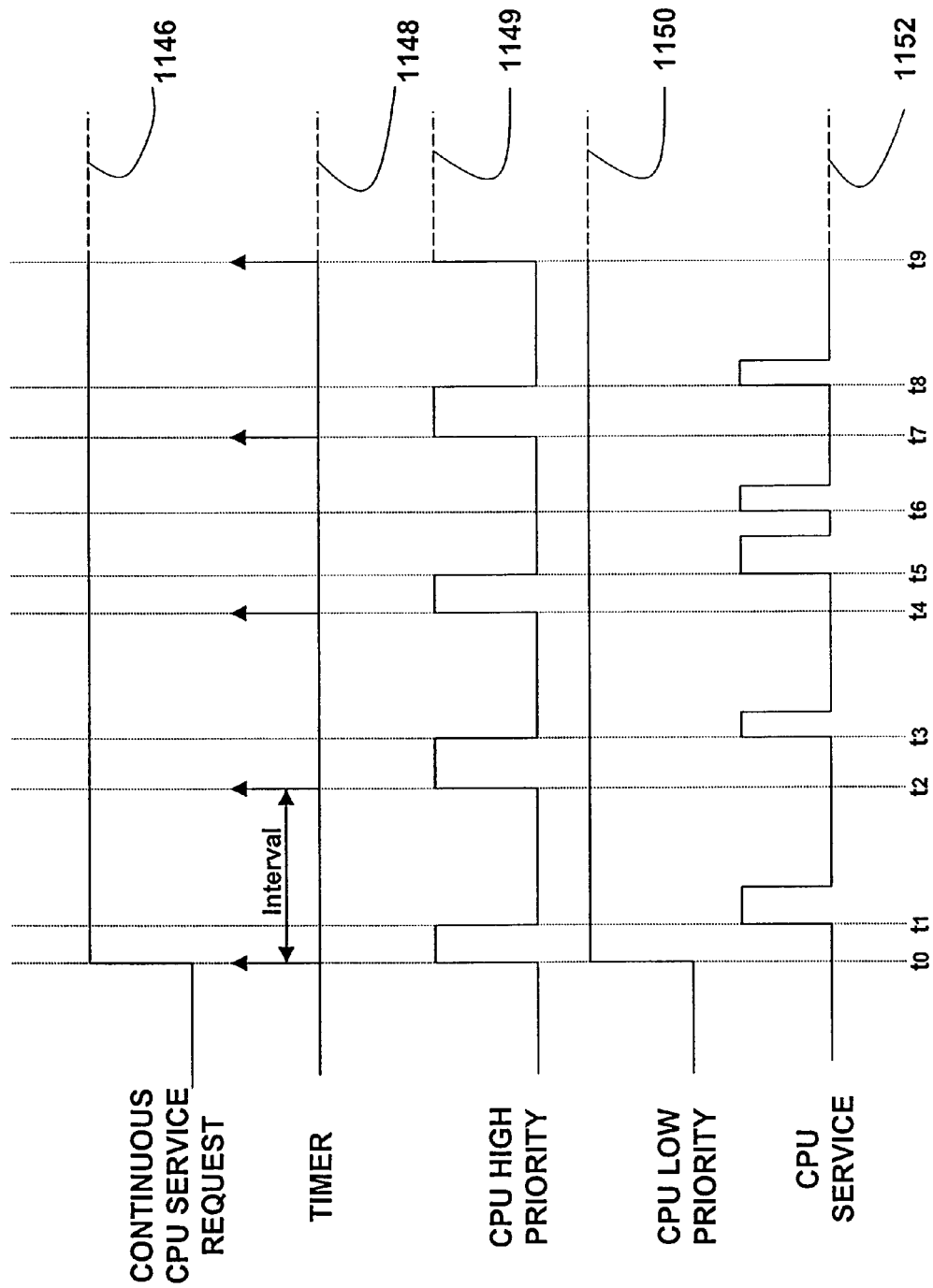
FIG. 34 is a timing diagram of an exemplary CPU servicing mechanism that has been implemented using real time scheduling.

Referring to FIG. 34, a timing diagram illustrates CPU service requests and services in case of a continuous CPU request 1146. In practice, the CPU request is generally not continuous, but FIG. 34 has been provided for illustrative purposes. In the example represented in FIG. 34, a block out timer 1148 is started upon a high priority service request 1149 by the CPU. At time $t_0$, the CPU starts making the continuous service request 1146, and a high priority service request 1149 is first made provided that the block out timer 1148 is not running at time $t_0$. When the high priority service request is made, the block out timer 1148 is started. Between time $t_0$ and time $t_1$, the memory controller finishes servicing a memory request from another task. The CPU is first serviced at time $t_1$. In the preferred embodiment, the duration of the block out timer is programmable. For example, the duration of the block out timer may be programmed to be 3 μs.

Any additional high priority CPU request 1149 is blocked out until the block out timer times out at time $t_2$. Instead, the CPU low priority request 1150 is handled by a sporadic server in a round robin manner between time $t_0$ and time $t_2$. The low priority request 1150 is active as long as the CPU service request is active. Since the CPU service request 1146 is continuous, another high priority service request 1149 is made by the CPU and the block out timer is started again as soon as the block out timer times out at time $t_2$. The high priority service request made by the CPU at time $t_2$ is serviced at time $t_3$ when the memory controller finishes servicing another task. Until the block out timer times out at time $t_4$, the CPU low priority request 1150 is handled by the sporadic server while the CPU high priority request 1149 is blocked out.

Another high priority service request is made and the block out timer 1148 is started again when the block out timer 1148 times out at time $t_4$. At time $t_5$, the high priority service request 1149 made by the CPU at time $t_4$ is serviced. The block out timer does not time out until time $t_7$. However, the block out timer is not in the path of the CPU low priority service request and, therefore, does not block out the CPU low priority service request. Thus, while the block out timer is still running, a low priority service request made by the CPU is handled by the sporadic server, and serviced at time $t_6$.

When the block out timer 1148 times out at time $t_7$, it is started again and yet another high priority service request is made by the CPU, since the CPU service request is continuous. The high priority service request 1149 made by the CPU at time $t_7$ is serviced at time $t_8$. When the block out timer times out at time $t_9$, the high priority service request is once again made by the CPU and the block out timer is started again.

The schedule that results from the task set and priorities above is verified by simulating the system performance starting from the "critical instant", when all tasks request service at the same time and a previously started low priority task is already underway. The system is proven to meet all the real-time deadlines if all of the tasks with real-time deadlines meet their deadlines. Of course, in order to perform this simulation accurately, all tasks make new requests at every repetition of their periods, whether or not previous requests have been satisfied.

Figure 35:
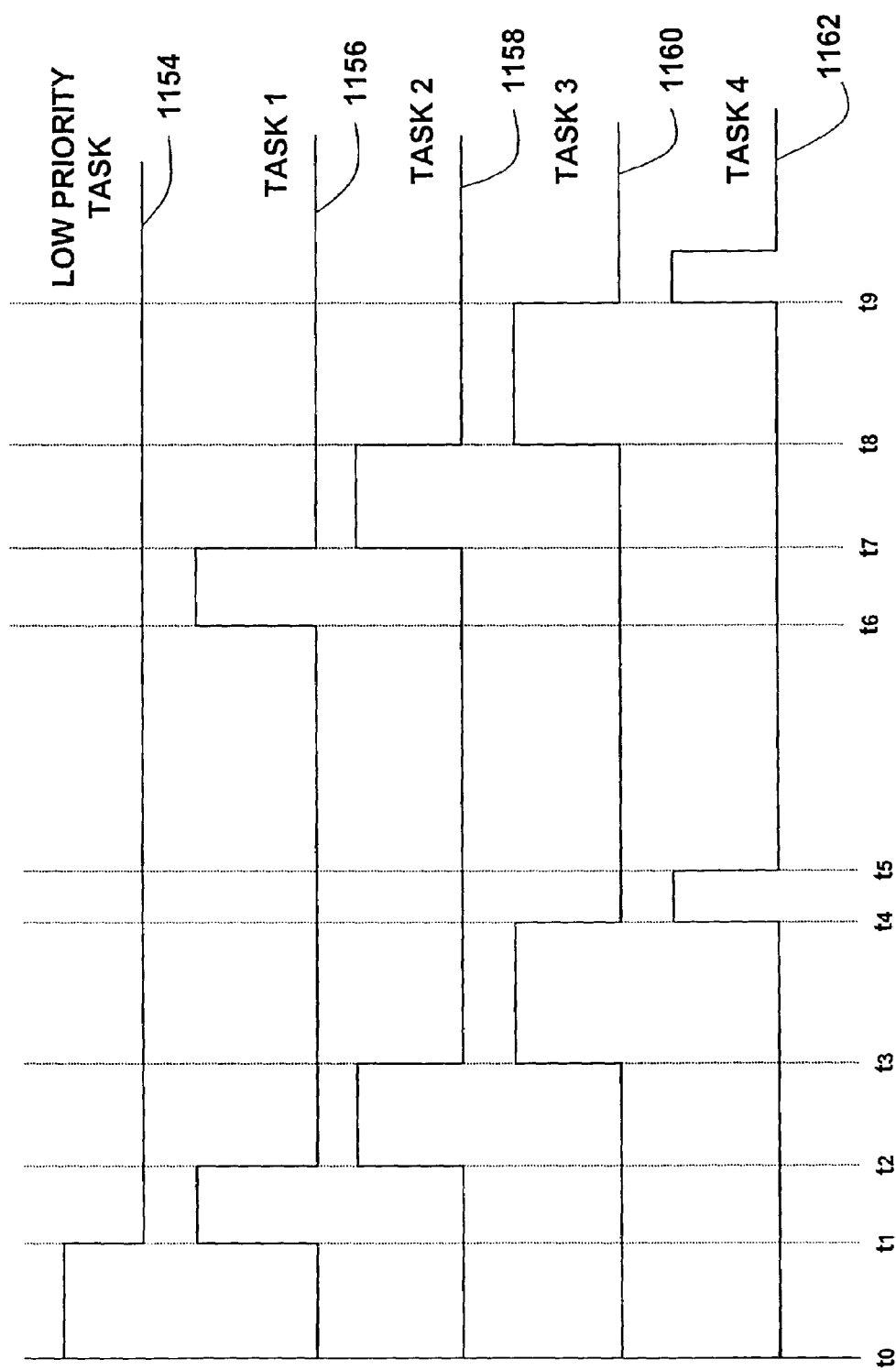
FIG. 35 is a timing diagram that illustrates certain principles of critical instant analysis for an implementation of real time scheduling.

Referring to FIG. 35, a timing diagram illustrates an example of a critical instant analysis. At time to, a task 1 1156, a task 2 1158, a task 3 1160 and a task 4 1162 request service at the same time. Further, at time to, a low priority task 1154 is being serviced. Therefore, the highest priority task, the task 1, cannot be serviced until servicing of the low priority task has been completed.

When the low priority task is completed at time $t_1$, the task 1 is serviced. Upon completion of the task 1 at time $t_2$, the task 2 is serviced. Upon completion of the task 2 at time $t_3$, the task 3 is serviced. Upon completion of the task 3 at time $t_4$, the task 4 is serviced. The task 4 completes at time $t_5$, which is before the start of a next set of tasks: the task 1 at $t_6$, the task 2 at $t_7$, the task 3 at $t_8$, and the task 4 at $t_9$.

Figure 36:
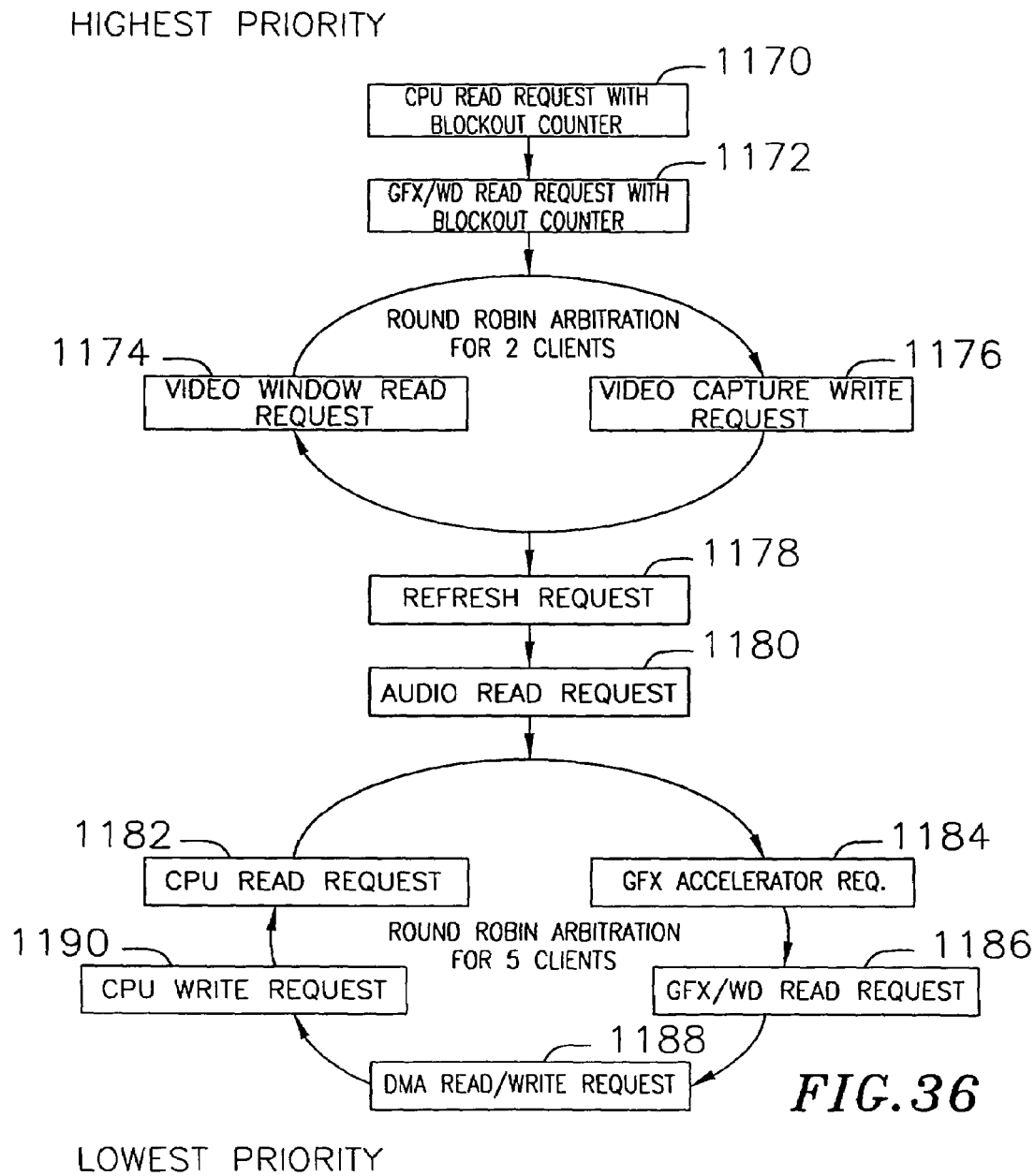
FIG. 36 is a flow diagram illustrating servicing of requests according to the priority of the task.

For example, referring to FIG. 36, a flow diagram illustrates a process of servicing memory requests with different priorities, from the highest to the lowest. The system in step 1170 makes a CPU read request with the highest priority. Since a block out timer is used with the CPU read request in this example, the block out timer is started upon making the highest priority CPU read request. Then the system in step 1172 makes a graphics read request. A block out timer is also used with the graphics read request, and the block out timer is started upon making the graphics read request.

A video window read request in step 1174 and a video capture write request in step 1176 have equal priorities. Therefore, the video window read request and the video capture write request are placed in a round robin arbitration for two tasks (clients). The system in step 1178 and step 1180 services a refresh request and a audio read request, respectively.

While respective block out timers for the CPU read request and the graphics read request are active, the system places the CPU read request and the graphics read request in a round robin arbitration for five tasks (clients), respectively, in step 1182 and step 1186. The system in steps 1184, 1188 and 1190 places other lowest priority tasks such as a graphics accelerator read/write request, a DMA read/write request and a CPU write request, respectively, in this round robin arbitration with five clients.

XIII. Graphics Accelerator

Displaying of graphics generally requires a large amount of processing. If all processing of graphics is performed by a CPU, the processing requirements may unduly burden the CPU since the CPU generally also performs many other tasks. Therefore, many systems that perform graphics processing use a dedicated processor, which is typically referred to as a graphics accelerator.

The system according to the present invention may employ a graphics accelerator that includes memory for graphics data, the graphics data including pixels, and a coprocessor for performing vector type operations on a plurality of components of one pixel of the graphics data.

The preferred embodiment of the graphics display system uses a graphics accelerator that is optimized for performing real-time 3D and 2D effects on graphics and video surfaces. The graphics accelerator preferably incorporates specialized graphics vector arithmetic functions for maximum performance with video and real-time graphics. The graphics accelerator performs a range of essential graphics and video operations with performance comparable to hardwired approaches, yet it is programmable so that it can meet new and evolving application requirements with firmware downloads in the field. The graphics accelerator is preferably capable of 3D effects such as real-time video warping and flipping, texture mapping, and Gouraud and Phong polygon shading, as well as 2D and image effects such as blending, scaling, blitting and filling. The graphics accelerator and its caches are preferably completely contained in an integrated circuit chip.

The graphics accelerator of the present invention is preferably based on a conventional RISC-type microprocessor architecture. The graphics accelerator preferably also includes additional features and some special instructions in the instruction set. In the preferred embodiment, the graphics accelerator is based on a MIPS R3000 class processor. In other embodiments, the graphics accelerator may be based on almost any other type of processors.

Figure 37:
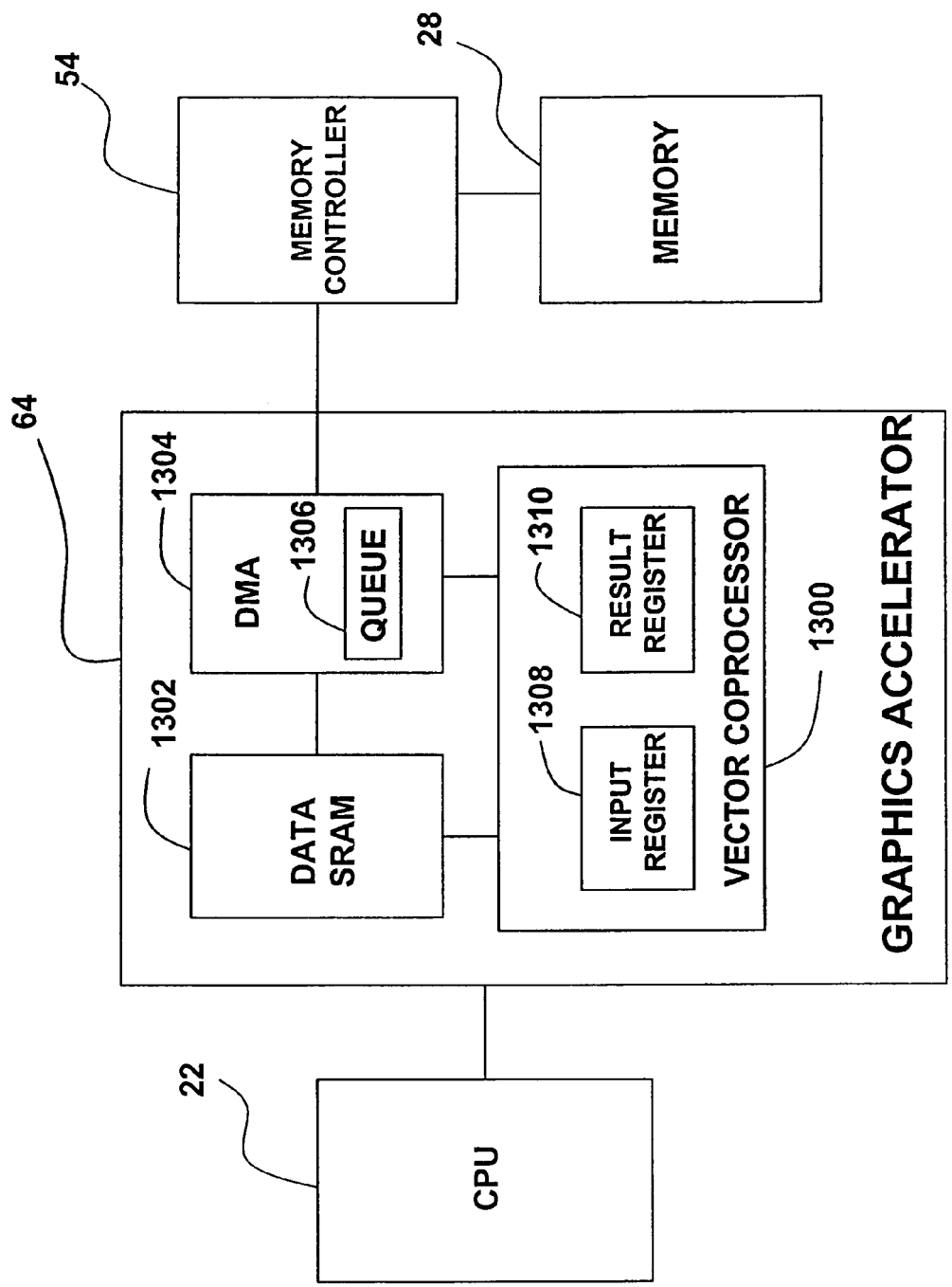
FIG. 37 is a block diagram of a graphics accelerator, which may be coupled to a CPU and a memory controller.

Referring to FIG. 37, a graphics accelerator 64 receives commands from a CPU 22 and receives graphics data from main memory 28 through a memory controller 54. The graphics accelerator preferably includes a coprocessor (vector coprocessor) 1300 that performs vector type operations on pixels. In vector type operations, the R, G, and B components, or the Y, U and V components, of a pixel are processed in parallel as the three elements of a "vector". In alternate embodiments, the graphics accelerator may not include the vector coprocessor, and the vector coprocessor may be coupled to the graphics accelerator instead. The vector coprocessor 1300 obtains pixels (3-tuple vectors) via a specialized LOAD instruction.

The LOAD instruction preferably extracts bits from a 32-bit word in memory that contains the required bits. The LOAD instruction also preferably packages and converts the bits into the input vector format of the coprocessor. The vector coprocessor 1300 writes pixels (3-tuple vectors) to memory via a specialized STORE instruction. The STORE instruction preferably extracts the required bits from the accumulator (output) register of the coprocessor, converts them if required, and packs them into a 32 bit word in memory in a format suitable for other uses within the IC, as explained below.

Formats of the 32-bit word in memory preferably include an RGB16 format and a YUV format. When the pixels are formatted in RGB16 format, R has 5 bits, G has 6 bits, and B has 5 bits. Thus, there are 16 bits in each RGB16 pixel and there are two RGB16 half-words in every 32-bit word in memory. The two RGB16 half-words are selected, respectively, via VectorLoadRGB16Left instruction and VectorLoadRGB16Right instruction. The 5 or 6 bit elements are expanded through zero expansion into 8 bit components when loaded into the coprocessor input register 1308.

The YUV format preferably includes YUV 4:2:2 format, which has four bytes representing two pixels packed into every 32-bit word in memory. The U and V elements preferably are shared between the two pixels. A typical packing format used to load two pixels having YUV 4:2:2 format into a 32-bit memory is YUYV, where each of first and second Y's, U and V has eight bits. The left pixel is preferably comprised of the first Y plus the U and V, and the right pixel is preferably comprised of the second Y plus the U and V. Special LOAD instructions, LoadYUVLeft and LoadYUVRight, are preferably used to extract the YUV values for the left pixel and the right pixel, respectively, and put them in the coprocessor input register 1308.

Special STORE instructions, StoreVectorAccumulatorRGB16, StoreVectorAccumulatorRGB24, StoreVectorAccumulatorYUVLeft, and StoreVectorAccumulatorYUVRight, preferably convert the contents of the accumulator, otherwise referred to as the output register of the coprocessor, into a chosen format for storage in memory. In the case of StoreVectorAccumulatorRGB16, the three components (R, G, and B) in the accumulator typically have 8, 10 or more significant bits each; these are rounded or dithered to create R, G, and B values with 5, 6, and 5 bits respectively, and packed into a 16 bit value. This 16 bit value is stored in memory, selecting either the appropriate 16 bit half word in memory via the store address.

In the case of StoreVectorAccumulatorRGB24, the R, G, and B components in the accumulator are rounded or dithered to create 8 bit values for each of the R, G, and B components, and these are packed into a 24 bit value. The 24 bit RGB value is written into memory at the memory address indicated via the store address. In the cases of StoreVectorAccumulatorYUVLeft and StoreVectorAccumulatorYUVRight, the Y, U and V components in the accumulator are dithered or rounded to create 8 bit values for each of the components.

In the preferred embodiment, the StoreVectorAccumulatorYUVLeft instruction writes the Y, U and V values to the locations in the addressed memory word corresponding to the left YUV pixel, i.e. the word is arranged as YUYV, and the first Y value and the U and V values are over-written. In the preferred embodiment, the StoreVectorAccumulatorYUVRight instruction writes the Y value to the memory location corresponding to the Y component of the right YUV pixel, i.e. the second Y value in the preceding example. In other embodiments the U and V values may be combined with the U and V values already in memory creating a weighted sum of the existing and stored values and storing the result.

The coprocessor instruction set preferably also includes a GreaterThanOREqualTo (GE) instruction. The GE instruction performs a greater-than-or-equal-to comparison between each element of a pair of 3-element vectors. Each element in each of the 3-element vectors has a size of one byte. The results of all three comparisons, one bit per each result, are placed in a result register 1310, which may subsequently be used for a single conditional branch operation. This saves a lot of instructions (clock cycles) when performing comparisons between all the elements of two pixels.

The graphics accelerator preferably includes a data SRAM 1302, also called a scratch pad memory, and not a conventional data cache. In other embodiments, the graphics accelerator may not include the data SRAM, and the data SRAM may be coupled to the graphics accelerator instead. The data SRAM 1302 is similar to a cache that is managed in software. The graphics accelerator preferably also includes a DMA engine 1304 with queued commands. In other embodiments, the graphics accelerator may not include the DMA engine, and the DMA engine may be coupled to the graphics accelerator instead. The DMA engine 1304 is associated with the data SRAM 1302 and preferably moves data between the data SRAM 1302 and main memory 28 at the same time the graphics accelerator 64 is using the data SRAM 1302 for its load and store operations. In the preferred embodiment, the main memory 28 is the unified memory that is shared by the graphics display system, the CPU 22, and other peripherals.

The DMA engine 1304 preferably transfers data between the memory 28 and the data SDRAM 1302 to carry out load and store instructions. In other embodiments, the DMA engine 1304 may transfer data between the memory 28 and other components of the graphics accelerator without using the data SRAM 1302. Using data SRAM, however, generally results in faster loading and storing operations.

The DMA engine 1304 preferably has a queue 1306 to hold multiple DMA commands, which are executed sequentially in the order they are received. In the preferred embodiment, the queue 1306 is four instructions deep. This may be valuable because the software (firmware) may be structured so that the loop above the inner loop may instruct the DMA engine 1304 to perform a series of transfers, e.g. to get two sets of operands and write one set of results back, and then the inner loop may execute for a while; when the inner loop is done, the graphics accelerator 64 may check the command queue 1306 in the DMA engine 1304 to see if all of the DMA commands have been completed. The queue includes a mechanism that allows the graphics accelerator to determine when all the DMA commands have been completed. If all of the DMA commands have been completed, the graphics accelerator 64 preferably immediately proceeds to do more work, such as commanding additional DMA operations to be performed and to do processing on the new operands. If not, the graphics accelerator 64 preferably waits for the completion of DMA commands or perform some other tasks for a while.

Typically, the graphics accelerator 64 is working on operands and producing outputs for one set of pixels, while the DMA engine 1304 is bringing in operands for the next (future) set of pixel operations, and also the DMA engine 1304 is writing back to memory the results from the previous set of pixel operations. In this way, the graphics accelerator 64 does not ever have to wait for DMA transfers (if the code is designed well), unlike a conventional data cache, wherein the conventional data cache gets new operands only when there is a cache miss, and it writes back results only when either the cache writes it back automatically because it needs the cache line for new operands or when there is an explicit cache line flush operation performed. Therefore, the graphics accelerator 64 of the present invention preferably reduces or eliminates period of waiting for data, unlike conventional graphics accelerators which may spend a large fraction of their time waiting for data transfer operations between the cache and main memory.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

The invention claimed is:
1. A video scaler, comprising:
an input for receiving a video image;
clock-selection circuitry that receives a video input clock and a display output clock and selects one of the video input clock and the display output clock for upscaling and one of the video input clock and the display output clock for downscaling of the video image;

a scaler engine capable of both downscaling the video image to generate a first scaled video image and upscaling the video image to generate a second scaled video image, the scaler engine using the clock selected by the clock-selection circuitry;

a memory capable of storing the video image or the first scaled video image; and means for determining whether the video image is to be downscaled or upscaled.

2. The video scaler of claim 1, comprising:

first means capable of receiving the video image to be upscaled from the input, receiving the first scaled video image from the scaler engine, and providing the video image to be upscaled or the first scaled video image to the memory;

second means capable of recieving the video image to be downscaled from the input, recieving the video image to be upscaled from the memory, and providing the video image to be downscaled or the video image to be upscaled to the scaler engine; and third means capable of recieving the first scaled video image from the memory, recieving the second scaled video image from the scaler engine, and outputting either the first scaled video image or the second scaled video image.

3. The video scaler of claim 2, comprising fourth means capable of recieving and selecting between a digital video image and a digitized analog video image, and the fourth means outputs the selected one of the digital video image and the digitized analog video image as the video image.

4. The video scaler of claim 1, wherein the scaler engine downscales the video image using the video input clock.

5. The video scaler of claim 1, wherein the scaler engine upscales the video image using the display output clock.

6. The video scaler of claim 1, comprising a plurality of line buffers for providing the video image to the input.

7. The video scaler of claim 1, wherein the scaler engine comprises a horizontal scaler and a vertical scaler.

8. The video scaler of claim 1, wherein the scaler engine is a single physical device that is logically in both an upscale path and a downscale path of the video image.

9. A video scaler, comprising: clock-selection circuitry that receives a video input clock and a display output clock and selects one of the video input clock and the display output clock for upscaling and one of the video input clock and the display output clock for downscaling of a video image a scaler engine capable of both downscaling the video image to generate a first scaled video image and upscaling the video image to generate a second scaled video image, the scaler engine using the clock selected by the clock- selection circuitry and the video image received via an input of the video scaler;

a memory capable of storing the video image or the first scaled video image; and one or both of circuitry and/or code that determines whether the video image is to be downscaled or upscaled.

10. The video scaler of claim 9, wherein said one or both of said circuitry and/or code receives the video image to be upscaled from the input, receives the first scaled video image from the scaler engine, and provides the video image to be upscaled or the first scaled video image to the memory.

11. The video scaler of claim 9, wherein said one or both of said circuitry and/or code receives the video image to be downscaled from the input, receives the video image to be upscaled from the memory, and provides the video image to be downscaled or the video image to be upscaled to the scaler engine.

12. The video scaler of claim 9, wherein said one or both of said circuitry and/or code receives the first scaled video image from the memory, receives the second scaled video image from the scaler engine, and outputs either the first scaled video image or the second scaled video image.

13. The video scaler of claim 9, wherein said one or both of said circuitry and/or code receives and selects between a digital video image and a digitized analog video image, said at least one circuitry outputs the selected one of the digital video image and the digitized analog video image as the video image.

14. The video scaler of claim 9, wherein the scaler engine downscales the video image using the video input clock.

15. The video scaler of claim 9, wherein the scaler engine upscales the video image using the display output clock.

16. The video scaler of claim 9, comprising a plurality of line buffers for providing the video image to the input.

17. The video scaler of claim 9, wherein the scaler engine comprises a horizontal scaler and a vertical scaler.

18. The video scaler of claim 9, wherein the scaler engine is a single physical device that is logically in both an upscale path and a downscale path of the video image.

19. A video scaler, comprising: an input for receiving a video image; a scaler engine capable of both downscaling the video image to generate a first scaled video image and upscaling the video image to generate a second scaled video image, the scaler engine using a clock selected between a video input clock and a display output clock;

a memory capable of storing the video image or the first scaled video image; and means for determining whether the video image is to be downscaled or upscaled, wherein the scaler engine comprises a horizontal scaler and a vertical scaler, and wherein one or both of the horizontal scaler and the vertical scaler comprises a programmable filter.

20. A method for processing video data, the method comprising:

receiving a video image by a video scaling engine;

determining whether the video scaling engine requires less memory space to scale the video image before writing the video image to memory or after reading the video image from the memory;

scaling the received video image based on the determination; and if the video scaling engine requires less memory space to scale the video image before writing the video image to the memory:

scaling the video image in the video scaling engine using a video input clock of the video scaling engine to generate a first scaled video image;

writing the first scaled video image to the memory;

reading the first scaled video image from the memory;

outputting the first scaled video image; and blending the first scaled video image with a graphics image to generate a blended video and graphics image.

21. A method for processing video data, the method comprising:

receiving a video image by a video scaling engine;

determining whether the video scaling engine requires less memory space to scale the video image before writing the video image to memory or after reading the video image from the memory;

scaling the received video image based on the determination;
if the video scaling engine requires less memory space to scale the video image before writing the video image to the memory:
  scaling the video image in the video scaling engine using a video input clock of the video scaling engine to generate a first scaled video image;
  writing the first scaled video image to the memory;
  reading the first scaled video image from the memory; and outputting the first scaled video image; and
if the video scaling engine requires less memory space to scale the video image after reading the video image from the memory:
  writing the video image to the memory prior to scaling;
  reading the video image from the memory;
  scaling the video image in the video scaling engine using a display output clock of the video scaling engine to generate a second scaled video image;
  outputting the second scaled video image; and
  blending the second scaled video image with a graphics image to generate a blended video and graphics image 22. A method for processing video data, the method comprising:
  receiving a video image by a video scaling engine;
  determining whether the video scaling engine requires less memory bandwidth to scale the video image before writing the video image to memory or after reading the video image from the memory;
  scaling the received video image based on the determination;
  if the video scaling engine requires less memory bandwidth to scale the video image before writing the video image to the memory:
    scaling the video image in the video scaling engine using a video input clock of the video scaling engine to generate a first scaled video image;
    writing the first scaled video image to the memory;
    reading the first scaled video image from the memory; and
    outputting the first scaled video image; and
  if the video scaling engine requires less memory bandwidth to scale the video image after reading the video image from the memory:
    writing the video image to the memory prior to scaling;
    reading the video image from the memory;
    scaling the video image in the video scaling engine using a display output clock of the video scaling engine to generate a second scaled video image; and
    outputting the second scaled video image, wherein scaling the video image using the display output clock comprises upscaling the video image.

23. A video scaler, comprising:
  a scaler engine capable of both downscaling a video image to generate a first scaled video image and upscaling the video image to generate a second scaled video image, the scaler engine using a clock selected between a video input clock and a display output clock, and the video image received via an input of the video scaler;
  a memory capable of storing the video image or the first scaled video image; and
  one or both of circuitry and/or code that determines whether the video image is to be downscaled or upscaled, wherein the scaler engine comprises a horizontal scaler and a vertical scaler, and wherein at least one of the horizontal scaler and the vertical scaler comprises a programmable filter.

* * * * *